US010587864B2

(12) United States Patent
Hayasaka et al.

(10) Patent No.: US 10,587,864 B2
(45) Date of Patent: Mar. 10, 2020

(54) IMAGE PROCESSING DEVICE AND METHOD

(71) Applicant: SONY CORPORATION, Tokyo (JP)

(72) Inventors: Kengo Hayasaka, Kanagawa (JP); Hironori Mori, Tokyo (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 499 days.

(21) Appl. No.: 14/903,115

(22) PCT Filed: Sep. 2, 2014

(86) PCT No.: PCT/JP2014/004507
§ 371 (c)(1),
(2) Date: Jan. 6, 2016

(87) PCT Pub. No.: WO2015/037211
PCT Pub. Date: Mar. 19, 2015

(65) Prior Publication Data
US 2016/0381348 A1 Dec. 29, 2016

(30) Foreign Application Priority Data

Sep. 11, 2013 (JP) .................. 2013-188409
Aug. 28, 2014 (JP) .................. 2014-174173

(51) Int. Cl.
*H04N 13/279* (2018.01)
*H04N 13/156* (2018.01)
(Continued)

(52) U.S. Cl.
CPC ....... *H04N 13/279* (2018.05); *G06K 9/00671* (2013.01); *G06Q 30/0635* (2013.01);
(Continued)

(58) Field of Classification Search
CPC .......... G06K 9/00671; G06Q 30/0635; G06Q 30/0643; G06Q 30/06; G06T 1/20;
(Continued)

(56) References Cited

U.S. PATENT DOCUMENTS 7,062,722 B1 * 6/2006 Carlin .................... G06Q 30/02
715/781
9,164,723 B2 * 10/2015 Geiger .................... G06T 15/00
(Continued)

FOREIGN PATENT DOCUMENTS

CN 102395997 A 3/2012
CN 102447934 A 5/2012
(Continued)

OTHER PUBLICATIONS

Office Action for EP Patent Application No. 14767157.2, dated May 19, 2017, 08 pages of Office Action.
(Continued)

*Primary Examiner* — Christopher S Kelley
*Assistant Examiner* — Kathleen M Walsh
(74) *Attorney, Agent, or Firm* — Chip Law Group

(57) ABSTRACT

An image processing apparatus including circuitry configured to initiate a setting of an object for display within a background image in accordance with a modeling condition associated with a position at which the object is set, based on depth data and base-line length information associated with the background image and modeling data of the object.

25 Claims, 46 Drawing Sheets

(51) Int. Cl.

| | | |
|---|---|---|
| *H04N 13/178* | (2018.01) | |
| *H04N 13/133* | (2018.01) | |
| *G06T 1/20* | (2006.01) | |
| *G06K 9/00* | (2006.01) | |
| *G06Q 30/06* | (2012.01) | |
| *H04N 13/194* | (2018.01) | |
| *H04N 13/243* | (2018.01) | |
| *H04N 13/25* | (2018.01) | |
| *H04N 13/00* | (2018.01) | |

(52) U.S. Cl.
CPC .......... *G06Q 30/0643* (2013.01); *G06T 1/20* (2013.01); *H04N 13/133* (2018.05); *H04N 13/156* (2018.05); *H04N 13/178* (2018.05); *H04N 13/194* (2018.05); *H04N 13/243* (2018.05); *H04N 13/25* (2018.05); *H04N 2013/0081* (2013.01)

(58) Field of Classification Search
CPC ....... H04N 2013/0081; H04N 13/0025; H04N 13/004; H04N 13/0059; H04N 13/0066; H04N 13/0242; H04N 13/025; H04N 13/0278; H04N 13/133; H04N 13/156; H04N 13/178; H04N 13/194; H04N 13/243; H04N 13/25; H04N 13/279; H04N 1/21
USPC .......................................................... 348/48
See application file for complete search history.

(56) References Cited

U.S. PATENT DOCUMENTS

| | | | | |
|---|---|---|---|---|
| 9,303,982 | B1* | 4/2016 | Ivanchenko | G01B 11/22 |
| 2004/0104935 | A1* | 6/2004 | Williamson | G06F 3/012 |
| | | | | 715/757 |
| 2005/0131776 | A1* | 6/2005 | Perotti | G06F 16/9535 |
| | | | | 705/27.2 |
| 2007/0156017 | A1 | 7/2007 | Lamprecht et al. | |
| 2007/0296721 | A1* | 12/2007 | Chang | G06T 15/10 |
| | | | | 345/427 |
| 2008/0071559 | A1* | 3/2008 | Arrasvuori | G06Q 30/06 |
| | | | | 705/26.1 |
| 2010/0208057 | A1* | 8/2010 | Meier | G06T 19/006 |
| | | | | 348/135 |
| 2011/0246329 | A1* | 10/2011 | Geisner | G06F 3/017 |
| | | | | 705/27.1 |
| 2012/0162372 | A1* | 6/2012 | Ghyme | H04N 13/156 |
| | | | | 348/46 |
| 2013/0182078 | A1* | 7/2013 | Kitaura | H04N 13/30 |
| | | | | 348/46 |
| 2013/0187905 | A1 | 7/2013 | Vaddadi et al. | |
| 2013/0321586 | A1* | 12/2013 | Kirk | G06T 15/04 |
| | | | | 348/47 |
| 2014/0176565 | A1* | 6/2014 | Adeyoola | G06T 19/006 |
| | | | | 345/473 |
| 2014/0293016 | A1* | 10/2014 | Benhimane | G06T 17/00 |
| | | | | 348/50 |
| 2015/0026785 | A1* | 1/2015 | Soon-Shiong | G06F 21/10 |
| | | | | 726/7 |
| 2015/0310666 | A1 | 10/2015 | Meier et al. | |

FOREIGN PATENT DOCUMENTS

| | | | | |
|---|---|---|---|---|
| CN | 103004214 | A | 3/2013 | |
| CN | 103975365 | A | 8/2014 | |
| CN | 105701790 | A | 6/2016 | |
| EP | 2396767 | A2 | 12/2011 | |
| EP | 2786353 | A1 | 10/2014 | |
| JP | 10-336703 | A | 12/1998 | |
| JP | 2000-011204 | A | 1/2000 | |
| JP | 2011171858 | | 9/2011 | |
| JP | 2013-149219 | A | 8/2013 | |
| JP | 2013-152683 | A | 8/2013 | |
| JP | 2015-501044 | A | 1/2015 | |
| JP | 5833772 | B2 | 12/2015 | |
| KR | 10-2006-0041060 | A | 5/2006 | |
| KR | 10-2014-0101396 | A | 8/2014 | |
| WO | 2006/049384 | A1 | 5/2006 | |
| WO | 2010/091875 | A2 | 8/2010 | |
| WO | 2011/102818 | A1 | 8/2011 | |
| WO | 2011102818 | | 8/2011 | |
| WO | 2013/029675 | A1 | 3/2013 | |
| WO | 2013029675 | | 3/2013 | |
| WO | WO-2013029675 | A1 * | 3/2013 | ............ G06T 17/00 |
| WO | 2013/082009 | A1 | 6/2013 | |

OTHER PUBLICATIONS

Office Action for JP Patent Application No. 2014-174173, dated Oct. 17, 2017, 07 pages of Office Action and 04 pages of English Translation.

Office Action for CN Patent Application No. 201480046754.9, dated Sep. 3, 2018, 10 pages of Office Action and 12 pages of English Translation.

Office Action for JP Patent Application No. 2014-174173, dated May 29, 2018, 03 pages of Office Action and 02 pages of English Translation.

Extended European Search Report of EP Patent Application No. 18154027.9, dated Apr. 20, 2018, 10 pages.

* cited by examiner

341 — CAMERA MODULE INFORMATION
- RESOLUTION      : 2560 × 1920 × 1,  2048 × 1536 × 4, ⋯
- FOCAL LENGTH    : Inf. × 5, ⋯
- ISO SENSITIVITY : ISO400 × 1,  ISO200 × 4, ⋯
- IMAGING DIRECTION: 180 × 5, ⋯
- SHUTTER SPEED   : 33ms × 5, ⋯
- F VALUE         : F8 × 5, ⋯
- ANGLE OF VIEW   : 58° × 5, ⋯

342 — CAMERA ARRAY: X TYPE

343 — NUMBER OF VIEWPOINTS: 5

344 — CALIBRATION INFORMATION (CENTRAL COORDINATES)
  1296, 973  Camera0
  1298, 971  Camera1
  1295, 974  Camera2
  1294, 974  Camera3
  1293, 975  Camera4

A

345 — CALIBRATION INFORMATION
(LUMINANCE CORRECTION DATA INFORMATION)
  CameraN: 1.25, 1.15, 1.15, 1.25
           1.20, 1.10, 1.10, 1.20
           1.20, 1.00, 1.20, 1.20
           1.20, 1.10, 1.10, 1.20
           1.25, 1.15, 1.15, 1.25

B

346 — BASE-LINE LENGTH INFORMATION
  Camera0-1: 11mm
  Camera0-2: 12mm
  Camera0-3: 13mm
  Camera0-4: 11mm

C

FIG. 29
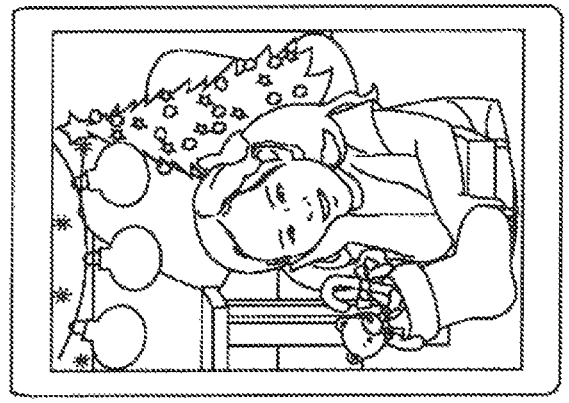
A
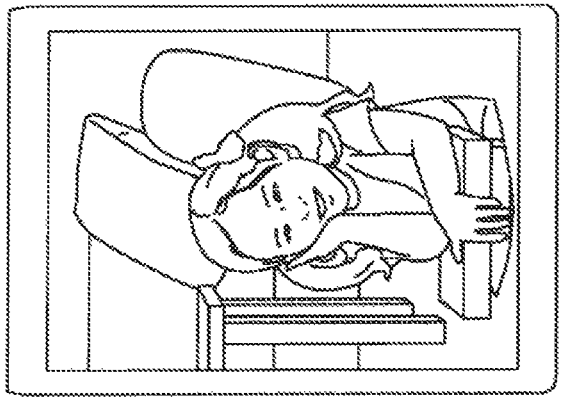
B

IMAGE PROCESSING DEVICE AND METHOD

TECHNICAL FIELD

The present disclosure relates to image processing devices and methods, and more particularly, relates to an image processing device and a method that are designed to increase the user-friendliness of a service that uses multiview images.

CROSS REFERENCE TO RELATED APPLICATIONS

This application claims the benefit of Japanese Priority Patent Applications JP 2013-188409 filed on Sep. 11, 2013 and JP 2014-174173 filed on Aug. 28, 2014, the entire contents of which are incorporated herein by reference.

BACKGROUND ART

There is a known technique to measure distances to a measuring object (a subject) by using images with different viewpoints. For example, a distance calculation method that uses a technique called "stereo matching" has been suggested (see Patent Document 1, for example).

With the stereo matching technique, depth data that indicates a distance to a subject in a multiview image is calculated from the multiview image formed with images having different viewpoints from one another. With the depth data, multiview images are superimposed on one another to generate an image to be provided to a user.

CITATION LIST

Patent Literature

[PTL 1]
JP 2011-171858 A

SUMMARY OF INVENTION

Technical Problem

However, there is a demand for an increase in user-friendliness of such a multiview-image using service.

The present disclosure is made in view of those circumstances, and is to increase the user-friendliness of the service that uses multiview images.

Solution to Problem

An image processing apparatus according to an embodiment of the present technique includes circuitry configured to initiate a setting of an object for display within a background image in accordance with a modeling condition associated with a position at which the object is set, based on depth data and base-line length information associated with the background image and modeling data of the object.

An image processing method according to an embodiment includes: setting an object for display within a background image in accordance with a modeling condition associated with a position at which the object is set, based on depth data and base-line length information associated with the background image and modeling data of the object; and placing the set object to be displayed at the position within the background image.

An image processing device according to an embodiment of the present technique includes an object placement unit that sets the orientation and the size of an object in a position in which the object is to be placed in a background image, and places the object having the set orientation and the set size in the designated position in the background image, the orientation and the size being set based on depth data, base-line length information, and the three-dimensional modeling data of the object, the depth data indicating the distance to a subject in the background image, the base-line length information being information indicating a reference length in the background image.

When another position is designated after the object is placed in the background image, the object placement unit may set the orientation and the size of the object in the another position, and place the object having the set orientation and the set size in the another position in the background image.

When there is a change in the position or the orientation of the viewpoint of the background image, the object placement unit may set the orientation and the size of the object in the position in which the object was placed before the change in the position or the orientation of the viewpoint in the background image not yet having the change in the position or the orientation of the viewpoint, and place the object having the set orientation and the size in the position in which the object was placed before the change in the position or the orientation of the viewpoint in the background image having the change in the position or the orientation of the viewpoint.

The object placement unit may move the object, to bring the object having the set orientation and the set size into contact with the floor.

The object placement unit may measure the length of a designated area in the background image.

The object placement unit may simulate lighting in the background image based on light source parameters and the depth data, and cause the background image to reflect the simulated lighting, the light source parameters being parameters related to the light source.

The object placement unit may identify a portion that satisfies line-of-flow conditions in the background image having the object placed therein, and emphasize the identified portion in the background image having the object placed therein.

The object placement unit may set the orientation and the size of a person in a position in which an image of the person is to be placed in a background having the object placed therein, and place the image of the person having the set orientation and the set size in the designated position in the background image having the object placed therein, the orientation and the size of the person being set based on the depth data, the base-line length information, and the three-dimensional modeling data of the image of the person.

The object placement unit may set the orientation and the size of the object selected from candidates for the object in the position in which the object selected from the candidates for the object is to be placed in the background image, and place the object selected from the candidates for the object having the set orientation and the set size in the designated position in the background image, the orientation and the size of the selected object being set based on the depth data, the base-line length information, and the three-dimensional modeling data of the object selected from the candidates for the object.

The object placement unit may identify objects that can be placed in the background image, and select the object to be placed in the background image from the identified objects, the objects being identified based on the depth data, the base-line length information, and the three-dimensional modeling data.

The image processing device may further include: an imaging unit that captures an image of the subject, and obtains the captured image as the background image; and a depth data generation unit that generates the depth data of the captured image obtained by the imaging unit.

The captured image may be a multiview image formed with images having different viewpoints from one another, the depth data generation unit may generate the depth data of the multiview image, and the image processing device may further include a virtual captured image generation unit that generates a virtual captured image as the background image based on the multiview image and the depth data, the virtual captured image being obtained by imaging the subject of the multiview image.

The object may be an image of furniture.

The image processing device may further include a purchase processing unit that performs a purchase process to purchase the furniture that is placed in the background image by the object placement unit.

The image processing device may further include a transmission unit that transmits multiview image data as the data of a multiview image and the depth data of the multiview image, the multiview image being formed with images having different viewpoints from one another and used for generating the background image.

The image processing device may further include a combined image data generation unit that generates the image data of the background image having the object placed therein by the object placement unit. The transmission unit may further transmit the combined image data generated by the combined image data generation unit.

The image processing device may further include an application parameter generation unit that generates application parameters that are parameters related to combining of the background image and the object. The transmission unit may further transmit the application parameters generated by the application parameter generation unit.

The image processing device may further include a metadata generation unit that generates metadata about the multiview image. The transmission unit may further transmit the metadata generated by the metadata generation unit.

The metadata may include the base-line length information.

An image processing method according to an embodiment of the present technique includes: setting the orientation and the size of an object in a position in which the object is to be placed in a background image, the orientation and the size being set based on depth data, base-line length information, and the three-dimensional modeling data of the object, the depth data indicating the distance to a subject in the background image, the base-line length information being information indicating a reference length in the background image; and placing the object having the set orientation and the set size in the designated position in the background image.

In an embodiment of the present technique, the orientation and the size of an object in a position in which the object is to be placed in a background image are set based on depth data indicating the distance to a subject in the background image, base-line length information indicating a reference length in the background image, and the three-dimensional modeling data of the object. The object having the set orientation and the set size is then placed in the designated position in the background image.

Advantageous Effects of Invention

According to an embodiment of the present technique, images can be processed. According to an embodiment of the present technique, the user-friendliness of a service that uses multiview images can also be increased.

BRIEF DESCRIPTION OF DRAWINGS

FIG. 13 is a diagram for explaining an example of metadata.

FIG. 29 is a diagram for explaining another example layout.

DESCRIPTION OF EMBODIMENTS

Figure 1:
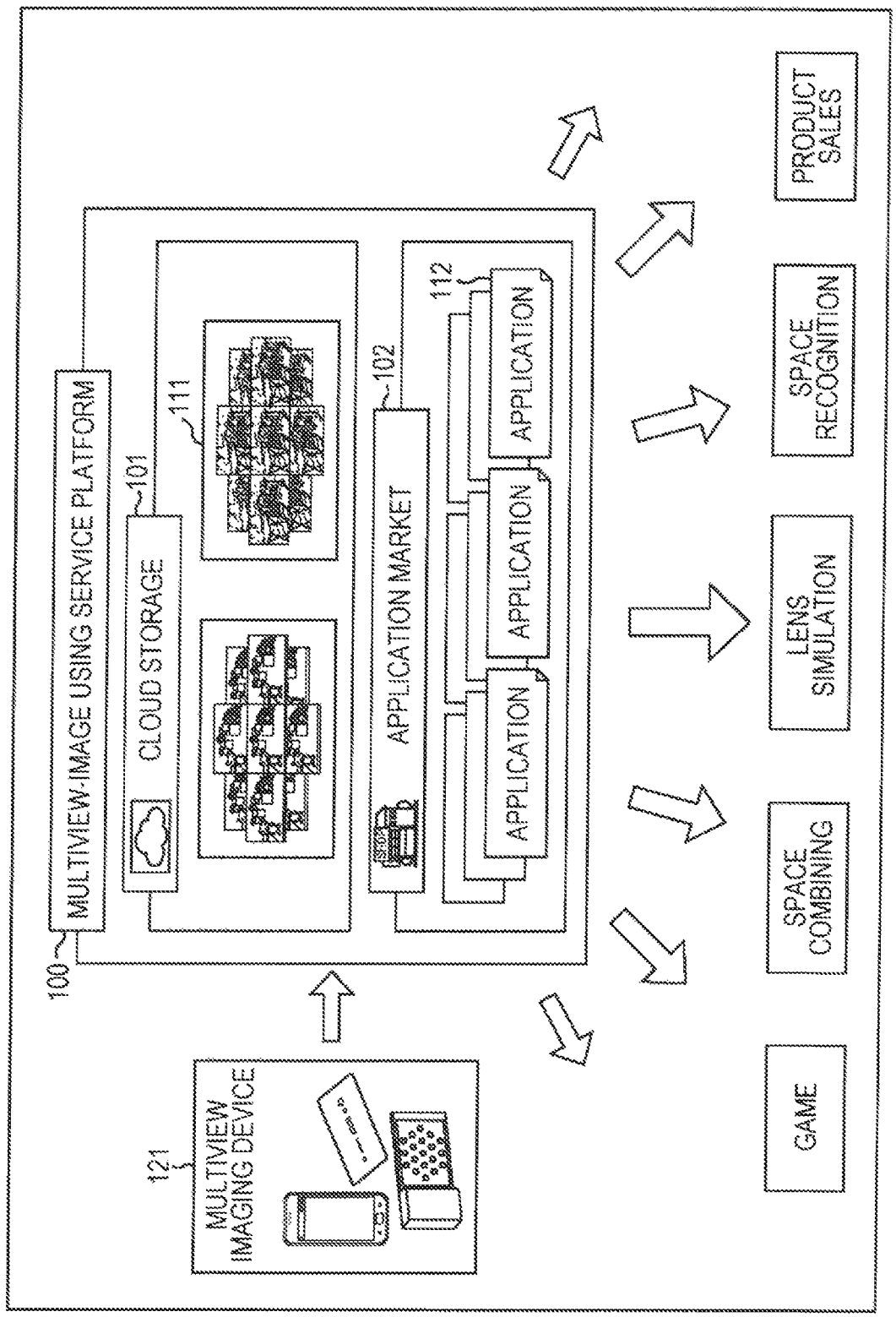
FIG. 1 is a diagram for explaining an example of a multiview-image using service platform.

The following is a description of modes for embodying this disclosure (hereinafter referred to as the embodiments). Explanation will be made in the following order.
1. First Embodiment (Multiview-Image Using Service Platform)
2. Second Embodiment (Management of Multiview Images)
3. Third Embodiment (Application Sales)
4. Fourth Embodiment (Virtual Lens Processing)
5. Fifth Embodiment (Sales Support)
6. Others 1. First Embodiment Multiview-Image Using Service Platform FIG. 1 is a diagram for explaining an example of a multiview-image using service platform. The multiview-image using service platform 100 shown in FIG. 1 is a basic structure/environment that provides a user with services using multiview images each formed with images having different viewpoints. The multiview-image using service platform 100 has functions such as a cloud storage 101 and an application market 102.

The cloud storage 101 is a service that stores and manages multiview image data 111 that is data of multiview images. For example, a user who is registered in the multiview-image using service platform operates a multiview imaging device 121 to capture images of a subject, and obtains captured images with difference viewpoints as a multiview image. The user then operates the multiview imaging device 121 to supply the multiview image data to the multiview-image using service platform 100. The cloud storage 101 stores the supplied multiview image data, and manages the multiview image data for the user.

Based on the multiview image data and the like, the cloud storage 101 can also generate data related to the multiview image data, where necessary. Furthermore, the cloud storage 101 can provide the multiview image data being managed therein to the terminal device being operated by the user or the later described application, in response to a request from the user or the like.

The application market 102 is a service that performs some processing by using the multiview image data, provides a user with an application 112, sells the application 112 to the user, or executes the application 112. The application 112 is for providing the user with multiview-image using services. This application 112 may be executed by the multiview-image using service platform 100 or by a terminal device.

As this application 112 is executed, the user is provided with various highly-useful services such as games using multiview images, space combining, lens simulations, space recognitions, and sales supports.

Figure 2:
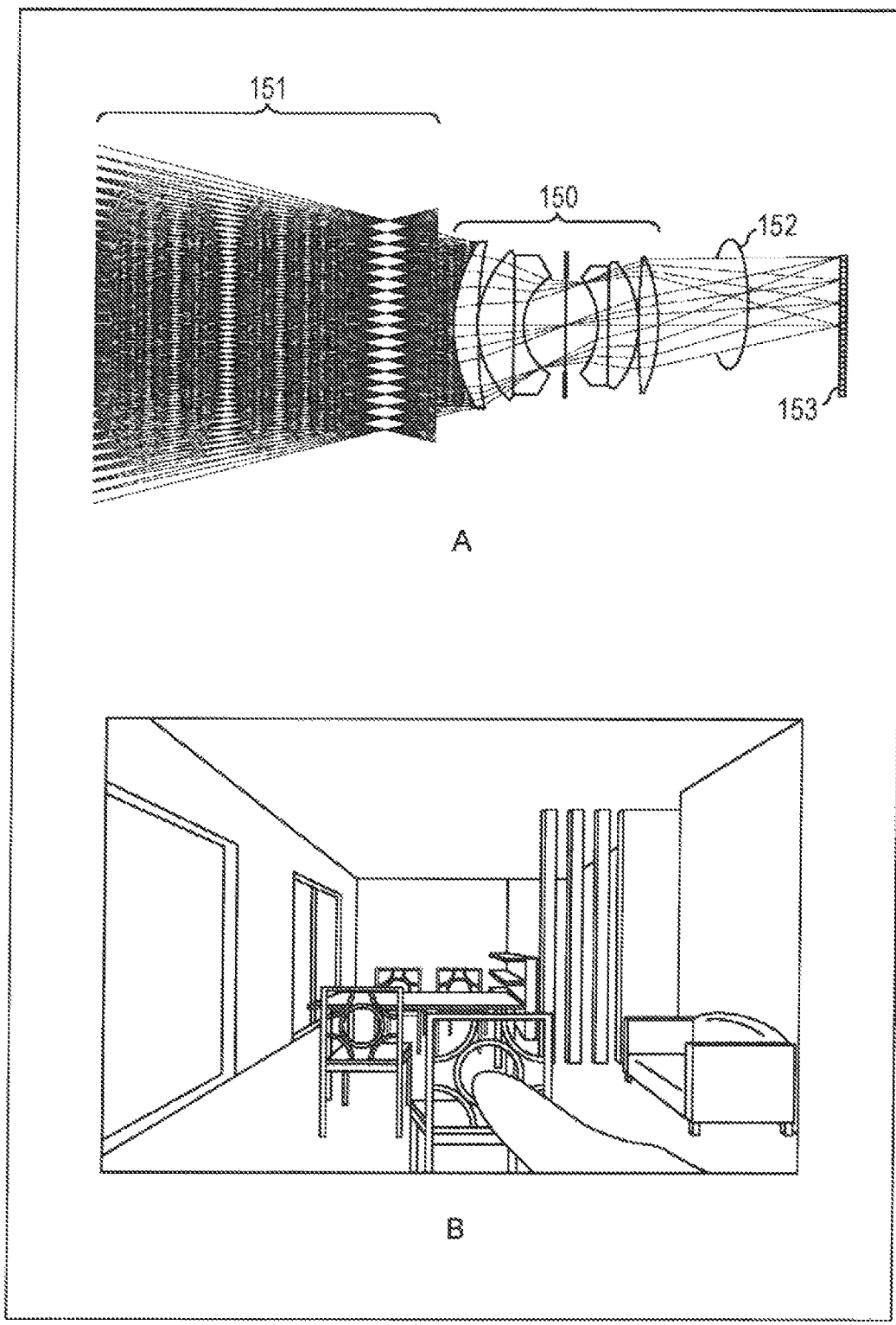
FIG. 2 is a diagram for explaining an example of an application that uses multiview images.

The services to be provided by the application 112 may be of any kinds as long as they use multiview images. For example, a lens simulation is a service that simulates a virtual optical system, and generates a virtual image of a subject captured by the virtual optical system, using a multiview image. In that case, the application 112 sets a virtual lens 150 as shown in FIG. 2A, and simulates a ray vector 151 that is light incident on the virtual lens 150 from the subject, a ray vector 152 that is the incident light after passing through the virtual lens 150, a virtual image sensor 153 that obtains a virtual captured image from the ray vector 152, and the like. Based on the above simulations, the application 112 generates a virtual captured image from a multiview image, and provides the user with the virtual captured image. The application 112 can also select or sell the virtual lens 150 that is set in the above manner, for example.

Through a lens simulation, a virtual lens can be set. Accordingly, an optical system of any type can be simulated. That is, through a lens simulation, an actual optical system or an unrealistic optical system can be simulated. As such a service is provided, the user can reproduce captured images obtained with various kinds of optical systems. For example, through such a lens simulation, the user can readily obtain an image captured with an optical system having a larger aperture than that of an optical system that obtains the respective captured images forming a multiview image. Also, through such a lens simulation, the user can more readily obtain an image with higher resolution than that of the respective images forming a multiview image, an image with a wide field of view, an image with a narrow field of view and a long focal length, or the like. Furthermore, through such a lens simulation, it is possible to readily obtain an image captured with a high-grade lens or an image captured with an unrealistic optical system, for example. In other words, the user can obtain various kinds of captured images at low costs.

A sales support is a service to support product sales by using multiview images, for example. Any products may be sold, and any measures may be taken to provide the support. For example, in this service, the product to be sold may be furniture, and images of furniture may be virtually arranged in a captured image as shown in FIG. 2B. In this case, the application 112 generates a captured image by superimposing the respective captured images of a multiview image on one another, arranges the images of furniture in the captured image by using three-dimensional modeling data (also referred to as 3D modeling data) and depth data indicating the distances to the subject in the multiview image, and provides the user with the combined image. The application 112 also sets the positions of the pieces of furniture to be arranged based on an operation of the user.

By virtue of such a service, the user can capture an image of his/her own room, and arrange images of furniture in desired positions in the captured image (or the image of his/her own room). Accordingly, the user can accurately assume the layout prior to the purchase. Specifically, through such a service, the user can reduce the pre-purchase anxiety that "the purchased furniture might be too big for my room", "the purchased furniture might not fit in my room", or the like. Accordingly, the user can be motivated to purchase. In this manner, the application 112 can support furniture sales.

As described above, the multiview-image using service platform 100 can not only generate and provide an image from a multiview image, but also manage data related to the user and multiview images, sell applications, and provide services using applications. Accordingly, various services that are very useful to the user can be provided. That is, the multiview-image using service platform 100 can increase the user-friendliness of the multiview-image using service.

Although a multiview image is formed with captured images in the above description, the number of images forming a multiview image is not fixed. Also, some or all of the images forming a multiview image may be unrealistic, or each of the images may be partially or entirely unrealistic like an artificially-drawn computer graphic image (that is, a multiview image may include an image that is not a captured image).

Also, the terminal device to which the multiview-image using service platform 100 is to provide services may be the multiview imaging device 121 being operated by the user owning a multiview image, may be a terminal device other than the multiview imaging device 121 being operated by the user, or may be a terminal device being operated by another user authorized to use the multiview image by the user.

Further, the multiview-image using service platform 100 may have any physical structure. For example, the multiview-image using service platform 100 may be formed with one server, or may be formed with more than one server. Also, some or all of the functions of the multiview-image using service platform 100 may be shared with other devices over a network, and be executed in cooperation with the other devices over a network, to realize a cloud computing structure. Furthermore, some or all of the functions of the multiview-image using service platform 100 may be executed by a terminal device.

Examples of services to be provided by the multiview-image using service platform 100 are described below in detail.

2. Second Embodiment

Management of Multiview Images

As described above in the first embodiment, the multiview-image using service platform 100 has the function of the cloud storage 101, and can provide a service to store and manage multiview image data. In this embodiment, the management of multiview images is described.

<Multiview-Image Using Service Providing System>

Figure 3:
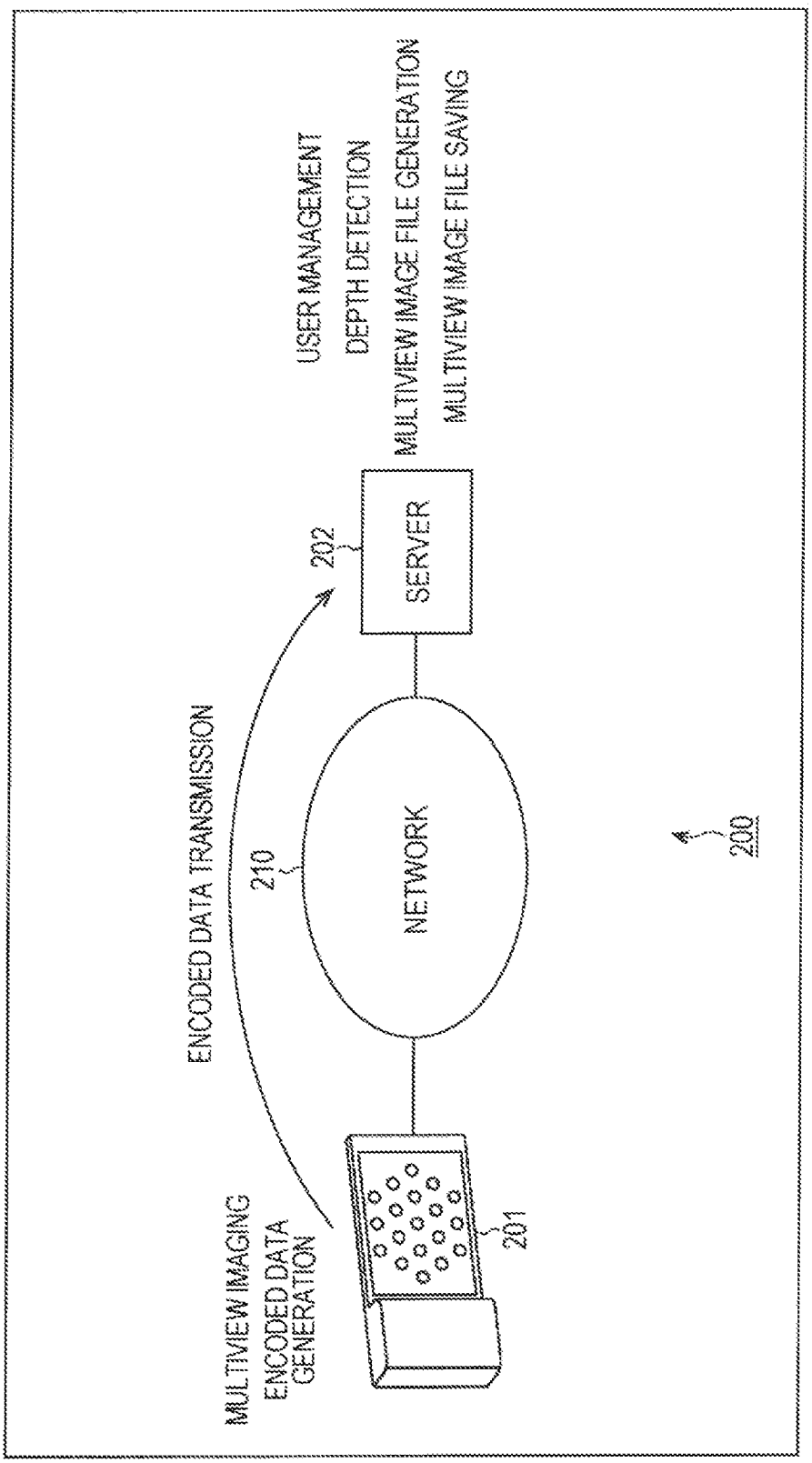
FIG. 3 is a diagram showing a typical example structure of a multiview-image using service providing system.

FIG. 3 is a diagram showing a typical example structure of a multiview-image using service providing system. The multiview-image using service providing system 200 shown in FIG. 3 is an example of a system to which the present technique is applied. In this system, a server 202 provides a multiview-image using service to a terminal device 201 connected thereto via a network 210. That is, the multiview-image using service providing system 200 is an example of a structure that realizes the multiview-image using service platform 100.

FIG. 3 shows an example of a structure related to the provision of a service related to management of multiview images among the services to be provided by the multiview-image using service platform 100. In FIG. 3, the multiview-image using service providing system 200 includes the terminal device 201 and the server 202 that are connected to the network 210.

The network 210 is a network such as the Internet or a local area network. The network 210 is formed with one or more wired and/or wireless networks. The terminal device 201 and the server 202 are connected to the network 210 in a wired or wireless manner.

The terminal device 201 captures images of a subject to perform multiview imaging and obtain a multiview image that is formed with captured images having different viewpoints from one another. The terminal device 201 then encodes the multiview image data, to generate multiview encoded data. The terminal device 201 transmits the generated multiview encoded data to the server 202.

The server 202 manages users that are registered in advance. The server 202 also acquires the transmitted multiview image encoded data, and detects the depth of the multiview image, to generate depth data. The server 202 further turns the data related to the multiview image into a file, to generate a multiview image file. The server 202 stores (saves) the generated multiview image file, and manages the stored file. The multiview image file being managed by the server 202 is provided to the terminal device 201 or an application to be executed, where necessary.

<Terminal Device>

Figure 4:
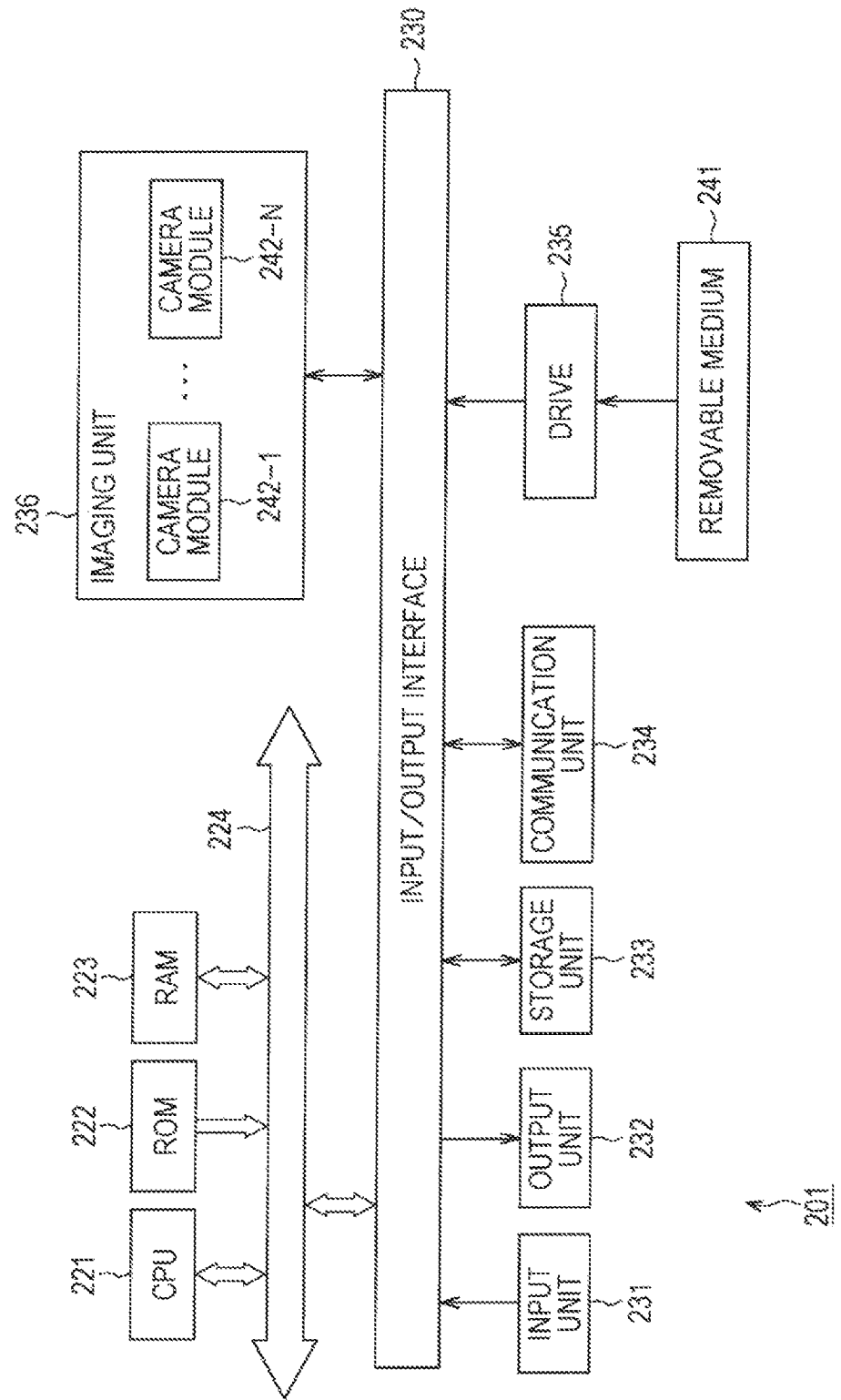
FIG. 4 is a block diagram showing a typical example structure of the terminal device.

FIG. 4 is a block diagram showing a typical example structure of the terminal device 201. As shown in FIG. 4, in the terminal device 201, a CPU (Central Processing Unit) 221, a ROM (Read Only Memory) 222, and a RAM (Random Access Memory) 223 are connected to one another via a bus 224.

An input/output interface 230 is also connected to the bus 224. An input unit 231, an output unit 232, a storage unit 233, a communication unit 234, and a drive 235 are connected to the input/output interface 230.

The input unit 231 is formed with an input device that receives external information such as a user input. The input unit 231 includes operation buttons, a touch panel, a microphone, and an input terminal, for example. The input unit 231 may also include various kinds of sensors, such as an acceleration sensor, an optical sensor, and a temperature sensor. The output unit 232 is formed with an output device that outputs information such as images and sound. The output unit 232 includes a display, a speaker, and an output terminal, for example.

The storage unit 233 is formed with a hard disk, a RAM disk, a nonvolatile memory, or the like. The communication unit 234 is formed with a network interface, for example. The drive 235 drives a removable medium 241 such as a magnetic disk, an optical disk, a magnetooptical disk, or a semiconductor memory.

The CPU 221 performs various kinds of processes by loading a program stored in the storage unit 233 into the RAM 223 via the input/output interface 230 and the bus 224, and executing the program. Necessary data for the CPU 221 to perform various kinds of processes and the like are also stored in the RAM 223 as appropriate.

The program to be executed by the CPU 221 can be recorded on the removable medium 241 as a packaged medium, for example, and be provided to the terminal device 201. In this case, the program can be installed into the storage unit 233 via the input/output interface 230 when the removable medium 241 is mounted in the drive 235.

Alternatively, the program can be provided to the terminal device 201 via a wired or wireless transmission medium such as a LAN, the Internet, or digital satellite broadcasting. In this case, the program can also be received by the communication unit 234 via a wired or wireless transmission medium, and be installed into the storage unit 233.

Also, the program can be installed in the ROM 222 or the storage unit 233 in advance.

An imaging unit 236 is further connected to the input/output interface 230. Under the control of the CPU 221, for example, the imaging unit 236 captures images of a subject to perform multiview imaging and obtain a multiview image formed with captured images having different viewpoints from one another. The imaging unit 236 includes camera modules 242-1 through 242-N. N is an integer that is 2 or greater. The camera modules 242-1 through 242-N have the same structures as one another, and perform the same processes as one another. Hereinafter, the camera modules 242-1 through 242-N will be referred to simply as the camera modules 242, as long as there is no need to distinguish them from one another.

Figure 5:
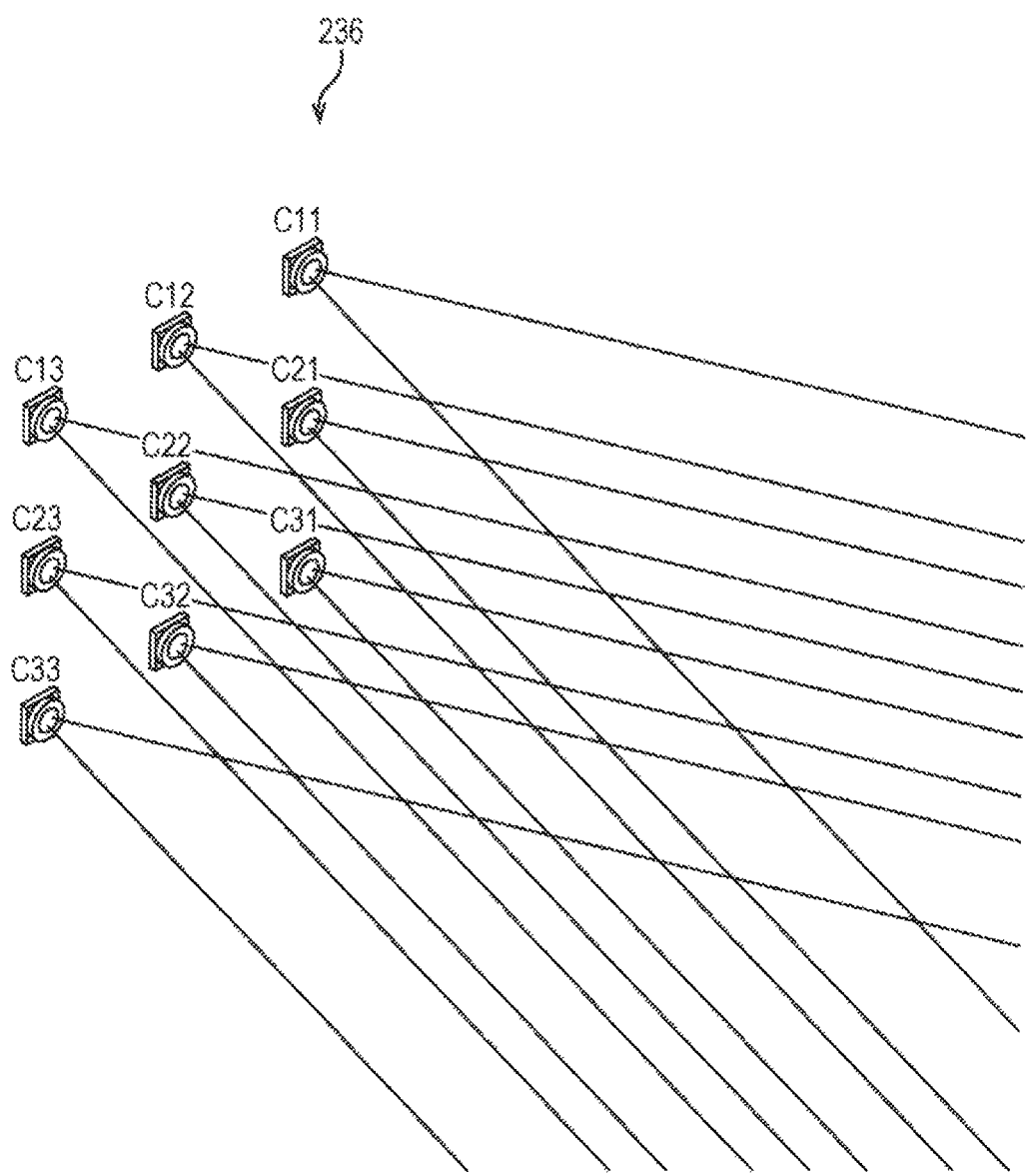
FIG. 5 is a diagram for explaining the outline of the imaging unit.

The camera modules 242 are modules that include optical systems having image sensors (imaging elements), and obtain captured images by capturing images of a subject. The respective camera modules 242 are arranged in different positions from one another on a flat surface or a curved surface, such as positions C11, C12, C13, C21, C22, C23, C31, C32, and C33 shown in FIG. 5. That is, the camera modules 242-1 through 242-N capture images of a subject, and obtain captured images having different viewpoints from one another.

Under the control of the CPU 221, for example, the imaging unit 236 captures images of a subject by using the camera modules 242-1 through 242-N, and obtains N (more than one) captured images having different viewpoints from one another. The imaging unit 236 obtains the captured images as a multiview image (multiview image data). That is, the imaging unit 236 performs multiview imaging by using the camera modules 242.

Under the control of the CPU 221, for example, the imaging unit 236 supplies the obtained multiview image data to the CPU 221 and the RAM 223 via the input/output interface 230, the bus 224, and the like, supplies and stores the obtained multiview image data into the storage unit 233 via the input/output interface 230, supplies the obtained multiview image data to the output unit 232 to output the multiview image data, or supplies the obtained multiview image data to the communication unit 234 to supply the multiview image data to the outside.

The angles of view and the imaging directions of the respective camera modules 242 may or may not be the same as one another. For example, in one of the camera modules 242, the angle of view and/or the imaging direction may differ from those of the other camera modules 242. Alternatively, the angles of view and the imaging directions of all the camera modules 242 may differ from one another. However, as will be described later, multiview captured images are to be superimposed on one another to generate an image. Therefore, at least some portions of the imaging ranges of the respective camera modules 242 (or the subject of the respective camera modules 242) preferably overlap with one another.

In multiview imaging, imaging conditions, such as the imaging timing, the exposure, and the aperture value, may or may not be the same among the camera modules 242. Also, the multiview image (or the respective captured images forming a multiview image) obtained by multiview imaging may be a still image or may be a moving image.

The imaging unit 236 may be provided as one component on the housing of the terminal device 201 at the time of the manufacture thereof, or may be designed as a module that is independent of the terminal device 201 but can be connected to the terminal device 201. For example, the imaging unit 236 may be an external component that is connected to an external terminal of the terminal device 201 and operates under the control of the terminal device 201. Further, the imaging unit 236 may be a device that is independent of the terminal device 201. For example, the imaging unit 236 may be an imaging device such as a camera that is independent of the terminal device 201, be connected to the terminal device 201 by a wired or wireless communication, and supply a multiview image obtained by multiview imaging to the terminal device 201.

<Server>

Figure 6:
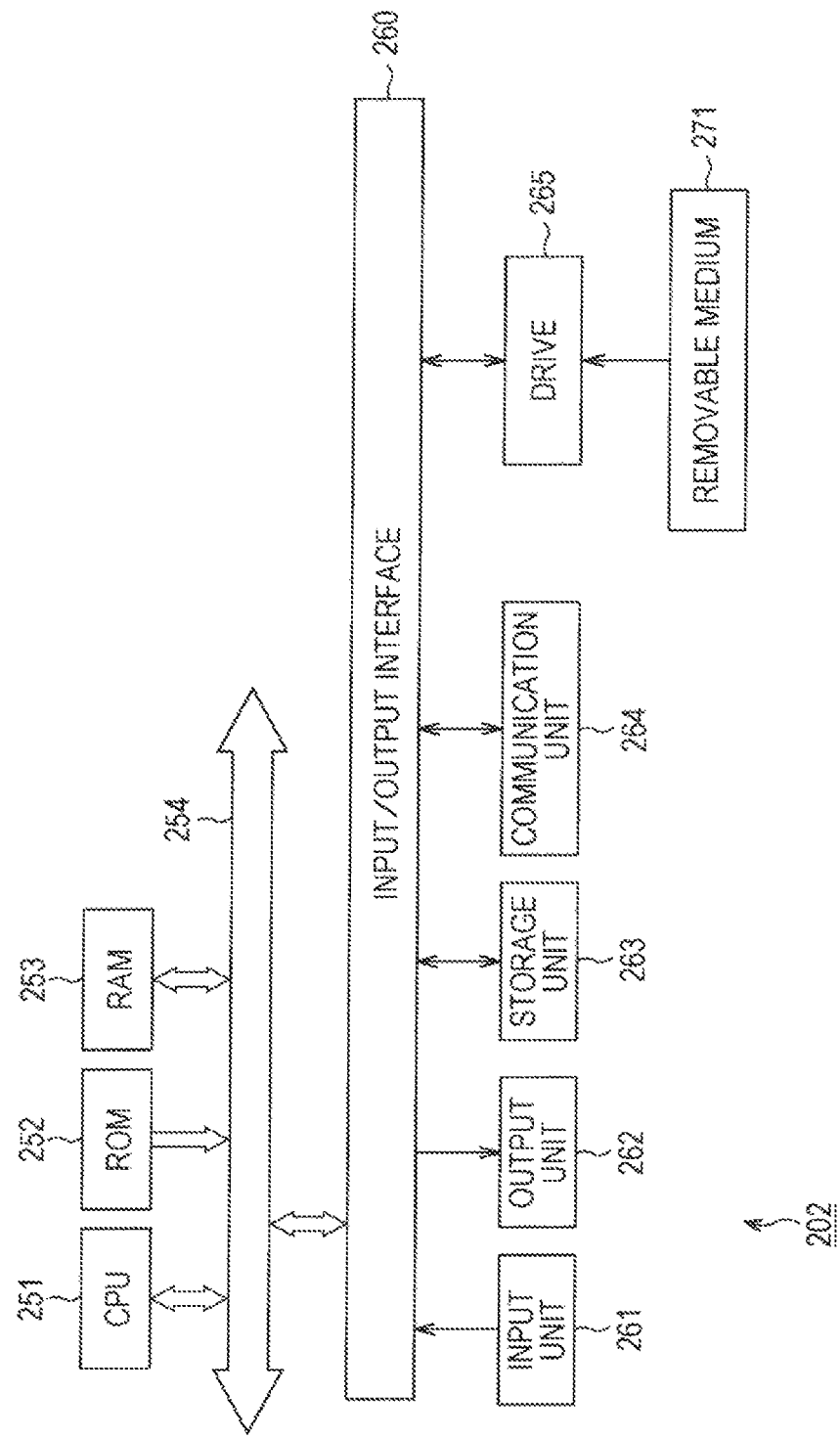
FIG. 6 is a diagram showing a typical example structure of the server.

FIG. 6 is a block diagram showing a typical example structure of the server 202. As shown in FIG. 6, in the server 202, a CPU 251, a ROM 252, and a RAM 253 are connected to one another via a bus 254.

An input/output interface 260 is also connected to the bus 254. An input unit 261, an output unit 262, a storage unit 263, a communication unit 264, and a drive 265 are connected to the input/output interface 260.

The input unit 261 is formed with an input device that receives external information such as a user input. The input unit 261 includes operation buttons, a touch panel, a microphone, a camera, and an input terminal, for example. The input unit 261 may also include various kinds of sensors, such as an acceleration sensor, an optical sensor, and a temperature sensor. The output unit 262 is formed with an output device that outputs information such as images and sound. The output unit 262 includes a display, a speaker, and an output terminal, for example.

The storage unit 263 is formed with a hard disk, a RAM disk, a nonvolatile memory, or the like. The communication unit 264 is formed with a network interface, for example. The drive 265 drives a removable medium 271 such as a magnetic disk, an optical disk, a magnetooptical disk, or a semiconductor memory.

The CPU 251 performs various kinds of processes by loading a program stored in the storage unit 263 into the RAM 253 via the input/output interface 260 and the bus 254, and executing the program. Necessary data for the CPU 251 to perform various kinds of processes and the like are also stored in the RAM 253 as appropriate.

The program to be executed by the CPU 251 can be recorded on the removable medium 271 as a packaged medium, for example, and be provided to the server 202. In this case, the program can be installed into the storage unit 263 via the input/output interface 260 when the removable medium 271 is mounted in the drive 265.

Alternatively, the program can be provided to the server 202 via a wired or wireless transmission medium such as a LAN, the Internet, or digital satellite broadcasting. In this case, the program can also be received by the communication unit 264 via a wired or wireless transmission medium, and be installed into the storage unit 263.

Also, the program can be installed in the ROM 252 or the storage unit 263 in advance.

<Functional Blocks>

Figure 7:
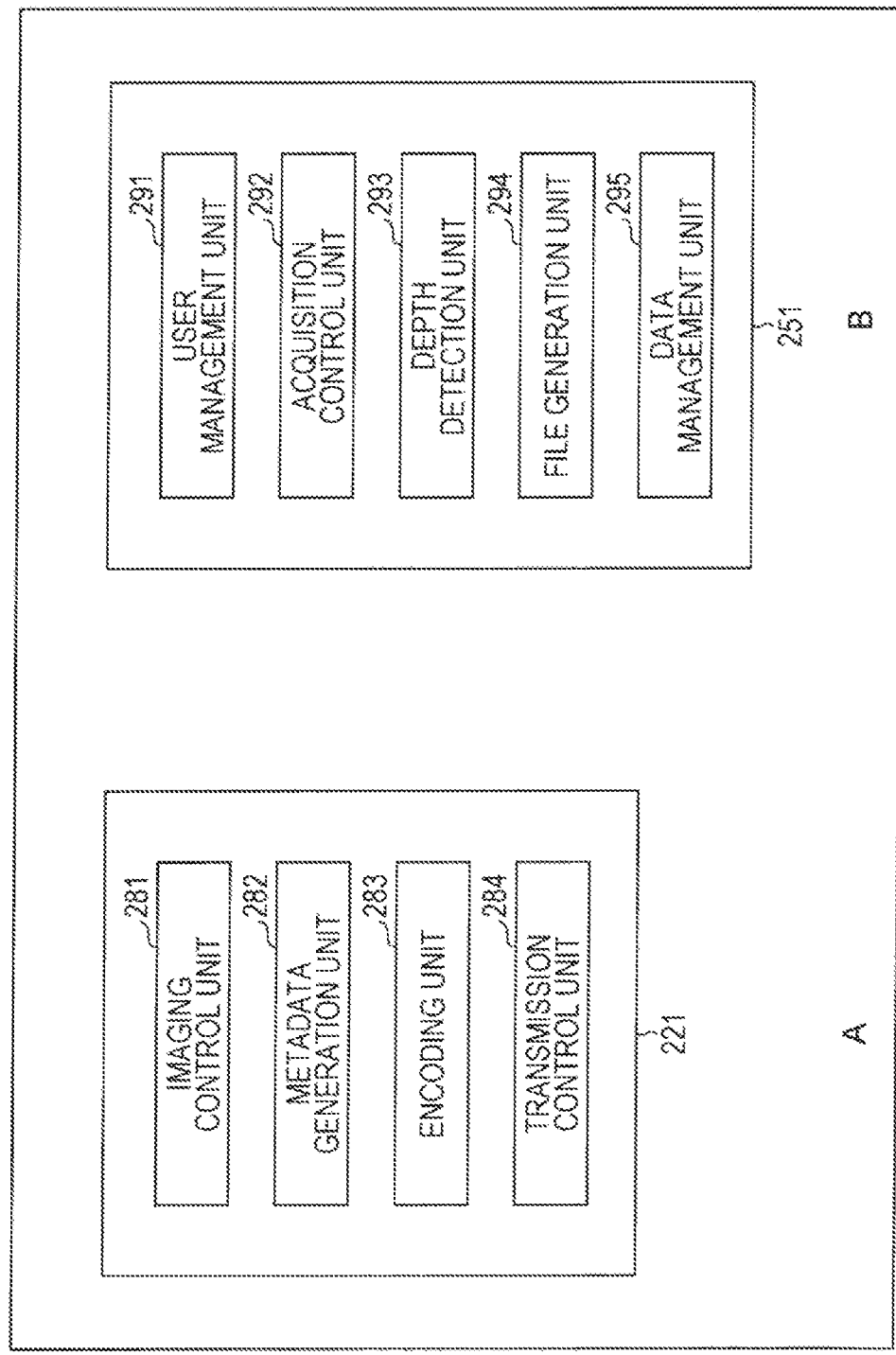
FIG. 7 is a functional block diagram for explaining the functions of the terminal device and the server.

The terminal device 201 has functions shown as functional blocks in FIG. 7A, as the CPU 221 executes a predetermined program. As shown in FIG. 7A, the CPU 221 has functional blocks such as an imaging control unit 281, a metadata generation unit 282, an encoding unit 283, and a transmission control unit 284.

The imaging control unit 281 performs a process related to multiview imaging control. The metadata generation unit 282 performs a process related to generation of metadata of a multiview image obtained by multiview imaging. The encoding unit 283 performs a process related to encoding of a multiview image. The transmission control unit 284 performs a process related to transmission control for multiview image data and the like.

Meanwhile, the server 202 has functions shown as functional blocks in FIG. 7B, as the CPU 251 executes a predetermined program. As shown in FIG. 7B, the CPU 251 has functional blocks such as a user management unit 291, an acquisition control unit 292, a depth detection unit 293, a file generation unit 294, and a data management unit 295.

Figure 8:
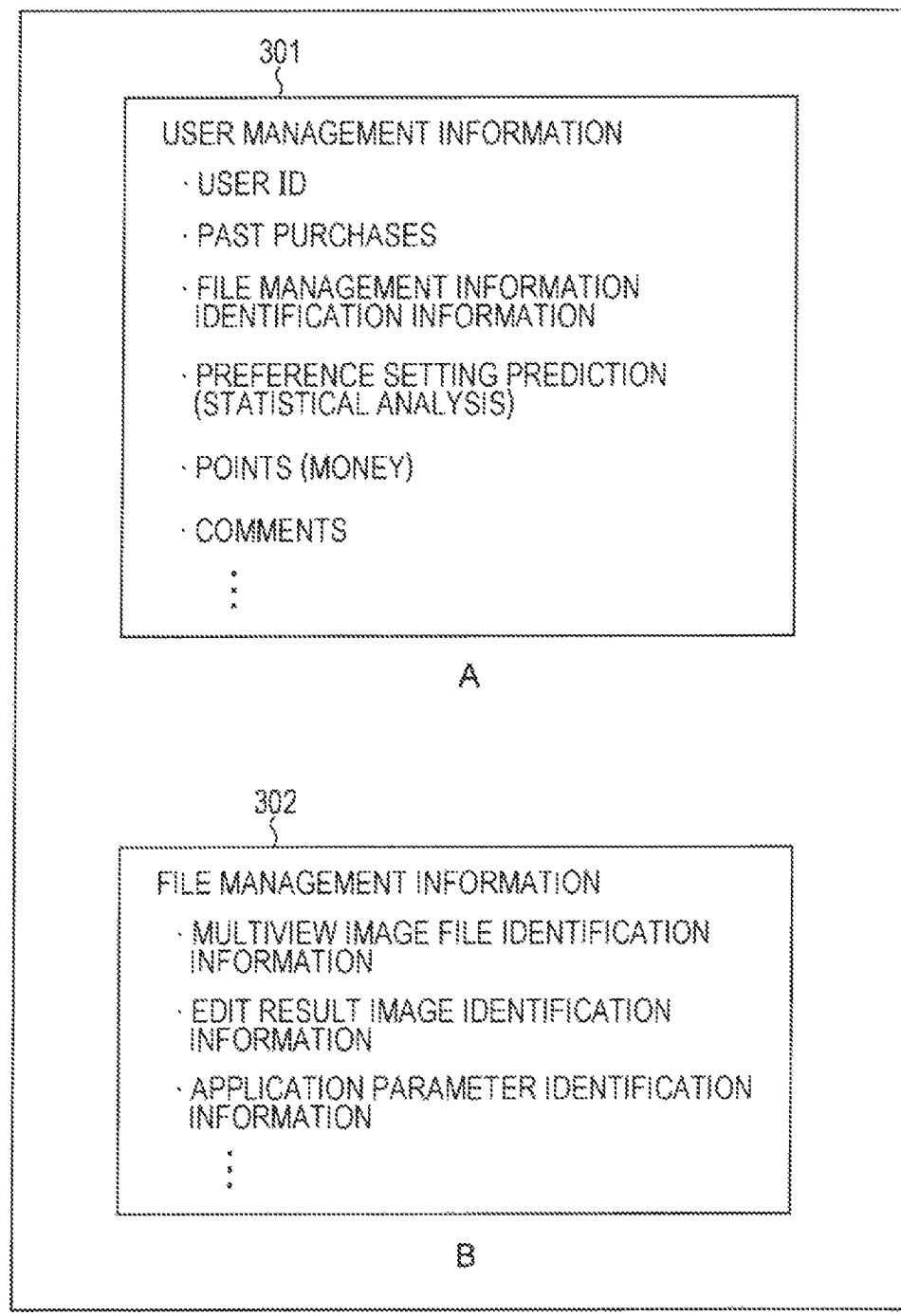
FIG. 8 is a diagram showing an example of the information being managed by the server.

The user management unit 291 performs a process related to management of users to whom multiview-image using services are to be provided. For each user, the user management unit 291 stores and manages, in the storage unit 263, user management information 301 shown in FIG. 8A, for example. As shown in FIG. 8A, the user management information 301 includes a user ID as the identification information about a user, the past purchases by the user, file management information identification information as the identification information for the file management information associated with the user (or registered with the user), preference setting predictions that are information predictive of the settings preferred by the user based on a statistical analysis or the like, the points (or money) held by the user, comments sent to/from other users, and the like. The user management information 301 may of course include any information. Some of the above described information may be excluded, or information other than the above described information may be included.

The acquisition control unit 292 performs a process related to control on acquisition of information such as multiview image data and the like transmitted from the terminal device 201. The depth detection unit 293 performs a process related to detection of the depth value of a multiview image. The file generation unit 294 performs a process related to generation of a multiview image file from various kinds of data including multiview image data.

The data management unit 295 performs a process related to management of data such as a multiview image file. For each multiview image file, the data management unit 295 stores and manages, in the storage unit 263, file management information 302 shown in FIG. 8B, for example. As shown in FIG. 8B, the file management information 302 includes multiview image file identification information that is the identification information for a multiview image file, edit result image identification information that is associated with the multiview image file and is the identification information for an edit result image as the result of editing of a multiview image, application parameter identification information as the identification information for an application parameter that is associated with the multiview image file and is the history of application execution using the multiview image, and the like. The file management information 302 may of course include any information. Some of the above described information may be excluded, or information other than the above described information may be included.

<Flow of a Multiview-Image Using Service Providing Process>

The terminal device 201 and the server 202 of the multiview-image using service providing system having the above described structure perform a multiview-image using service providing process to provide a service using multiview images, or provide a service such as management of multiview images in this embodiment. Referring now to the flowchart shown in FIG. 9, an example flow of the multiview-image using service providing process to be performed by those devices is described.

Figure 10:
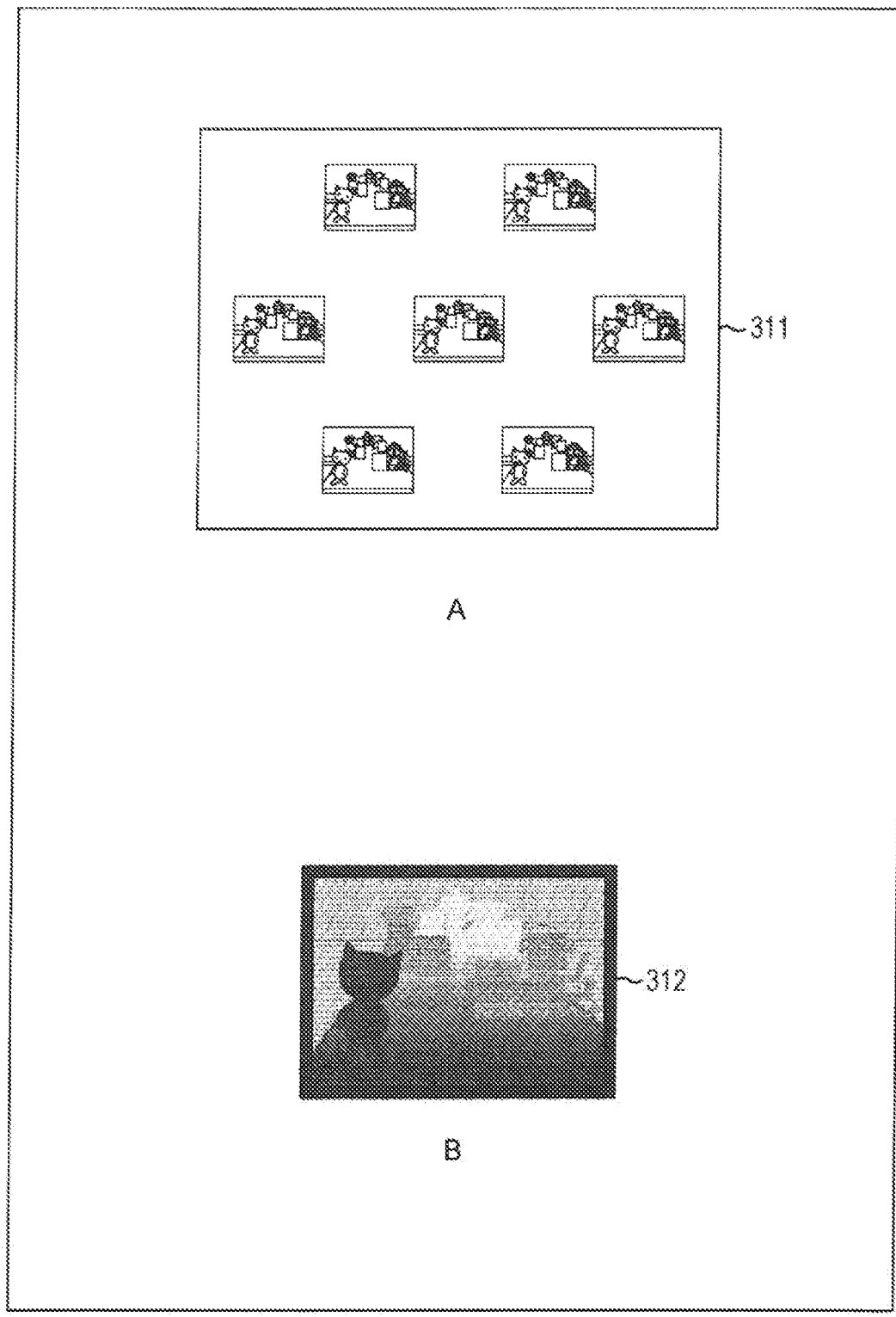
FIG. 10 is a diagram showing an example of a multiview image and depth data.

In step S101, the imaging control unit 281 of the terminal device 201 controls the imaging unit 236 to perform multiview imaging on a subject and obtain a multiview image. For example, the imaging control unit 281 performs multiview imaging to obtain a multiview image 311 formed with captured images having different viewpoints from one another as shown in FIG. 10A.

Referring back to FIG. 9, after multiview image data is obtained by the multiview imaging, the metadata generation unit 282 in step S102 generates metadata of the multiview image data. As will be described later in detail, the metadata include array information indicating the relative positional relationship among the respective viewpoints of the multiview image, and viewpoint number information indicating the number of viewpoints of the multiview image. That is, the metadata generation unit 282 generates metadata including the array information and the viewpoint number information, and associates the multiview image data with the information.

In step S103, the encoding unit 283 encodes the multiview image data by a predetermined encoding method, to generate multiview image encoded data. The encoding method may be any method, as long as image data is encoded by the method. For example, the encoding method may be an existing encoding method such as JPEG (Joint Photographic Experts Group) or MPEG (Moving Picture Experts Group), or may be a novel encoding method designed for multiview images. After the encoding of the multiview image data, the above described metadata (such as the array information and the viewpoint number information) of the multiview image data is associated with the multiview image encoded data (or is turned into metadata of the multiview image encoded data) by the metadata generation unit 282.

In step S104, the transmission control unit 284 controls the communication unit 234 to transmit the multiview image encoded data generated in step S103, as well as the metadata generated in step S102, to the server 202. For example, the transmission control unit 284 transmits the multiview image encoded data and the metadata as a bit stream or auxiliary information about a bit stream.

In step S111, the acquisition control unit 292 of the server 202 controls the communication unit 264, to acquire the multiview image encoded data and its metadata transmitted from the terminal device 201 in step S104.

In step S112, the depth detection unit 293 decodes the multiview image encoded data acquired in step S111 by a decoding method compatible with the encoding method used in step S103.

In step S113, the depth detection unit 293 detects the depth of the multiview image to generate depth data, using the multiview image data obtained by decoding the multiview image encoded data in step S112. For example, the depth detection unit 293 generates a depth map 312 as the depth data showing the distances to the subject with degrees of luminance and colors on a pixel-to-pixel basis as shown in FIG. 10B. The depth detection will be described later in detail.

Referring back to FIG. 9, after generating the depth data, the depth detection unit 293 in step S114 encodes the multiview image data from which the depth has been detected, to generate multiview image encoded data. The encoding method may be any method, as long as image data is encoded by the method. For example, the encoding method may be an existing encoding method such as JPEG or MPEG, or may be a novel encoding method designed for multiview images. The encoding method may or may not be the same as the encoding method used in step S103. The depth detection unit 293 associates the generated depth data with the multiview image encoded data.

The depth detection (the depth data generation) may be performed in a device other than the server 202. For example, the depth detection may be performed in the terminal device 201. In that case, the CPU 221 of the terminal device 201 further includes the necessary functional block such as the depth detection unit 293 as appropriate. In such a case, the depth detection unit 293 detects a depth prior to the encoding of the multiview image data by the encoding unit 283 (prior to the processing in step S103). In step S103, the encoding unit 283 encodes the multiview image data, as described above. The depth detection unit 293 then associates the depth data with the multiview image encoded data, and the metadata generation unit 282 associates the metadata (such as the array information and the viewpoint number information) with the multiview image encoded data.

In step S115, the file generation unit 294 generates a multiview image file containing the multiview image encoded data generated in step S114, the meta data, and the depth data generated in step S113. The format of the multiview image file may be of any type. In a case where the multiview image is a still image, for example, the multiview image may be turned into a file in the Exif (Exchangeable image file format) file format. In a case where the multiview image is a moving image, for example, the multiview image may be turned into a file in the MP4 (MPEG-4 Part 14) file format. It is of course possible to use a file format other than the above.

Figure 11:
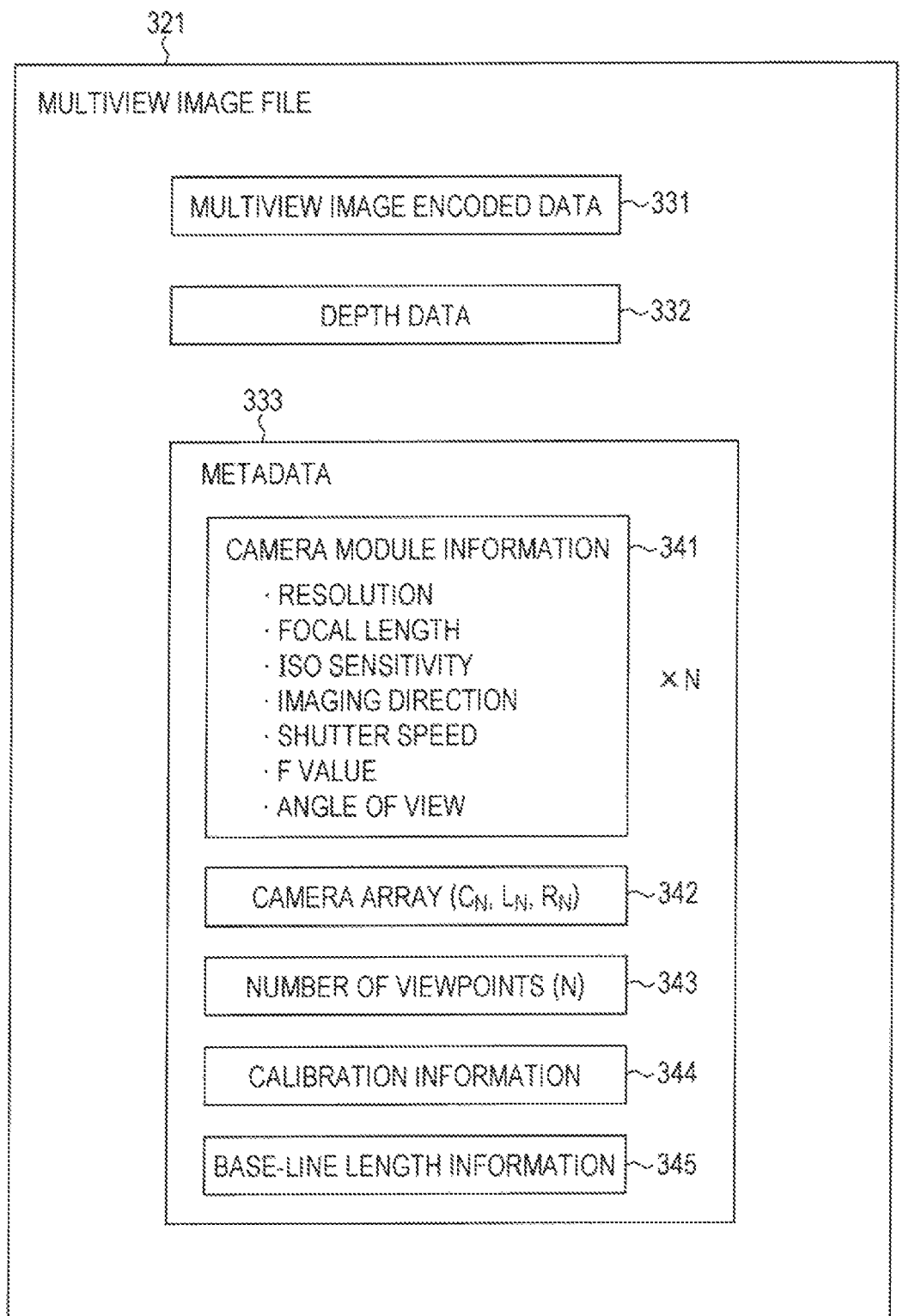
FIG. 11 is a diagram showing a typical example structure of a multiview image file.

The file generation unit 294 generates a multiview image file 321 having the structure shown in FIG. 11, for example.

In the example shown in FIG. 11, the multiview image file 321 contains multiview image encoded data 331, depth data 332, and metadata 333.

The multiview image encoded data 331 is the multiview image encoded data generated in step S114. The depth data 332 is the depth data generated in step S113, and is the depth data of the multiview image of the multiview image encoded data 331. The metadata 333 is the metadata generated in step S102, and is the metadata of the multiview image encoded data 331.

As shown in FIG. 11, the metadata 333 includes camera module information 341, camera array information 342, viewpoint number information 343, calibration information 344, and base-line length information 345, for example.

The camera module information 341 is the information related to imaging performed to obtain the multiview image, or is the information about the respective camera modules 242 of the imaging unit 236. In a case where N camera modules 242 are provided in the imaging unit 236, for example, the metadata 333 includes N pieces of camera module information 341. As shown in FIG. 11, the camera module information 341 includes information such as resolution, focal lengths, ISO sensitivity, imaging directions, shutter speeds, F values, and angles of view. The camera module information 341 may of course have any structure. Some of the information may be excluded, or information other than the above may be included.

Figure 12:
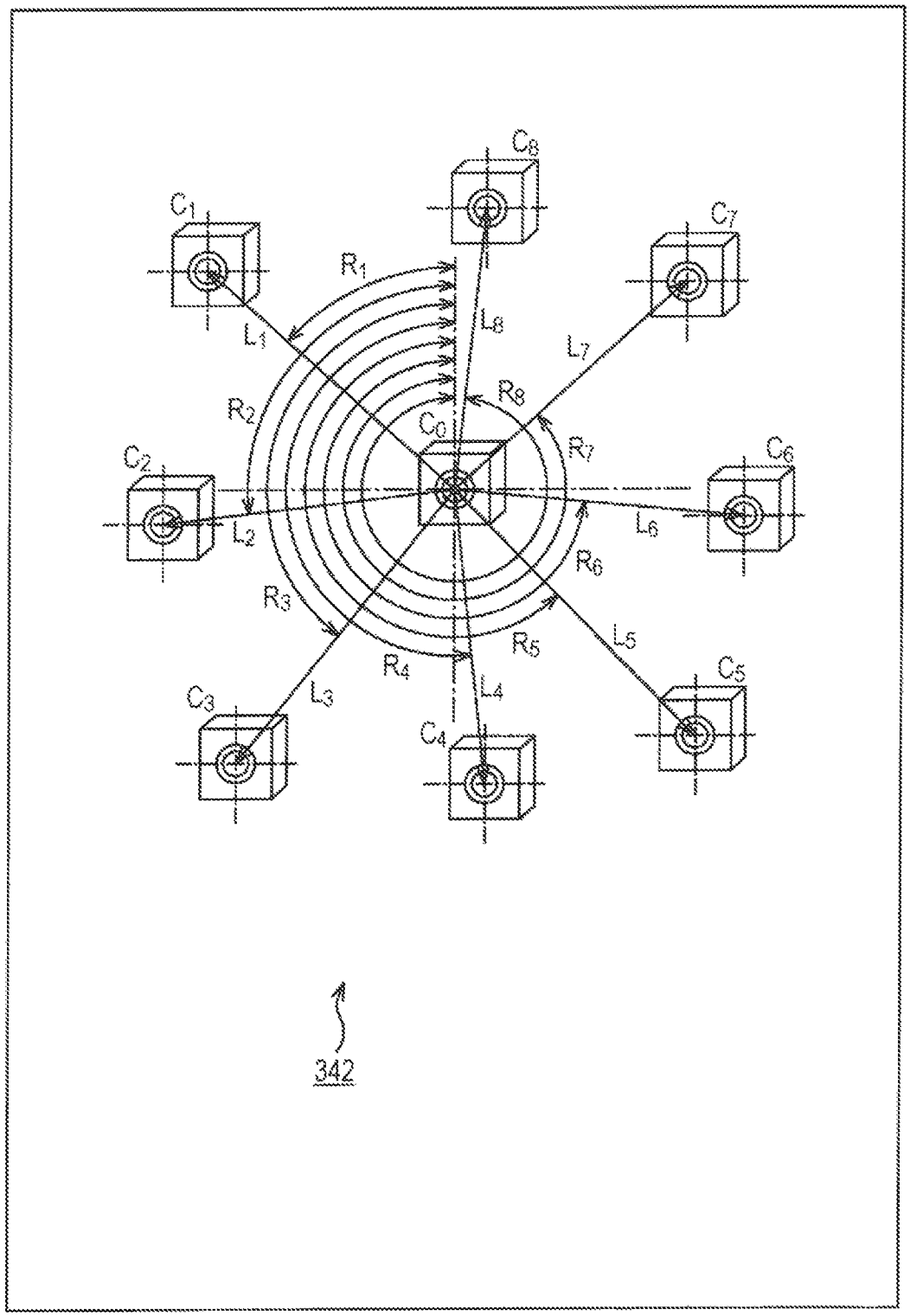
FIG. 12 is a diagram for explaining an example of a camera array.

The camera array information 342 is the information that indicates the relative positional relationship among the respective camera modules 242. That is, the camera array information 342 is the information that indicates the relative positional relationship among the respective viewpoints of the multiview image. As shown in FIG. 12, the camera array information 342 includes the distances $L_x$ (x=1 to 8 in the example shown in FIG. 12) from the reference camera module $C_0$ to the other camera modules $C_x$ (or the distances $L_x$ from the reference viewpoint to the respective viewpoints), and the directions $R_x$ from the reference camera module $C_0$ toward the other camera modules $C_x$ (or the directions $R_x$ from the reference viewpoint to the respective viewpoints), for example.

The viewpoint number information 343 is the information that indicates the number of the camera modules 242 (the number of the viewpoints). The calibration information 344 is the information that indicates variations of the respective camera modules 242. The base-line length information 345 is the information that indicates the reference length in the multiview image.

The metadata 333 may have any structure. Some of the information may be excluded, or information other than the above may be included.

FIG. 13 is a diagram showing example structures of the respective data in the metadata. As shown in FIG. 13A, the camera module information 341 may include information such as the resolution, the focal length, the ISO sensitivity, the imaging direction, the shutter speed, the F value, and the angle of view of each of the camera modules 242.

If those parameters of the respective camera modules 242 have different values from one another, the selection of the captured images to be superimposed on one another, the mixture ratios of the captured images, and are controlled in accordance with the values of the parameters when the respective captured images of the multiview image are superimposed on one another. In this manner, an image with higher quality can be obtained. For example, only captured images having those parameters closer to desired values are superimposed on one another, or captured images having those parameters closer to the desired values are combined at higher rates (the combination ratios of those captured images are made higher), so that an image having those parameters closer to the desired values can be easily obtained. As a result, unnecessary image processing to change the parameters can be reduced. Accordingly, image quality degradation due to the image processing can be reduced (an image with higher quality can be obtained).

Also, as the respective captured images have various values as the parameters, a captured image having parameters closer to the desired values can be obtained, regardless of the values of the parameters of the image obtained as a result of the superimposition. That is, an image with higher quality can be obtained, regardless of the values of the parameters.

The camera array information 342 may indicate the array of the camera modules 242 with the relative positional relationship ($C_N$, $L_N$, $R_N$) as in the example shown in FIG. 11, or may indicate a predetermined type of array such as "X type" as in the example shown in FIG. 13A. The degree of freedom of the array can be increased in the example shown in FIG. 11. An increase in the amount of information in the metadata can be reduced in the example shown in FIG. 13.

The viewpoint number information 343 is shown as a number as in the example shown in FIG. 13A.

The calibration information 344 may be formed with the information that indicates the positions of the respective viewpoints of the multiview image, for example. In the example shown in FIG. 13A, the calibration information 344 is formed with the coordinate information about the respective camera modules 242 (or the information indicating the central coordinates of the respective camera modules 242). Alternatively, the calibration information 344 may be formed with information that corrects the degrees of luminance of the respective images of the multiview image, for example. In the example shown in FIG. 13B, the calibration information 344 is formed with luminance correction data information about the respective camera modules 242.

The base-line length information 345 may include the information that indicates the distances from the reference viewpoint to the respective viewpoints of the multiview image, for example. In the example shown in FIG. 13C, the base-line length information 345 includes the information that indicates the distances from the reference camera module 242 to the other camera modules 242.

Referring back to FIG. 9, in step S116, the data management unit 295 supplies and stores the multiview image file generated in step S115 into the storage unit 263, and generates and manages the file management information 302 about the multiview image file. Also, the user management unit 291 updates the user management information 301 about the user stored in the storage unit 263, and registers the multiview image file associated with the user.

When the processing in step S116 is finished, the multiview-image using service providing process comes to an end.

As such a multiview-image using service providing process is performed, a user can more easily register multiview image data obtained by multiview imaging in the server 202. Also, the multiview image data and the data related to the multiview image (such as depth data and metadata) are turned into a file and are then managed. Accordingly, the user can more easily use the multiview image data he/she has registered. That is, the multiview-image using service providing system 200 (the multiview-image using service platform 100) can increase the user-friendliness of the multiview-image using service.

In the above description, multiview imaging is performed by using the imaging unit 236 including the camera modules 242, to generate a multiview image (multiview image data). However, a multiview image (multiview image data) may be generated by any method. For example, a multiview image may be generated by performing imaging (capturing a moving image or capturing still images) while moving the imaging position and the imaging direction (or the viewpoint) by using an imaging unit including a single imaging element and an optical system (or an imaging unit including a single camera module 242). In that case, the information about the changes in the imaging position and the imaging direction (or the viewpoint) is preferably associated as metadata with multiview image data (multiview image encoded data).

Also, in the above description, the multiview image file generated by the file generation unit 294 is stored and managed in the storage unit 263 of the server 202. However, a multiview image file may be managed in any other site. For example, a multiview image file may be stored and managed in a device other than the server 202 (such as a file management server (not shown)). In that case, the file generation unit 294 transmits the generated multiview image file as a bit stream or auxiliary information about a bit stream to the device via the communication unit 264, for example. In that case, the device includes a communication unit that acquires the multiview image file by communicating with the server 202, a storage unit that stores the acquired multiview image file, and a data management unit as the functional block that manages the multiview image file stored in the storage unit, updates the multiview image file or supplies the multiview image file to another device such as the terminal device 201 or the server 202 where necessary.

Further, in the above description, a multiview image file is generated in the server 202. However, a multiview image file may be generated in any device. For example, a multiview image file may be generated in the terminal device 201. In that case, the CPU 221 of the terminal device 201 further includes the necessary functional block such as the file generation unit 294 as appropriate. In such a case, the file generation unit 294 generates a multiview image file after multiview image data is encoded by the encoding unit 283 (or after the processing in step S103). In step S104, the transmission control unit 284 transmits the multiview image file as a bit stream or auxiliary information about a bit stream to the server 202, for example. In step S111, the acquisition control unit 292 controls the communication unit 264, to acquire the multiview image file.

<Flow of the Depth Detection Process>

Figure 9:
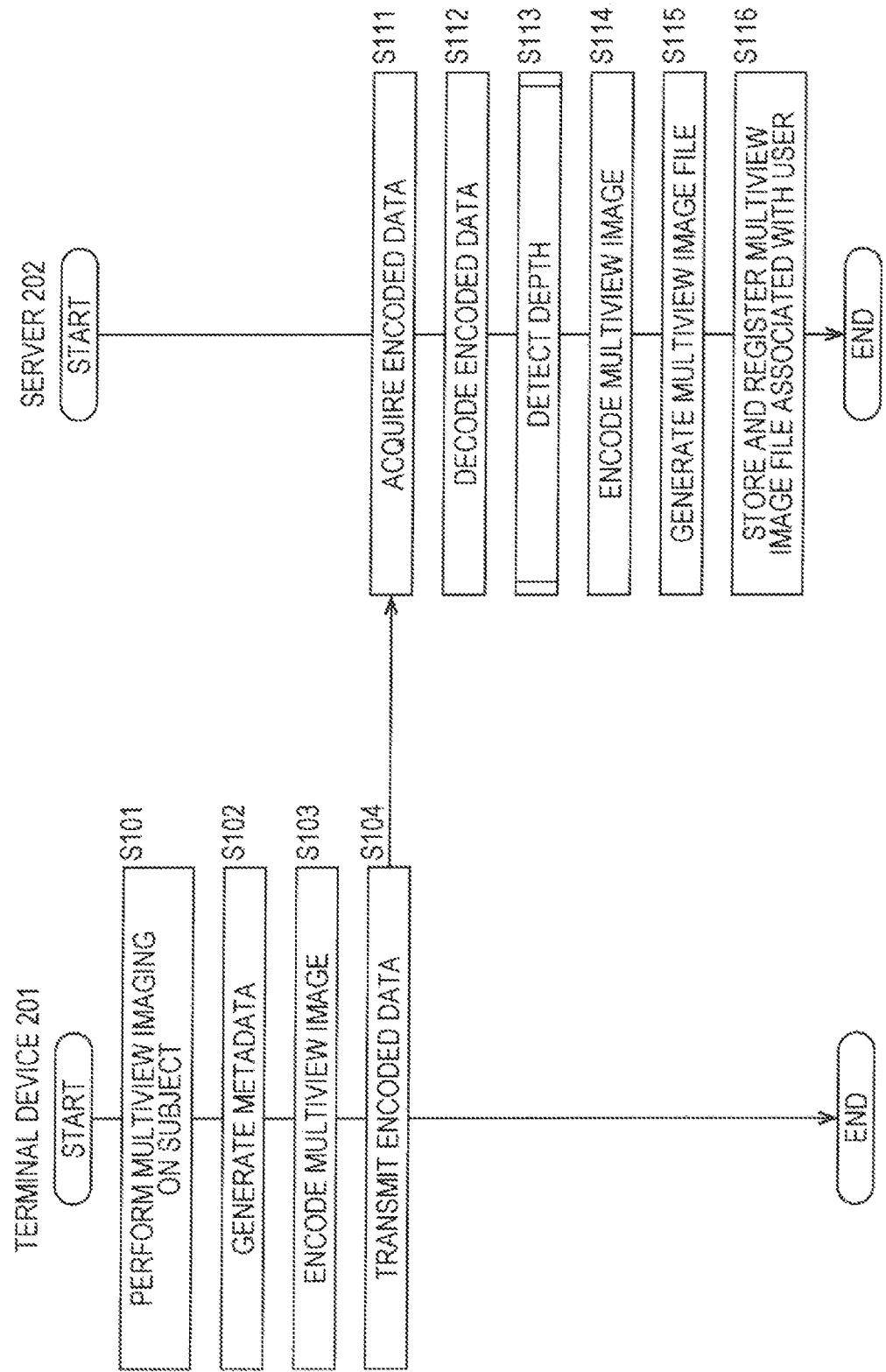
FIG. 9 is a flowchart showing an example flow of a multiview-image using service providing process.
Figure 14:
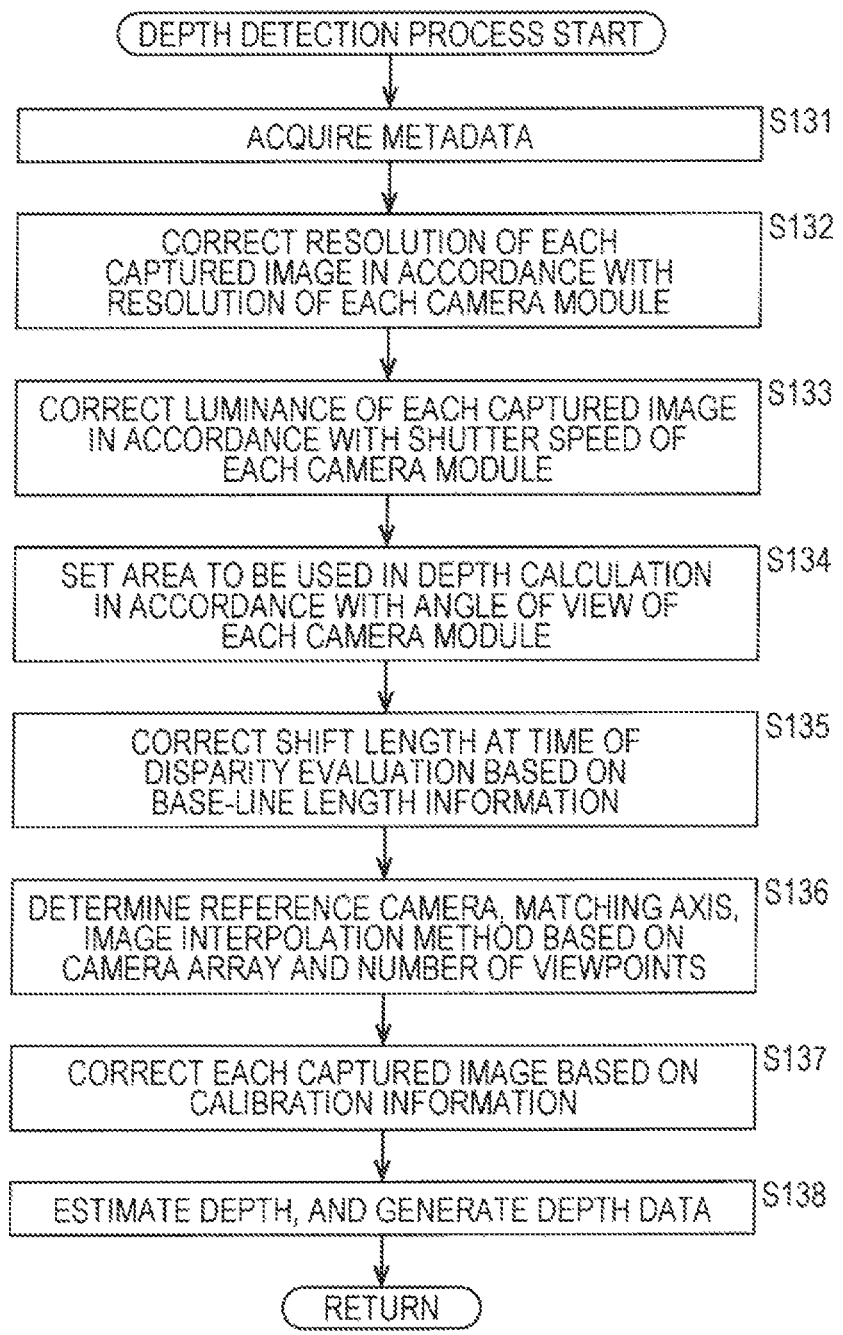
FIG. 14 is a flowchart for explaining an example flow of a depth detection process.

Referring now to the flowchart in FIG. 14, an example flow of the depth detection process to be performed in step S113 in FIG. 9 is described.

When the depth detection process is started, the depth detection unit 293 acquires the metadata 333 in step S131. In step S132, the depth detection unit 293 corrects the resolution of each of the captured images in accordance with the resolution and the like of each of the camera modules 242.

In step S133, the depth detection unit 293 corrects the luminance of each of the captured images in accordance with the shutter speed and the like of each of the camera modules 242. In step S134, the depth detection unit 293 sets the area to be used in the depth calculation in accordance with the angle of view of each of the camera modules 242.

In step S135, the depth detection unit 293 corrects the shift length at the time of disparity evaluation based on the base-line length information 345 and the like. In step S136, the depth detection unit 293 determines the reference camera, the matching axis, the image interpolation method, and the like based on the camera array, the number of viewpoints, and the like.

In step S137, the depth detection unit 293 corrects each of the captured images based on the calibration information 344. In step S138, the depth detection unit 293 estimates the depth by repeating stereo matching or the like, and detects depth data.

After the depth data is detected, the process returns to the process shown in FIG. 9.

As the depth detection process is performed in the above described manner, a user can generate and use depth data more easily.

3. Third Embodiment

Application Sales

As described above in the first embodiment, the multiview-image using service platform 100 can provide a service to sell the application 112 through the application market 102, for example. In this embodiment, the sales of the application are described.

<Multiview-Image Using Service Providing System>

Figure 15:
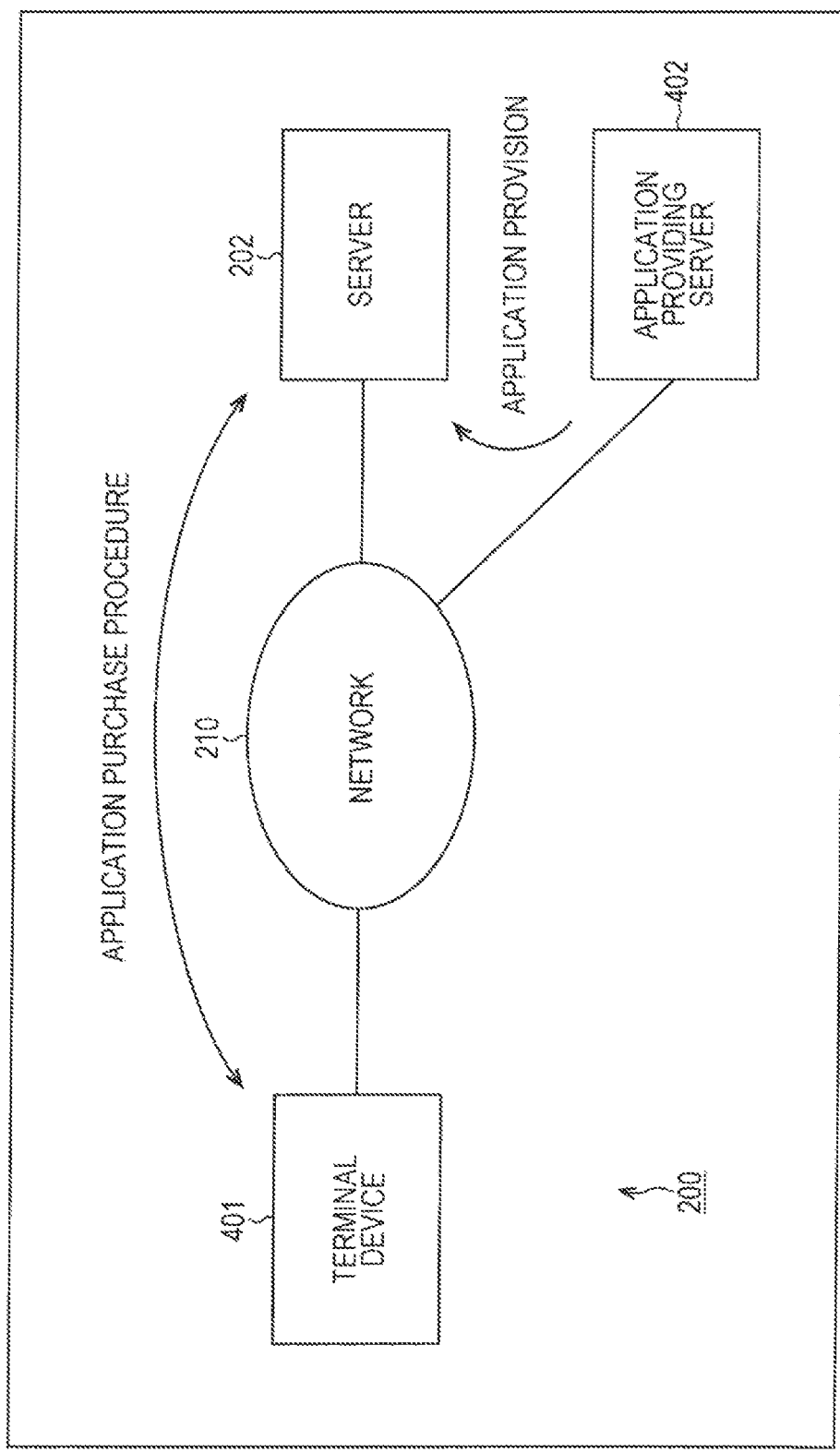
FIG. 15 is a diagram showing another typical example structure of a multiview-image using service providing system.

FIG. 15 is a diagram showing a typical example structure of a multiview-image using service providing system. The multiview-image using service providing system 200 shown in FIG. 15 is an example of a system to which the present technique is applied. In this system, a server 202 provides a multiview-image using service to a terminal device 401 connected thereto via a network 210. That is, the multiview-image using service providing system 200 is an example of a structure that realizes the multiview-image using service platform 100.

FIG. 15 shows an example of a structure related to the provision of a service related to sales or provision of the application 112 among the services to be provided by the multiview-image using service platform 100. In FIG. 15, the multiview-image using service providing system 200 includes the terminal device 401, the server 202, and an application providing server 402 that are connected to the network 210.

The terminal device 401 connected to the network 210 in a wired or wireless manner communicates with the server 202, to carry out the procedure to purchase the application 112. The terminal device 401 may be the same as the terminal device 201, or may differ from the terminal device 201. The terminal device 401 basically has the same structure as the terminal device 201. Therefore, the structure illustrated in FIG. 4 can also be applied to the terminal device 401. In the case of the terminal device 401, however, the functions related to imaging are unnecessary. Therefore, the imaging unit 236 can be omitted.

The application providing server 402 is the server that provides the application 112 to the multiview-image using service platform 100 (the application market 102). The server 202 sells or provides the application provided by the application providing server 402 to (the user of) the terminal device 401.

<Server>

Figure 16:
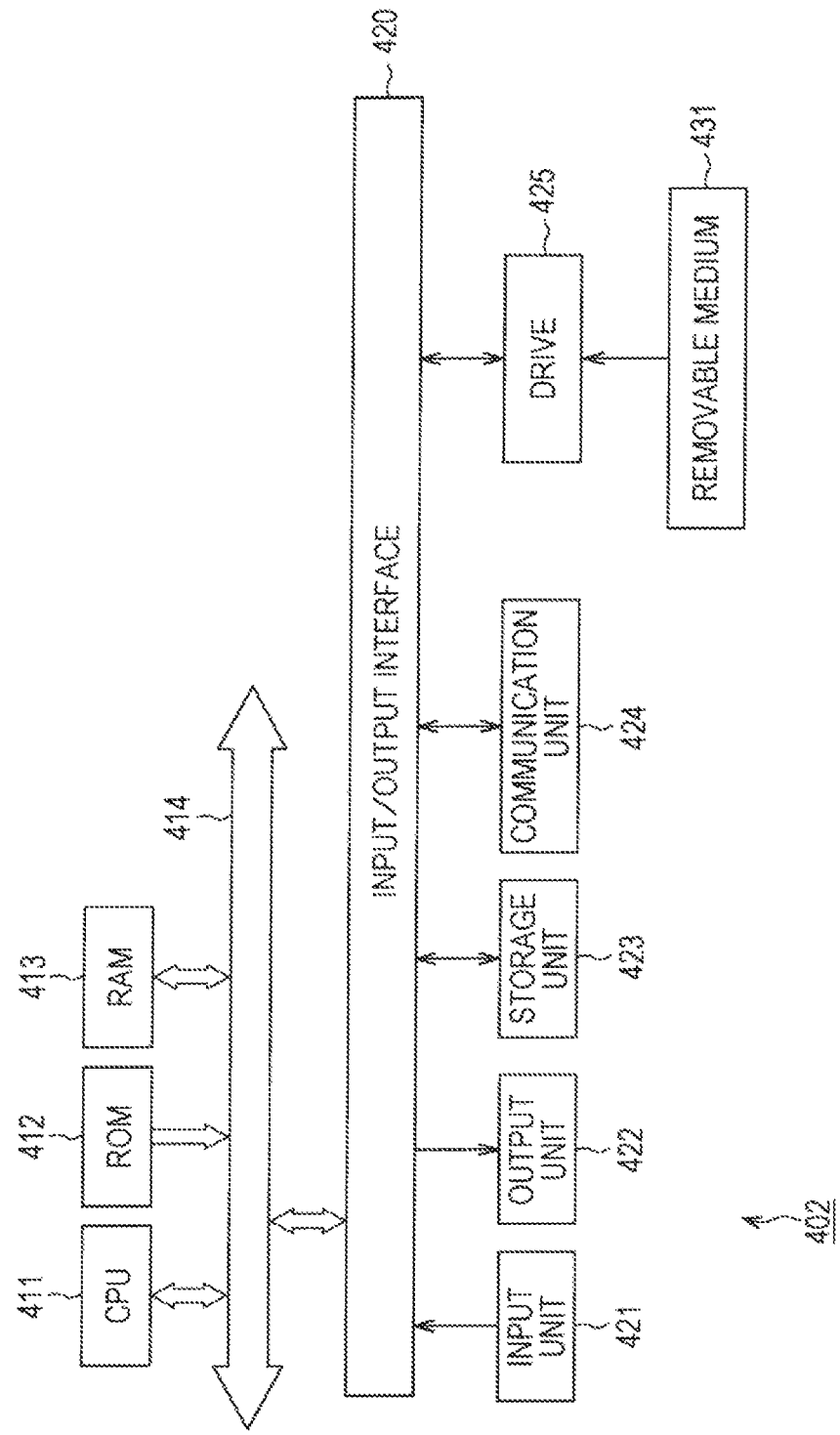
FIG. 16 is a diagram showing a typical example structure of the application providing server.

FIG. 16 is a block diagram showing a typical example structure of the application providing server 402. As shown in FIG. 16, in the application providing server 402, a CPU 411, a ROM 412, and a RAM 413 are connected to one another via a bus 414.

An input/output interface 420 is also connected to the bus 414. An input unit 421, an output unit 422, a storage unit 423, a communication unit 424, and a drive 425 are connected to the input/output interface 420.

The input unit 421 is formed with an input device that receives external information such as a user input. The input unit 421 includes operation buttons, a touch panel, a microphone, a camera, and an input terminal, for example. The input unit 421 may also include various kinds of sensors, such as an acceleration sensor, an optical sensor, and a temperature sensor. The output unit 422 is formed with an output device that outputs information such as images and sound. The output unit 422 includes a display, a speaker, and an output terminal, for example.

The storage unit 423 is formed with a hard disk, a RAM disk, a nonvolatile memory, or the like. The communication unit 424 is formed with a network interface, for example. The drive 425 drives a removable medium 431 such as a magnetic disk, an optical disk, a magnetooptical disk, or a semiconductor memory.

The CPU 411 performs various kinds of processes by loading a program stored in the storage unit 423 into the RAM 413 via the input/output interface 420 and the bus 414, and executing the program. Necessary data for the CPU 411 to perform various kinds of processes and the like are also stored in the RAM 413 as appropriate.

The program to be executed by the CPU 411 can be recorded on the removable medium 431 as a packaged medium, for example, and be provided to the application providing server 402. In this case, the program can be installed into the storage unit 423 via the input/output interface 420 when the removable medium 431 is mounted in the drive 425.

Alternatively, the program can be provided to the application providing server 402 via a wired or wireless transmission medium such as a LAN, the Internet, or digital satellite broadcasting. In this case, the program can also be received by the communication unit 424 via a wired or wireless transmission medium, and be installed into the storage unit 423.

Also, the program can be installed in the ROM 412 or the storage unit 423 in advance.

<Functional Blocks>

Figure 17:
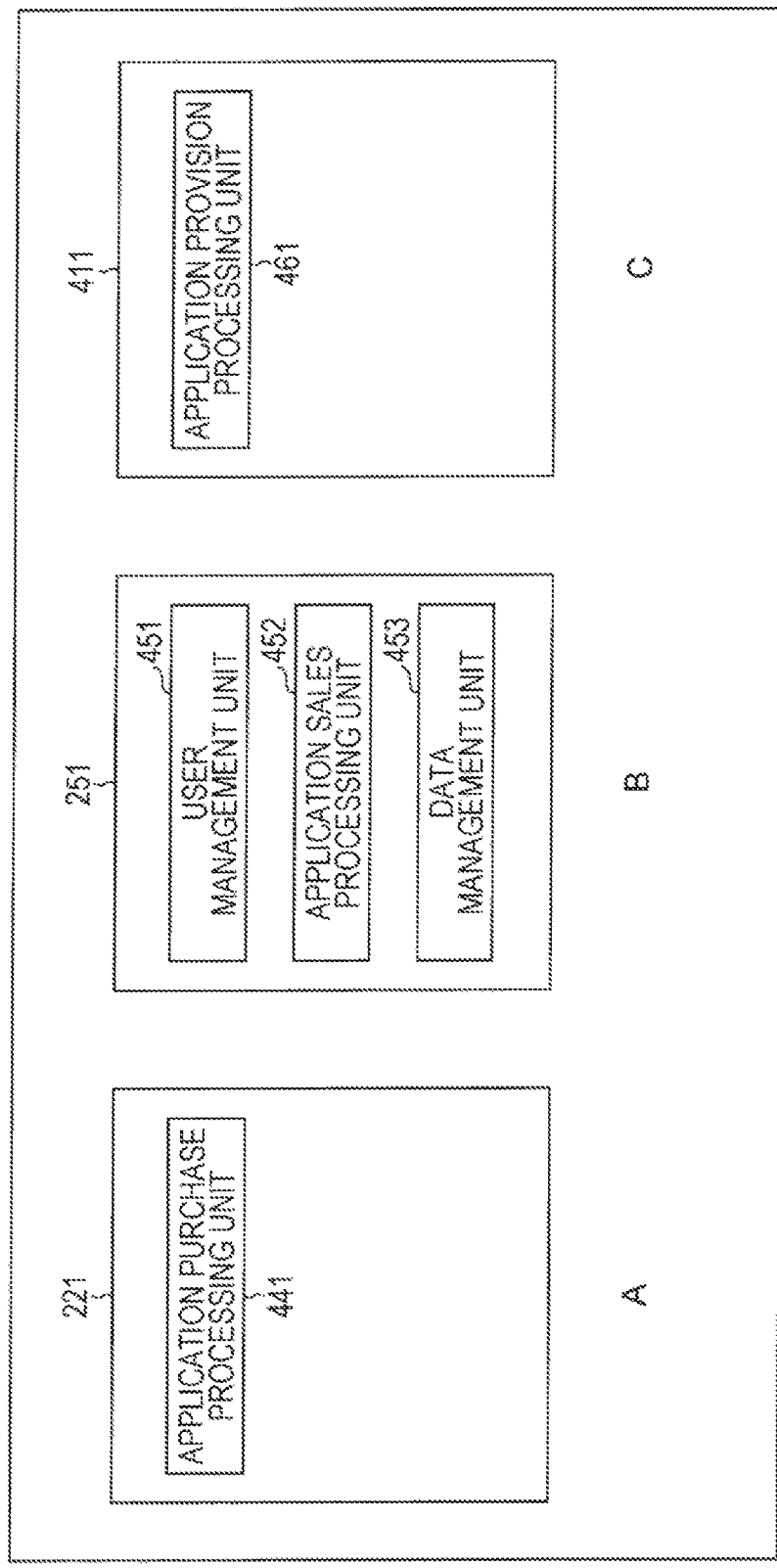
FIG. 17 is a functional block diagram for explaining the functions of the terminal device, the server, and the application providing server.

The terminal device 401 has a function shown as a functional block in FIG. 17A, as the CPU 221 executes a predetermined program. As shown in FIG. 17A, the CPU 221 has a functional block such as an application purchase processing unit 441.

The application purchase processing unit 441 controls respective components such as the input unit 231, the output unit 232, the storage unit 233, and the communication unit 234, communicates with the server 202, and performs a process related to application purchases by displaying images and receiving user instructions.

Meanwhile, the server 202 has functions shown as functional blocks in FIG. 17B, as the CPU 251 executes a predetermined program. As shown in FIG. 17B, the CPU 251 has functional blocks such as a user management unit 451, an application sales processing unit 452, and a data management unit 453.

Like the user management unit 291, the user management unit 451 performs a process related to management of users to whom multiview-image using services are to be provided. The application sales processing unit 452 controls the communication unit 264 to communicate with the terminal device 401 or the like, and performs a process related to application sales. Like the data management unit 295, the data management unit 453 performs a process related to management of data such as a multiview image file. The data management unit 453 also performs a process related to management of the application supplied from the application providing server 402.

Further, the application providing server 402 has a function shown as a functional block in FIG. 17C, as the CPU 411 executes a predetermined program. As shown in FIG. 17C, the CPU 411 has a functional block such as an application provision processing unit 461.

The application provision processing unit 461 controls the communication unit 424 to communicate with the server 202 or the like, and performs a process related to the provision of the application to the server 202.

<Flow of a Multiview-Image Using Service Providing Process>

Figure 18:
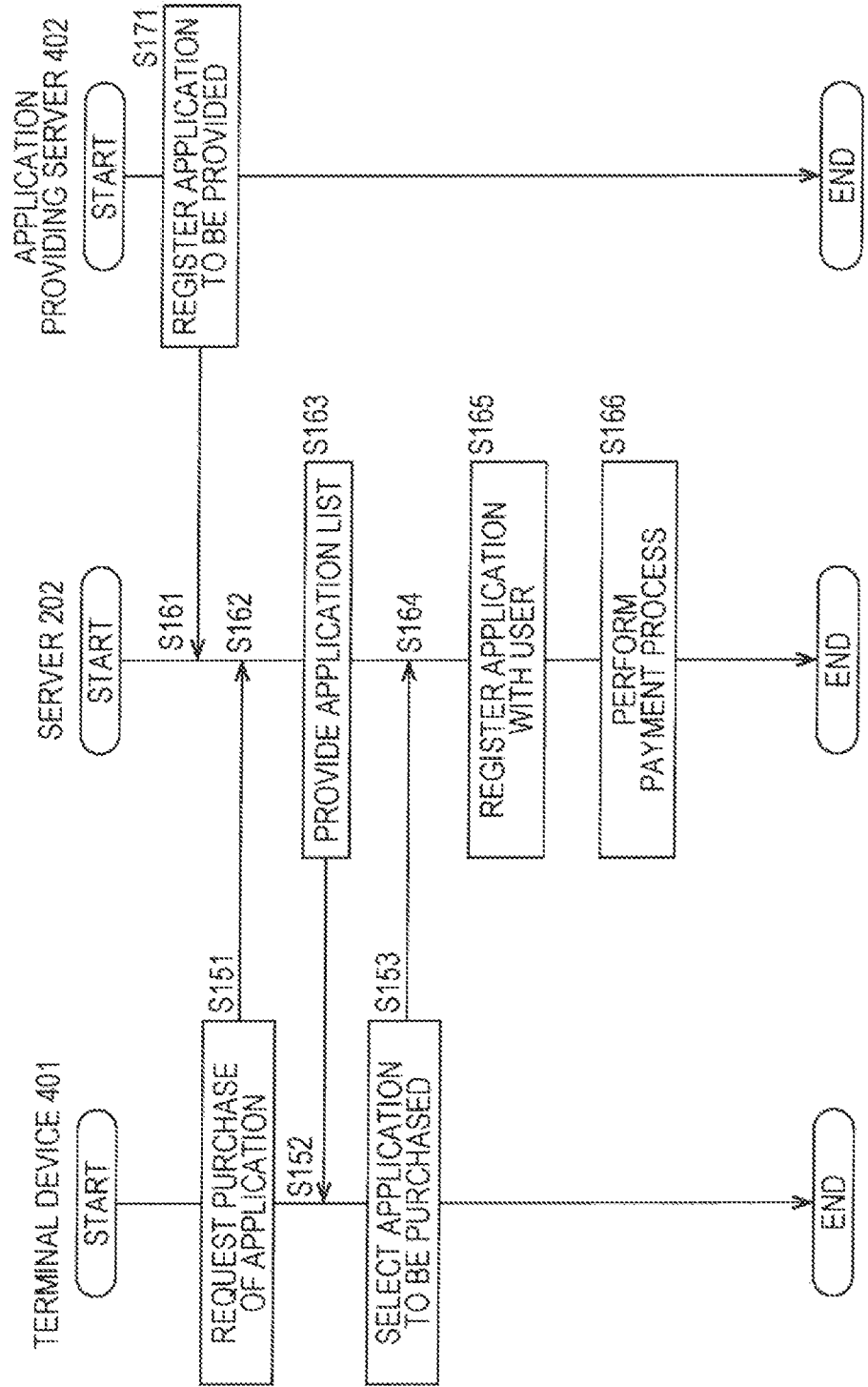
FIG. 18 is a flowchart showing another example flow of a multiview-image using service providing process.

The terminal device 401, the server 202, and the application providing server 402 of the multiview-image using service providing system having the above described structure perform a multiview-image using service providing process to provide a service using multiview images, or provide a service such as application sales in this embodiment. Referring now to the flowchart shown in FIG. 18, an example flow of the multiview-image using service providing process to be performed by those devices is described.

In step S171, the application provision processing unit 461 of the application providing server 402 controls the communication unit 424, to supply the application to be provided to the server 202 and register the application therein.

In step S161, the data management unit 453 of the server 202 controls the communication unit 264 or the like to acquire the application supplied from the application providing server 402, stores the application into the storage unit 263, and manages the application so that the application can be sold to the terminal device 401.

In step S151, the application purchase processing unit 441 of the terminal device 401 controls the communication unit 234, to request an application purchase from the server 202.

In step S162, the application sales processing unit 452 of the server 202 controls the communication unit 264 or the like, to acquire the request.

In step S163, the application sales processing unit 452 cooperates with the user management unit 451 and the data management unit 453, to create a list of applications that can be sold to the user. The application sales processing unit 452 then controls the communication unit 264 or the like, to provide the application list to the terminal device 401.

In step S152, the application purchase processing unit 441 of the terminal device 401 acquires the application list. The application purchase processing unit 441 controls the output unit 232 or the like, to display the application list on a monitor or the like, so that the application list is presented to the user, and an instruction is received from the user.

Figure 19:
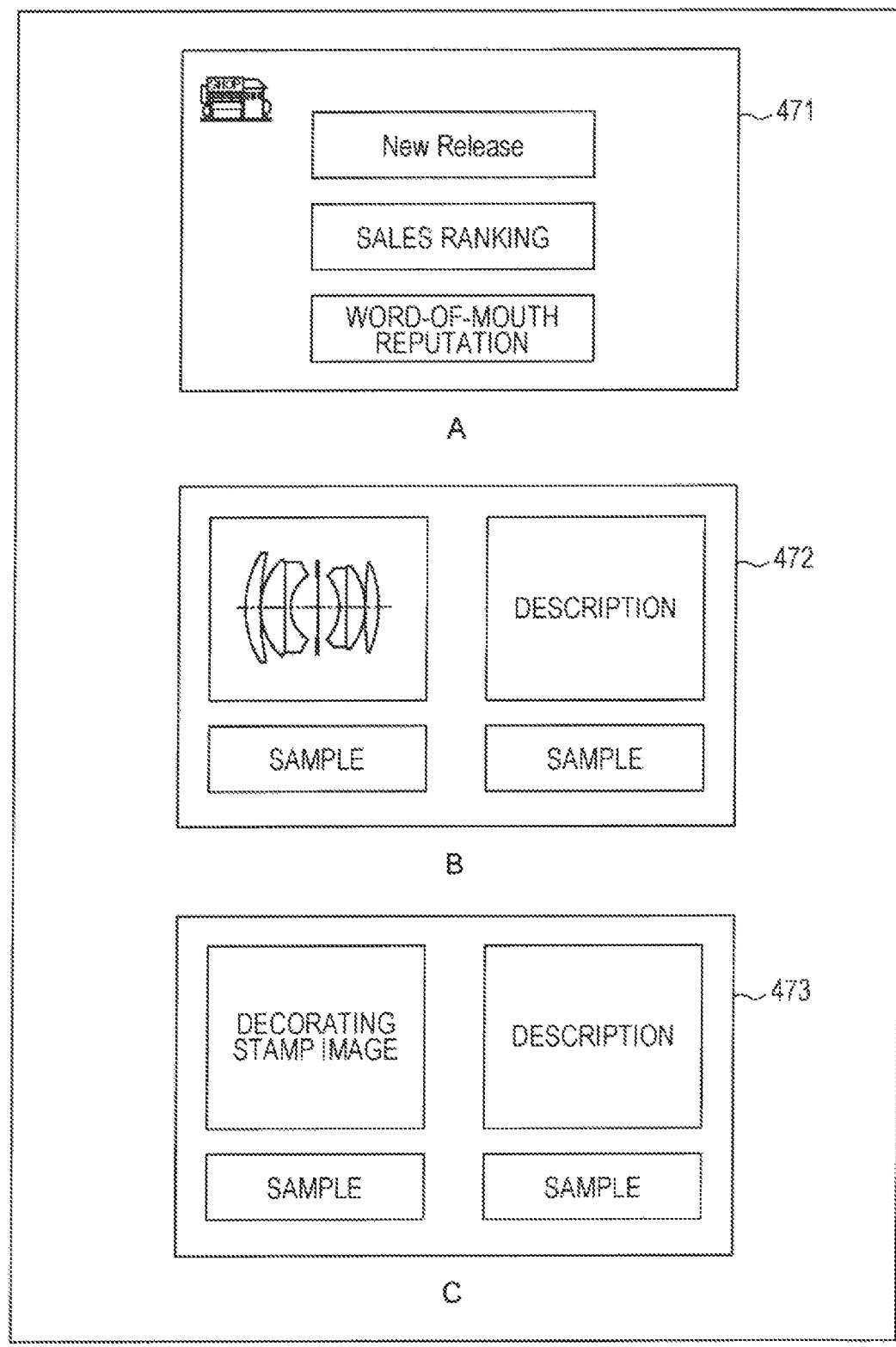
FIG. 19 is a diagram showing examples of displayed information.

For example, the GUI (Graphical User Interface) 471 shown in FIG. 19A is displayed on the monitor of the terminal device 401. Based on such a GUI, the user selects a desired application from a number of applications. In a case where an application for lens simulations is selected, for example, the GUI 472 shown in FIG. 19B is displayed, and a virtual lens is selected. In a case where an application for editing images is selected, for example, the GUI 473 shown in FIG. 19C is displayed, and an editing function such as a decorating stamp is selected.

Referring back to FIG. 18, when the user selects the application to be purchased from the list, the application purchase processing unit 441 in step S153 receives the selection instruction, and controls the communication unit 234 or the like, to supply control information for selecting the application to be purchased to the server 202.

In step S164, the application sales processing unit 452 of the server 202 controls the communication unit 264 or the like, to acquire the control information. In step S165, the application sales processing unit 452 cooperates with the user management unit 451 and the data management unit 453, and associates the user management information 301 about the user with the selected application (the application designated by the user in the instruction to purchase), so that the selected application is registered with the user.

In step S166, the application sales processing unit 452 performs a payment process related to the sale of the application. The user management unit 451 causes the user management information 301 about the user to reflect the payment information. (The points equivalent to the price or fee are subtracted from the points or money owned by the user, for example. This sale is added to the past purchases of the application.)

When the processing in step S166 is finished, the multiview-image using service providing process comes to an end.

As such a multiview-image using service providing process is performed, a user can more easily purchase an application by performing a process using multiview images. Also, as the purchased applications are registered with the user and are managed in the server 202, the user can more easily use the applications he/she has purchased. That is, the multiview-image using service providing system 200 (the multiview-image using service platform 100) can increase the user-friendliness of the multiview-image using service.

Applications may not be sold, and may be provided for free. In that case, the payment process can be skipped.

4. Fourth Embodiment

Virtual Lens Processing

By performing an application provided to a user as described above, the multiview-image using service platform 100 can provide various services using multiview images to the user.

In this embodiment, execution of an application for performing the lens simulation (virtual lens processing) described in the first embodiment is described as an example of the application.

<Multiview-Image Using Service Providing System>

Figure 20:
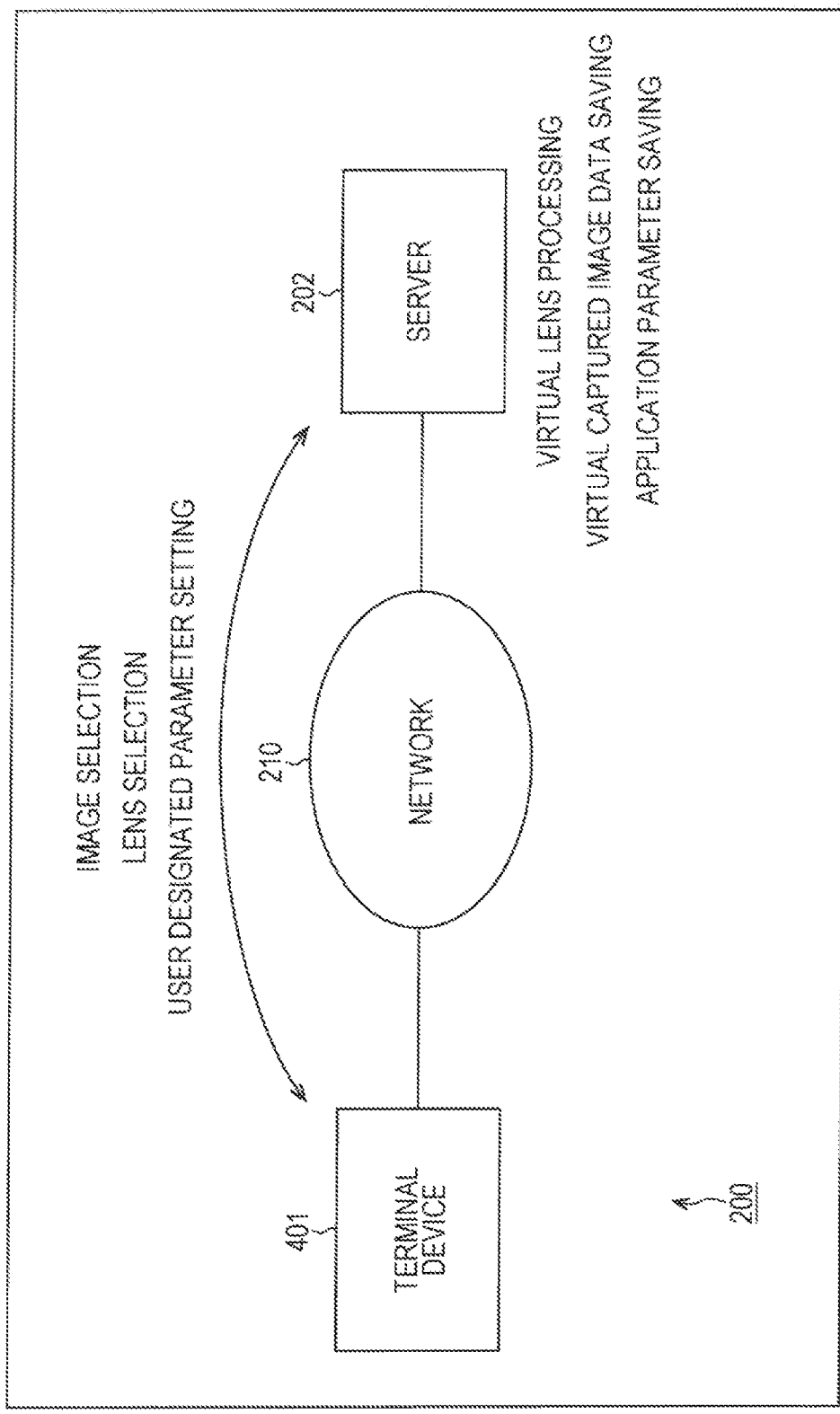
FIG. 20 is a diagram showing yet another typical example structure of a multiview-image using service providing system.

FIG. 20 is a diagram showing a typical example structure of a multiview-image using service providing system. The multiview-image using service providing system 200 shown in FIG. 20 is an example of a system to which the present technique is applied. In this system, a server 202 provides a multiview-image using service to a terminal device 401 connected thereto via a network 210. That is, the multiview-image using service providing system 200 is an example of a structure that realizes the multiview-image using service platform 100.

FIG. 20 shows an example of a structure related to the provision of a service related to a lens simulation (virtual lens processing) among the services to be provided by the multiview-image using service platform 100. In FIG. 20, the multiview-image using service providing system 200 includes the terminal device 401 and the server 202 that are connected to the network 210.

The terminal device 401 connected to the network 210 in a wired or wireless manner communicates with the server 202, to select the multiview image to be used in the lens simulation, select the virtual lens to be simulated, and set user designated parameters that are imaging-related parameters having values designated by a user, such as a focusing position and a depth of field.

Based on those processes, the server 202 performs virtual lens processing to simulate a virtual lens, and generates virtual captured image data obtained by imaging with the use of the virtual lens. The server 202 also saves (stores, and manages) the virtual captured image data. Further, the server 202 generates and saves (stores, and manages) history information as application parameters of the application for performing the lens simulation. The history information indicates what value has been set for which parameter, what kind of operation (instruction) has been performed by the use, what kind of processing has been performed, and the like.

<Outline of the Virtual Lens Processing>

Next, an outline of virtual lens processing is described. In the virtual lens processing, a virtual lens 150 designated by a user as shown in FIG. 2A is set, and a ray vector 151 that is light incident on the virtual lens 150 from a subject, a ray vector 152 that is the incident light after passing through the virtual lens 150, a virtual image sensor 153 that obtains a virtual captured image from the ray vector 152, and the like are simulated, and a virtual captured image is generated from a multiview image based on the simulations.

Figure 21:
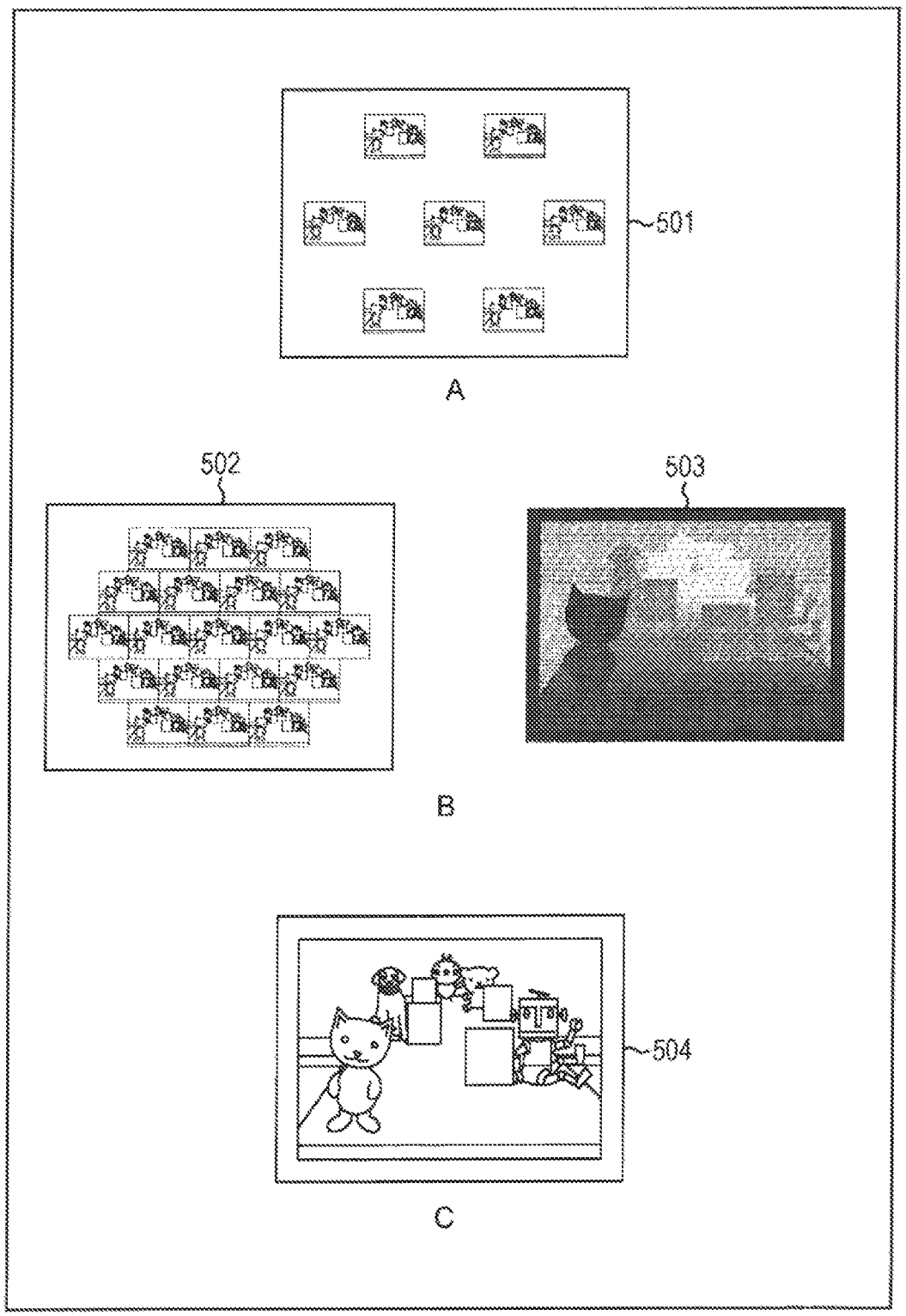
FIG. 21 is a diagram for explaining an example flow of virtual lens processing.

For example, the interpolating images 502 and the depth data 503 shown in FIG. 21B are generated from the multiview image 501 shown in FIG. 21A, for example, and a virtual captured image 504 obtained by imaging with the use of the virtual lens 150 (the virtual optical system shown in FIG. 2A) as shown in FIG. 21C is generated by using the interpolating images 502 and the depth data 503.

In the above manner, the virtual captured image 504 that is larger than the respective captured images of the multiview image 501, and reflects the optical effects given by the virtual lens 150 is obtained. An optical system such as the virtual lens 150 is simulated by using profile information unique to the virtual optical system. The profile information is formed with parameters for reproducing the optical effects of the virtual optical system. Therefore, the server 202 can readily reproduce various optical systems that range from existing ones to unrealistic ones. In short, a user can obtain various kinds of captured images at low costs through this service. That is, the multiview-image using service providing system 200 (the multiview-image using service platform 100) can increase the user-friendliness of the multiview-image using service.

<Functional Blocks>

Figure 22:
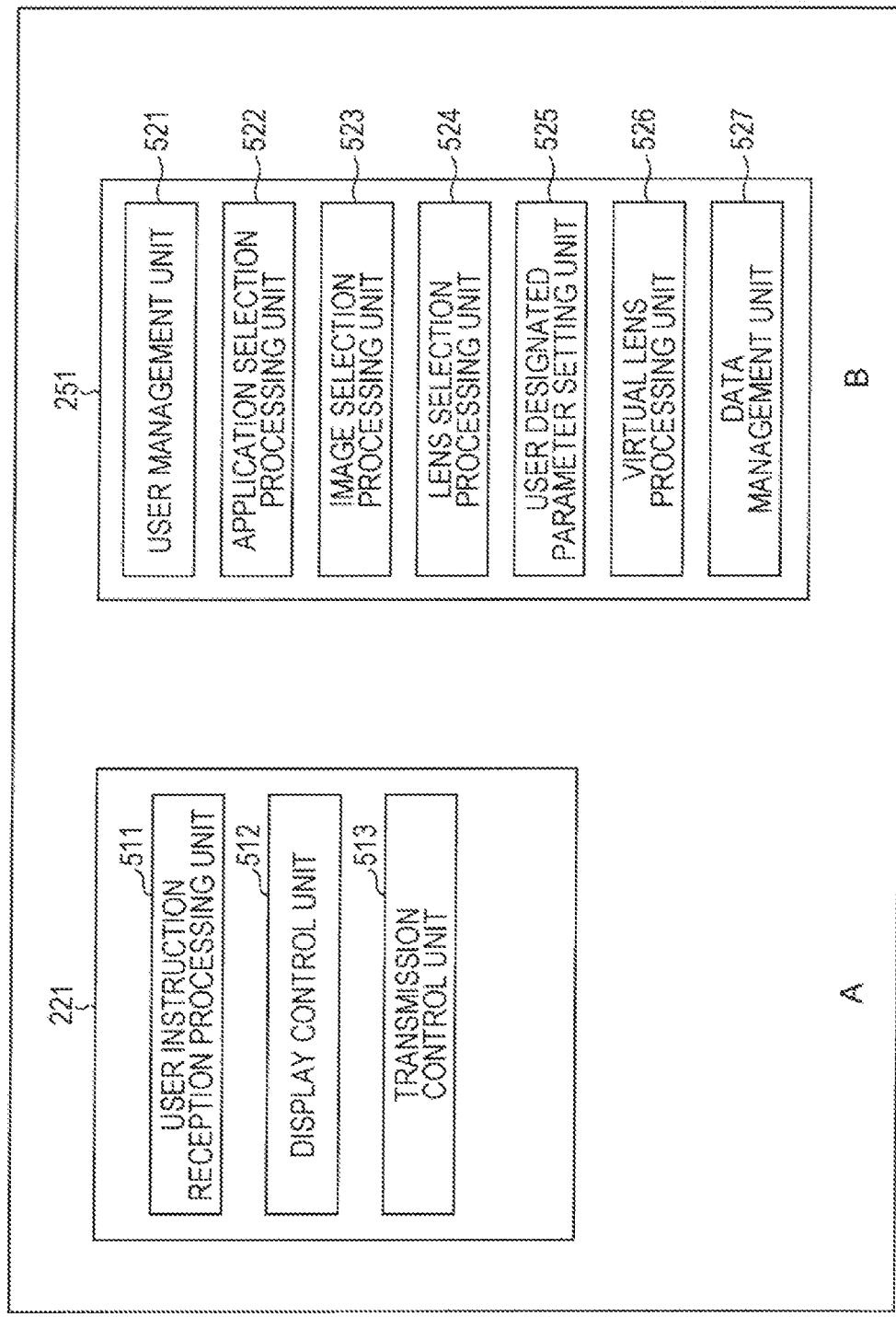
FIG. 22 is a functional block diagram for explaining the functions of the terminal device and the server.

The terminal device 401 has functions shown as functional blocks in FIG. 22A, as the CPU 221 executes a predetermined program. As shown in FIG. 22A, the CPU 221 has functional blocks such as a user instruction reception processing unit 511, a display control unit 512, and a transmission control unit 513.

The user instruction reception processing unit 511 controls the input unit 231 or the like, to perform a process related to reception of a user instruction. The display control unit 512 controls the output unit 232 or the like, to perform a process related to display control to display an image such as a GUI or a guide on a monitor. The transmission control unit 513 controls the communication unit 234 or the like, to perform a process related to transmission of various kinds of information such as a user instruction received by the user instruction reception processing unit 511.

Meanwhile, the server 202 has functions shown as functional blocks in FIG. 22B, as the CPU 251 executes a predetermined program. As shown in FIG. 22B, the CPU 251 has functional blocks such as a user management unit 521, an application selection processing unit 522, an image selection processing unit 523, a lens selection processing unit 524, a user designated parameter setting unit 525, a virtual lens processing unit 526, and a data management unit 527.

Like the user management unit 291, the user management unit 521 performs a process related to management of users to whom multiview-image using services are to be provided. The application selection processing unit 522 controls the communication unit 264 to communicate with the terminal device 401 or the like, and performs a process related to selection of the application to be executed. The image selection processing unit 523 controls the communication unit 264 to communicate with the terminal device 401 or the like, and performs a process related to selection of a multiview image to be the current multiview image in the lens simulation (virtual lens processing). The lens selection processing unit 524 controls the communication unit 264 to communicate with the terminal device 401 or the like, and performs a process related to selection of profile information about the virtual lens to be simulated. The user designated parameter setting unit 525 controls the communication unit 264 to communicate with the terminal device 401 or the like, and performs a process related to the setting of user designated parameters transmitted from the terminal device 401. The virtual lens processing unit 526 performs a process related to the simulation of a virtual optical system. Like the data management unit 295, the data management unit 527 performs a process related to management of data such as a multiview image file, and management of an application and data related to the application.

<Flow of a Multiview-Image Using Service Providing Process>

The terminal device 401 and the server 202 of the multiview-image using service providing system having the above described structure perform a multiview-image using service providing process to provide a service using multiview images, or provide a service such as a lens simulation in this embodiment. Referring now to the flowchart shown in FIG. 23, an example flow of the multiview-image using service providing process to be performed by those devices is described.

In step S201, the user instruction reception processing unit 511 of the terminal device 401 controls the input unit 231 or the like, to receive an instruction to request startup of an application from a user. The transmission control unit 513 controls the communication unit 234 or the like, to supply the application startup request received by the user instruction reception processing unit 511 to the server 202.

In step S221, the application selection processing unit 522 of the server 202 controls the communication unit 264 or the like, to acquire the request. In step S222, the application selection processing unit 522, in response to the request, generates a list of applications that can be used by the user based on the user management information being managed by the user management unit 521, and controls the communication unit 264 or the like, to supply the list to the terminal device 401.

In step S202, the transmission control unit 513 of the terminal device 401 controls the communication unit 234 or the like, to acquire the list. The display control unit 512 controls the output unit 232, to display the acquired list as an image on a monitor. The user then selects the application to be started from the list.

In step S203, the user instruction reception processing unit 511 controls the input unit 231 or the like, to receive an instruction as to the selection of the application to be started from the user. The transmission control unit 513 controls the communication unit 234 or the like, to supply the application-to-start selection instruction received by the user instruction reception processing unit 511 to the server 202.

In step S223, the application selection processing unit 522 of the server 202 controls the communication unit 264 or the like, to acquire the selection instruction. In step S224, the image selection processing unit 523 generates a list of multiview images of the user based on the user management information being managed by the user management unit 521, and controls the communication unit 264 or the like, to supply the list to the terminal device 401.

In step S204, the transmission control unit 513 of the terminal device 401 controls the communication unit 234 or the like, to acquire the list. The display control unit 512 controls the output unit 232, to display the acquired list as an image on the monitor. The user then selects the multiview image to be the current multiview image from the list.

In step S205, the user instruction reception processing unit 511 controls the input unit 231 or the like, to receive an instruction as to the selection of the current image from the user. The transmission control unit 513 controls the communication unit 234 or the like, to supply the current image selection instruction received by the user instruction reception processing unit 511 to the server 202.

In step S225, the image selection processing unit 523 of the server 202 controls the communication unit 264 or the like, to acquire the selection instruction. In step S226, the lens selection processing unit 524 generates a list of the lenses registered with the user based on the user management information being managed by the user management unit 521, and controls the communication unit 264 or the like, to supply the list to the terminal device 401.

In step S206, the transmission control unit 513 of the terminal device 401 controls the communication unit 234 or the like, to acquire the list. The display control unit 512 controls the output unit 232, to display the acquired list as an image on the monitor. The user then selects the virtual lens to be simulated from the list.

In step S207, the user instruction reception processing unit 511 controls the input unit 231 or the like, to receive a lens selection instruction from the user. The transmission control unit 513 controls the communication unit 234 or the like, to supply the lens selection instruction received by the user instruction reception processing unit 511 to the server 202.

In step S227, the lens selection processing unit 524 of the server 202 controls the communication unit 264 or the like, to acquire the selection instruction.

In step S208, the user instruction reception processing unit 511 of the terminal device 401 controls the input unit 231 or the like, to receive user designated parameters that are imaging-related parameters such as imaging conditions having values designated by the user. The transmission control unit 513 controls the communication unit 234 or the like, to supply the user designated parameters received by the user instruction reception processing unit 511 to the server 202.

In step S228, the user designated parameter setting unit 525 of the server 202 controls the communication unit 264 or the like, to acquire the user designated parameters.

In step S229, the virtual lens processing unit 526 performs virtual lens processing to generate a virtual captured image that is obtained by capturing an image of the subject in the multiview image selected in step S225 with the virtual lens selected in step S227 while using the multiview image data and the profile information including the parameters for reproducing the optical effects of a virtual optical system. In doing so, the virtual lens processing unit 526 reproduces the optical influence of the virtual lens with higher precision by using the user designated parameters acquired in step S228. Also, in doing so, the virtual lens processing unit 526 generates interpolating images for the multiview image in accordance with the camera array information 342, the viewpoint number information 343, and the depth data 332 included in the multiview image file of the multiview image selected in step S225. The virtual lens processing will be described later in detail.

In step S230, the virtual lens processing unit 526 controls the communication unit 264 or the like, to supply the data of the virtual captured image generated by the processing in step S229 to the terminal device 401.

In step S209, the transmission control unit 513 of the terminal device 401 acquires the data of the virtual captured image. The display control unit 512 controls the output unit 232, to display the acquired virtual captured image on the monitor. Based on the virtual captured image, the user determines whether to save the virtual captured image.

In step S210, the user instruction reception processing unit 511 controls the input unit 231 or the like, to receive an instruction to save the data of the virtual captured image from the user. The transmission control unit 513 controls the communication unit 234 or the like, to supply the virtual captured image data saving instruction received by the user instruction reception processing unit 511 to the server 202.

In step S231, the data management unit 527 of the server 202 controls the communication unit 264 or the like, to acquire the virtual image data saving instruction. In step S232, the data management unit 527 generates application parameters about this lens simulation. The data management unit 527 stores and manages the data and the application parameters of the virtual captured image generated by the processing in step S229, and also registers the data and the application parameters with the user (or updates the user management information about the user).

When the processing in step S232 is finished, the multiview-image using service providing process comes to an end.

As such a multiview-image using service providing process is performed, a user can perform a virtual lens simulation more easily by using a multiview image (or generate a virtual captured image obtained by imaging with the use of a virtual lens). Also, as the generated virtual captured image data is registered with the user and is managed in the server 202, the user can use the virtual captured image data more readily. Furthermore, as the virtual captured image data is managed in association with the multiview image, the application parameters, and the like used in generating the virtual captured image, the user can more readily use the virtual captured image data as well as the other related data. That is, the multiview-image using service providing system 200 (the multiview-image using service platform 100) can increase the user-friendliness of the multiview-image using service.

<Example of a Screen>

Figure 24:
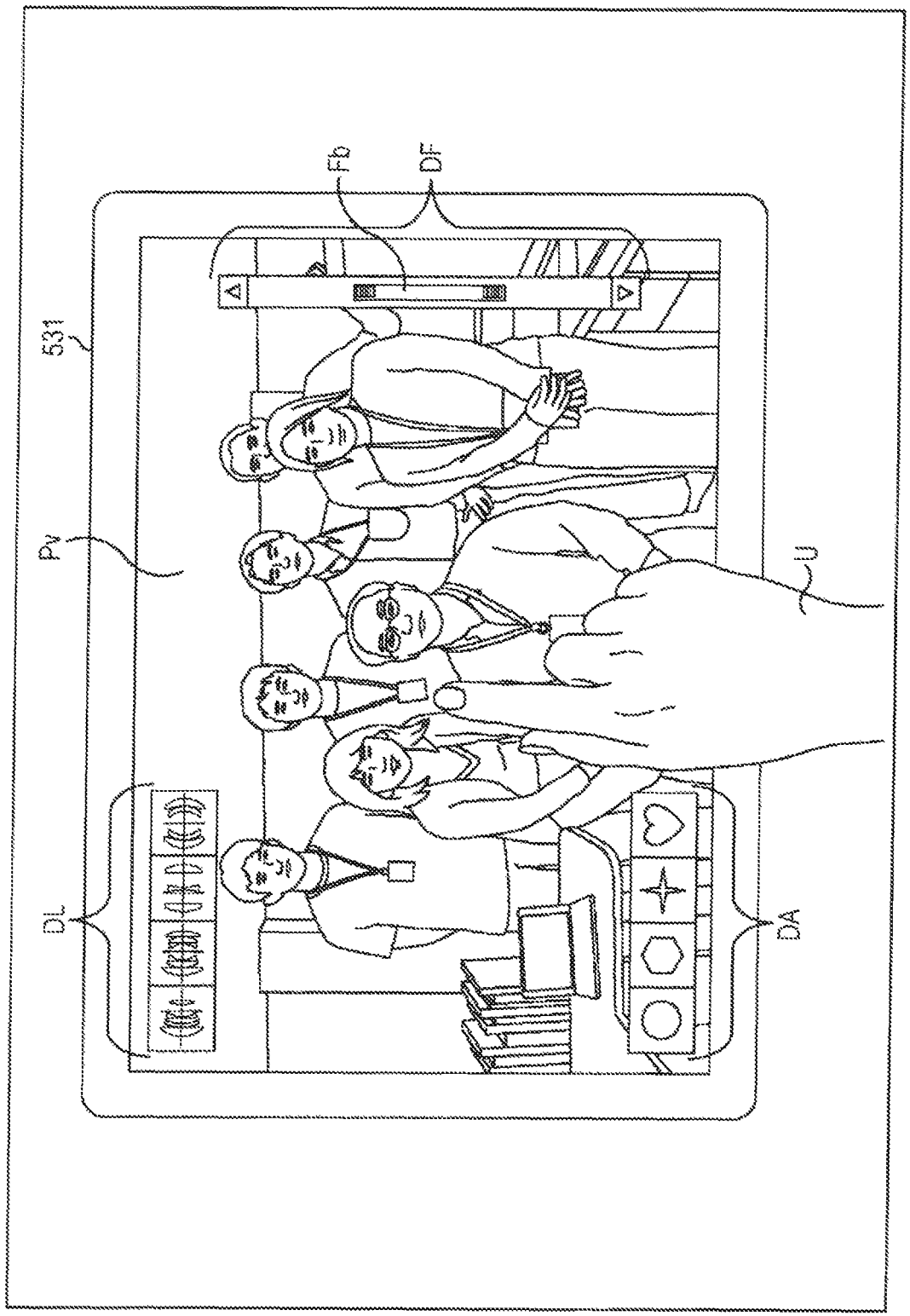
FIG. 24 is a diagram for explaining an example of virtual lens selection.

FIG. 24 is a schematic view of an example of a setting GUI displayed on the display unit 531.

The screen shown in FIG. 24 displays a setting GUI as well as a preview image Pv. In the example shown in FIG. 24, development parameters are formed with the design information about the lens, the shape of the aperture, and the focus position.

In this case, a lens unit selection portion DL, an aperture shape selection portion DA, and a focus position selection portion DF are superimposed on the preview image Pv, and are displayed as the setting GUI on the display unit 531.

The lens unit selection portion DL displays figures that represent lens units based on selection candidates for the design information about a lens in the development parameters. The aperture shape selection portion DA displays figures that represent selection candidates for the aperture shape in the development parameters. The focus position selection portion DF displays a setting bar Fb that indicates the position of a selection candidate for the focus position.

The user touches, with a finger U, the figure that represents a desired lens unit displayed in the lens unit selection portion DL, to select a selection candidate for the design information about the lens corresponding to the lens unit. The user also touches, with the finger U, the figure that represents a desired aperture shape displayed in the aperture shape selection portion DA, to select a selection candidate for the aperture shape.

The user also touches, with the finger U, the setting bar Fb in the focus position selection portion DF, and moves the finger U up and down, to move the setting bar Fb to the position corresponding to a desired focus position. In this manner, the user can select a selection candidate in a desired focus position.

The setting bar Fb may not be moved by the user moving the finger U after touching the setting bar Fb with the finger U. Instead, the setting bar Fb may be moved to a desired position in the focus position selection portion DF by the user touching the desired position. Also, a selection candidate for the focus position may not be displayed. Instead, the selection candidate for the focus position closest to the subject in the position touched with the finger U in the screen may be selected.

In the example shown in FIG. 24, the lens unit selection portion DL is located in the upper left corner of the preview image Pv, the aperture shape selection portion DA is located in the lower left corner, and the focus position selection portion DF is located on the right side. However, the positions of the respective portions are not limited to the above.

Although not shown in the drawing, selection candidates for other development parameters related to white balance, exposure correction, and the like may be displayed as well as the lens unit selection portion DL, the aperture shape selection portion DA, the focus position selection portion DF, and the like.

In the second embodiment, the display unit 531 is formed integrally with a touch panel. In a case where the display unit 531 is not formed integrally with a touch panel, however, a user moves a pointer displayed in the screen by operating a mouse or the like (not shown), to perform a selecting operation that is equivalent to a touch panel operation.

<Flow of the Virtual Lens Processing>

Figure 23:
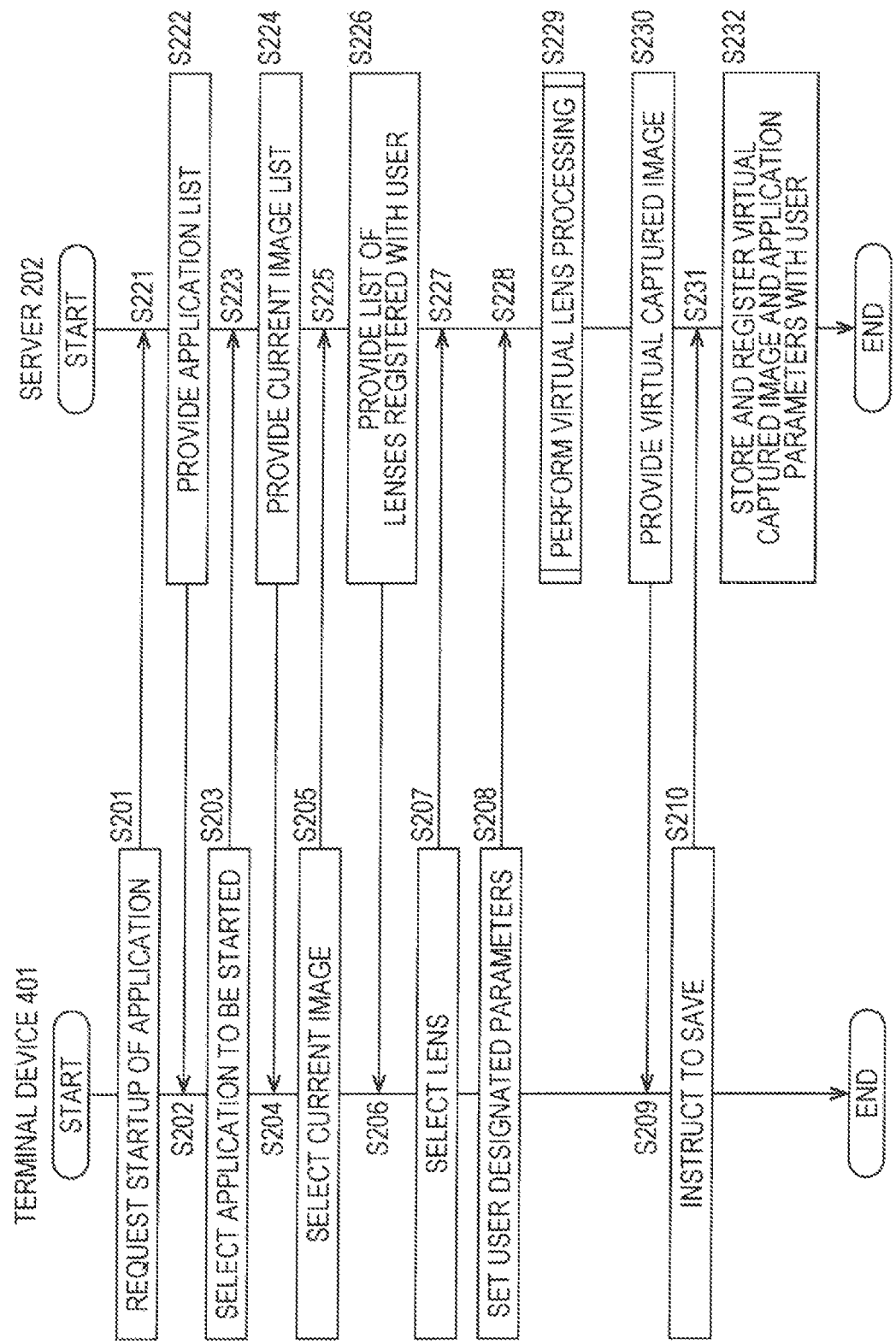
FIG. 23 is a flowchart showing yet another example flow of a multiview-image using service providing process.
Figure 25:
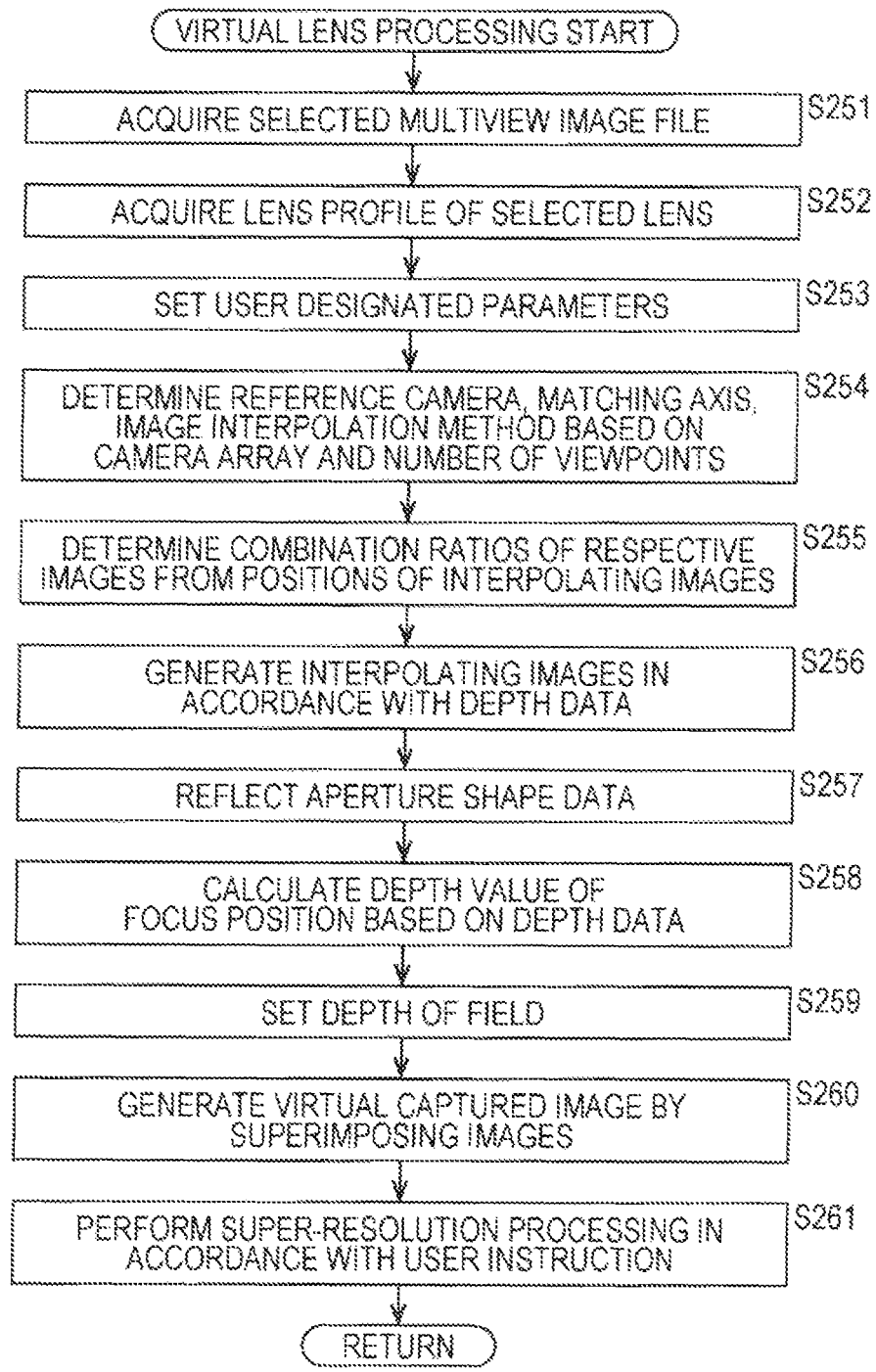
FIG. 25 is a flowchart showing an example flow of the virtual lens processing.

Referring now to the flowchart shown in FIG. 25, an example flow of the virtual lens processing performed in step S229 in FIG. 23 is described in detail.

When the virtual lens processing is started, the virtual lens processing unit 526 in step S251 acquires the selected multiview image file from the storage unit 263. In step S252, the virtual lens processing unit 526 acquires the profile information about the selected lens from the storage unit 263.

The site where multiview image files and profile information are stored and managed is not fixed, and may not be the storage unit 263. For example, multiview image files and profile information may be stored and managed in a device other than the server 202, such as the terminal device 401. In that case, the virtual lens processing unit 526 controls the communication unit 264, for example, to acquire a multiview image file and profile information from the device in which the file and the information are stored. The site where multiview image files are stored and the site where profile information is stored may differ from each other.

Profile information is formed with parameters for reproducing the optical effects of a virtual optical system, and is unique to the virtual optical system. The profile information includes the PSF (Point Spread Function) data of the respective colors of RGB, an aperture shape, interpolation number designation information, and the like.

Figure 26:
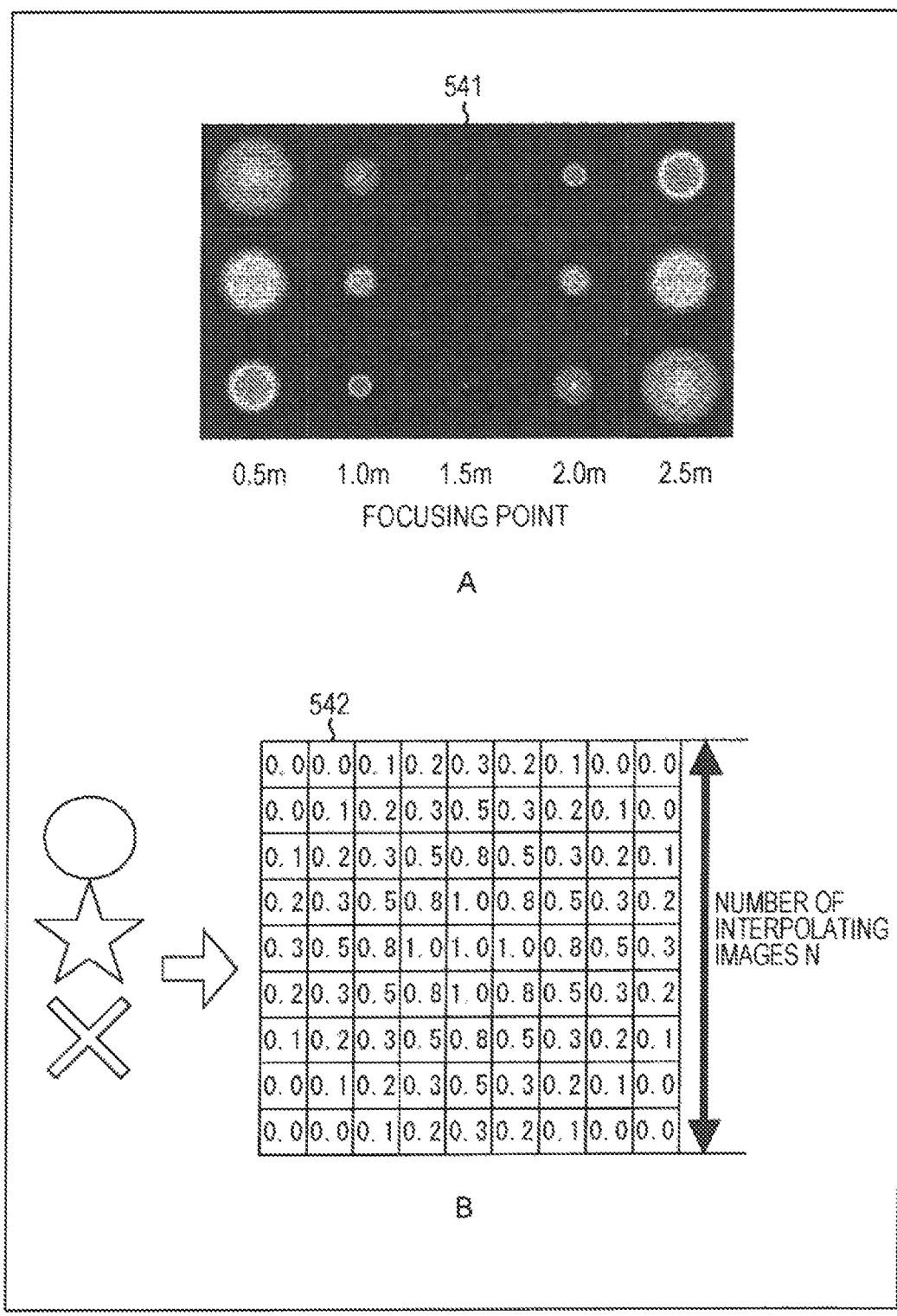
FIG. 26 is a diagram for explaining an example of a lens profile.

The PSF data is also referred to as a point spread function or a point-image distribution function, and is the function that indicates responses of the virtual lens included in the virtual optical system to a point light source. In other words, the PSF data is the data that indicates the influence of a virtual lens on light rays of RGB passing through the virtual lens. FIG. 26A shows an example of the PSF data. In this example, the PSF data in accordance with distances to the focusing point (or the point light source) are shown for the respective colors (in the respective rows).

The aperture shape is the information that indicates the shape of the virtual aperture included in the virtual optical system. This aperture shape may be an actually existing aperture shape, or may be an unrealistic shape such as a round shape, the shape of a star, or the shape of an X shown in the left portion of FIG. 26B. The aperture shape can be designated by any method. For example, a predetermined shape may be designated by identification information (ID) or the like. The aperture shape may be expressed by an intensity distribution 542 as shown in the right portion of FIG. 26B, for example. The size of the intensity distribution (the number of intensities) depends on the number of interpolating images (the interpolation number) designated by the interpolation number designation information. Where the interpolation number is N, for example, the aperture shape is expressed by the N×N intensity distribution 542.

The interpolation number designation information is the information that designates the number of interpolating images to be generated when a virtual captured image is generated. That is, in the virtual lens processing, the virtual lens processing unit 526 generates the number of interpolating images as designated by the interpolation number designation information. Where the number of interpolating images is larger, a virtual captured image with higher definition can be obtained. Normally, where the virtual lens has a higher grade (higher performance), the number of interpolating images is larger.

As described above, the lens profile information is formed with the information that indicates the features of the virtual lens. The contents of the lens profile information are not fixed. Some of the above described information may be excluded, or information other than the above described information may be included. For example, the physical design information about the lens to be used for emulating the virtual lens may be included in the lens profile information.

Referring back to FIG. 25, in step S253, the virtual lens processing unit 526 sets the user designated parameters acquired in step S228 in FIG. 23.

The user designated parameters are imaging-related parameters that have values designated by the user. In accordance with the user designated parameters, the virtual lens processing unit 526 generates a virtual captured image. For example, the user designated parameters include focusing position designation information, a depth-of-field designation information, super-resolution processing instruction information, and the like.

The focusing position designation information (focus position designation information) is the information that designates an area (or a point) where the subject on which the focus is to be put is located in the captured image. When the user designates a position in the captured image as the focusing position, a virtual captured image is generated so that the focal point is on the subject located in the focusing position.

The depth-of-field designation information is the information that designates a depth of field (an aperture size). The super-resolution processing instruction information is the information that includes instructions related to super-resolution processing, such as an instruction as to whether super-resolution processing is to be performed when the respective captured images of the multiview image are superimposed on one another to generate a virtual captured image, and an instruction as to in which area and to what extent the super-resolution processing is to be performed if it is determined to be performed. The super-resolution processing at the time of the superimposition of the respective captured images of the multiview image is performed based on the super-resolution processing instruction information.

The contents of the user designated parameters are of course not fixed. Some of the above described information may be excluded, or information other than the above described information may be included.

In step S254, the virtual lens processing unit 526 determines the reference camera, the matching axis, the image interpolation method, and the like based on the camera array information, the viewpoint number information, and the like included in the metadata associated with the current multiview image data.

In step S255, the virtual lens processing unit 526 determines the combination ratios of the respective images to be used in image interpolation (or the respective images to be superimposed) in accordance with the positions of the interpolating images to be generated.

In step S256, the virtual lens processing unit 526 generates interpolating images in accordance with the depth data and the various kinds of parameters that are set in the above described manner. For example, the virtual lens processing unit 526 generates interpolating image by superimposing an image of the reference viewpoint determined in step S254 and the images designated by the interpolation method determined in step S254 by using the matching axis determined in step S254, in accordance with the depth data. The virtual lens processing unit 526 generates the number of interpolating images as designated by the interpolation number designation information in the profile information.

In step S257, the virtual lens processing unit 526 causes each of the interpolating images to reflect the aperture shape data in the profile information.

In step S258, based on the depth data, the virtual lens processing unit 526 calculates the depth value of the focusing position (the focus position) designated by the user. Specifically, in the virtual captured image to be generated, the virtual lens processing unit 526 calculates the depth value of the subject (the distance to the subject) located in the position (coordinates) designated by the focusing position designation information (the focus position designation information) included in the user designated parameters acquired in step S228, for example.

In step S259, the virtual lens processing unit 526 sets the depth of field designated by the depth-of-field designation information in the user designated parameters.

In step S260, the virtual lens processing unit 526 generates a virtual captured image by superimposing the multiview image and the interpolating images by repeating stereo matching or the like. In doing so, the virtual lens processing unit 526 reflects the PSF data of the virtual lens in accordance with the depth data (the depth value of the subject). Also, the virtual lens processing unit 526 generates the virtual captured image so that the focus is achieved at the depth value (distance) calculated in step S258. Furthermore, the virtual lens processing unit 526 causes each of the interpolating images to reflect the aperture shape data in step S257, so that the virtual captured image can reflect the virtual aperture shape. Also, the virtual lens processing unit 526 generates the virtual captured image so that the depth of field set in step S259 is achieved.

In step S261, the virtual lens processing unit 526 performs super-resolution processing on the virtual captured image in accordance with the super-resolution processing instruction information in the user designated parameters. In a case where the super-resolution processing instruction information instructs not to perform the super-resolution processing, for example, the virtual lens processing unit 526 does not perform the super-resolution processing. In a case where the super-resolution processing instruction information instructs to perform the super-resolution processing, for example, the virtual lens processing unit 526 performs the super-resolution processing.

The super-resolution processing may be performed on the entire virtual captured image, or may be performed only on the predetermined area that has the depth value of the focusing position. Even if the super-resolution processing is performed on the area of the subject on which any focus is put, the effect to be achieved (an increase in image quality) is small. Therefore, the super-resolution processing is performed only on the area that has a depth value equal or similar to the depth value of the focusing position, so that the processing load can be reduced while image quality degradation is suppressed. The area where the super-resolution processing is to be performed may also be designated by the super-resolution processing instruction information.

When the processing in step S261 is finished, the virtual lens processing comes to an end, and returns to the process shown in FIG. 23.

As the virtual lens processing is performed in the above described manner, a user can obtain a virtual captured image more readily.

The virtual lens processing described above may not be performed by the server 202, but may be performed by some other device. For example, the CPU 221 of the terminal device 401 may have the virtual lens processing unit 526 or the like to perform the virtual lens processing in the terminal device 401. In that case, the virtual lens processing can be performed basically in the same manner as in the above described example. The information that is to be used in the virtual lens processing and is stored (managed) in the server 202, such as a multiview image file and the profile information about a virtual lens, may be transmitted to the terminal device 401 where necessary.

5. Fifth Embodiment

Sales Support

In this embodiment, execution of an application for performing the sales support described in the first embodiment is described as another example of the application. In this embodiment, an application for supporting sales of furniture as described in the first embodiment is described as an example of the sales support.

<Multiview-Image Using Service Providing System>

Figure 27:
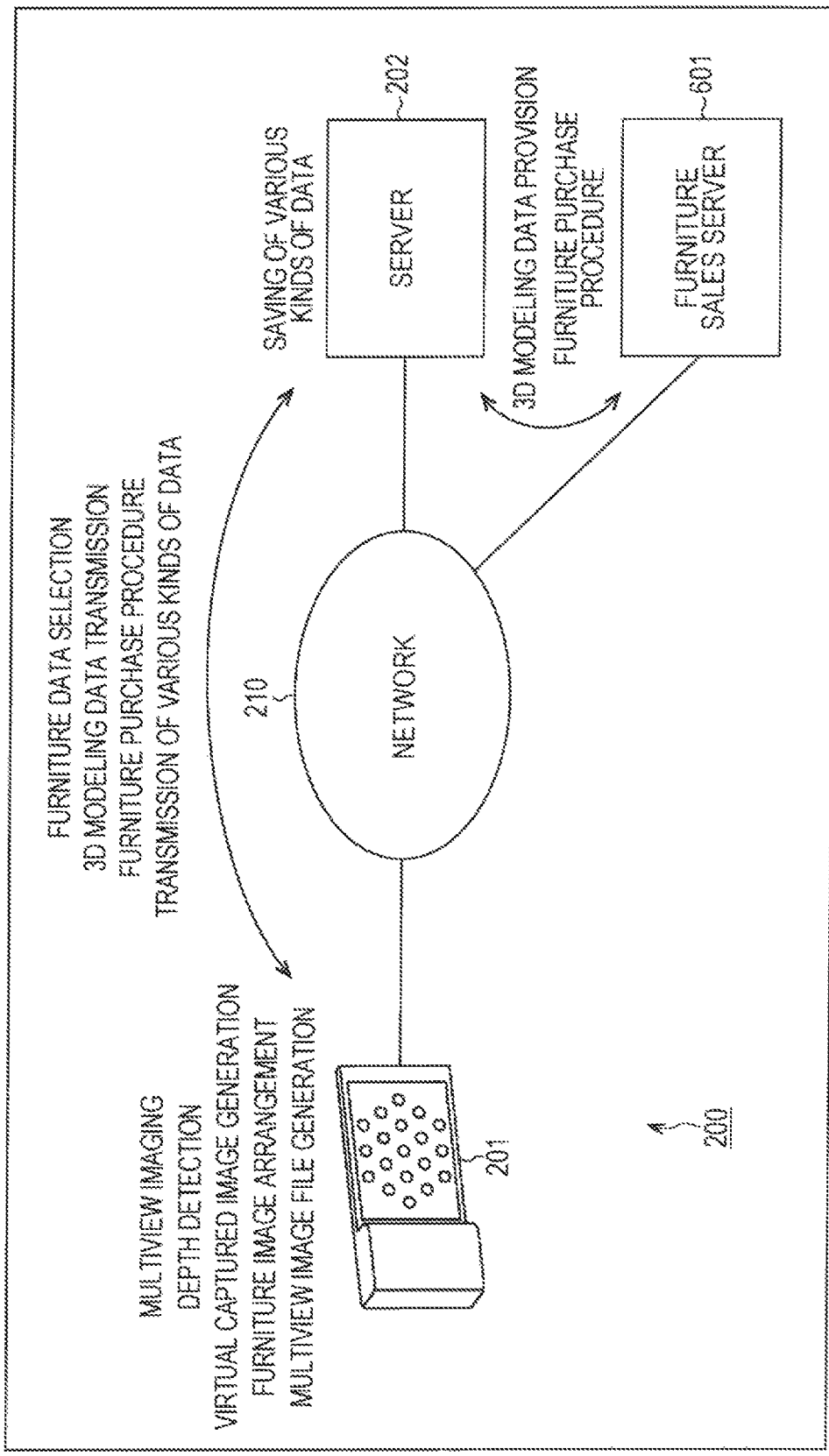
FIG. 27 is a diagram showing yet another typical example structure of a multiview-image using service providing system.

FIG. 27 is a diagram showing a typical example structure of a multiview-image using service providing system. The multiview-image using service providing system 200 shown in FIG. 27 is an example of a system to which the present technique is applied. In this system, a server 202 provides a multiview-image using service to a terminal device 201 connected thereto via a network 210. That is, the multiview-image using service providing system 200 is an example of a structure that realizes the multiview-image using service platform 100.

FIG. 27 shows an example of a structure related to the provision of a service related to the sales support (furniture sales support) among the services to be provided by the multiview-image using service platform 100. In FIG. 27, the multiview-image using service providing system 200 includes the terminal device 201, the server 202, and a furniture sales server 601 that are connected to the network 210.

The terminal device 201 captures images of a subject to perform multiview imaging and obtain a multiview image. The terminal device 201 also detects the depth of the multiview image obtained through the multiview imaging. Furthermore, the terminal device 201 generates a virtual captured image by using the multiview imaging. The terminal device 201 also performs a process related to the placement of a furniture image in the virtual captured image. The terminal device 201 further turns the multiview image data and the like into a file, to generate a multiview image file.

The terminal device 201 and the server 202 that are connected to the network 210 in a wired or wireless manner communicate with each other, to perform processes such as selection of furniture data, transmission of three-dimensional modeling data (3D modeling data), furniture purchase procedures, and transmission of various kinds of data.

The server 202 performs processes such as saving of various kinds of data supplied from the terminal device 201.

The server 202 and the furniture sales server 601 that are connected to the network 210 in a wired or wireless manner communicate with each other, to perform processes such as provision of three-dimensional modeling data (3D modeling data) and furniture purchase procedures.

The furniture sales server 601 is the server that performs processes related to sales of furniture or sales support. Specifically, the furniture sales server 601 processes payment in sales of furniture, and provides the furniture image and the 3D modeling data thereof to be used in the sales support, and the like, as described above. The furniture sales server 601 has basically the same structure as the application providing server 402. Therefore, the structure illustrated in FIG. 15 can also be applied to the furniture sales server 601.

<Furniture Sales Support>

Next, a sales support method in a furniture sales support service to be provided by the above described multiview-image using service providing system 200 is described in detail. A product support service to be provided by the multiview-image using service platform 100 to which the present technique is applied is a service that virtually places an object as an image of the product being currently promoted in a desired background image, to cause a user to envision a situation where the product is actually used. The furniture sales support service to be provided by the multiview-image using service providing system 200 shown in FIG. 27 uses an image of the furniture being currently promoted (furniture image) as an example of the object, and uses a virtual captured image as an example of the background image. That is, this furniture sales support service is a service that places a furniture image in a virtual captured image, to cause a user to envision a situation where the furniture is actually placed in a room or the like. In doing so, the furniture sales support service not only combines the virtual captured image with the furniture image, but also sets the size and the orientation of the furniture image in accordance with the placement position of the furniture image by using the depth data of the virtual captured image. Accordingly, it is possible to cause the user to envision a more accurate situation.

More specifically, the terminal device 201 generates the virtual captured image 611 shown in FIG. 28A from a multiview image obtained by multiview imaging. For example, the user performs multiview imaging on the room to be furnished with the furniture to be purchased, and generates the virtual captured image 611 of the room. The terminal device 201 also generates the depth data (depth map) 612 of the virtual captured image 611 as shown in FIG. 28B from the multiview image obtained by the multiview imaging.

The terminal device 201 then acquires the image (the furniture image) of the furniture being sold by the furniture sales server 601 and the 3D modeling data thereof from the server 202, and places the furniture image in the virtual captured image 611 (the room image) as in the combined image 613 shown in FIG. 28C. Here, the 3D modeling data may be a data to display three dimensional shape of the object such as furniture. The 3D modeling data can be information related with coordinates which indicate height, width, and depth of each position organizing external shape of the object, or the 3D modeling data can be set of polygons to organize external surfaces of the object, or set of free form curve lines based on the coordinates, and the like. Or more specifically, 3D modeling data could be information just indicating height, width, and depth of whole object. Further, 3D modeling data could include information defining color, texture, design pattern, reflectance or transparence of each surface organizing the external shape of the object. The placing of the furniture image is performed by using the depth data 612, and the size and the orientation of the furniture image are appropriately set in accordance with the distance to the placement position of the furniture image in the depth direction and the like. Specifically, for example, the terminal device 201 determines a modeling condition at the placement position in the virtual captured image 611 based on the acquired 3D modeling data. Here, the modeling condition may be a condition of the 3D modeling data applied the size and the orientation based on the placement position when the 3D modeling data is placed. Further, for example, the terminal device can also determine the modeling condition as a change of the color or the texture associated with light source and the placement position, or a change of a shape if the object could be changed in shape in response to the placement position.

Also, the depth-direction positional relationship (the degree of overlapping) with other subjects in the image can be accurately reproduced in accordance with the distance to the placement position in the depth direction, as in the image shown in FIG. 29B, which shows a Christmas tree placed behind the person shown in the image in FIG. 29A.

Further, the placement position can be designated by the user, and the user can freely move the furniture image in the room displayed as the virtual captured image 611. The movement of furniture can be performed by set modeling condition based on the 3D modelling data again, in response to change of the condition of the designated furniture such as the position or the orientation. The user can also select the furniture image to be placed from the furniture images being provided to users by the furniture sales server 601 (the server 202). For example, the user can change colors and sizes of furniture. Also, types of furniture can be changed. For example, a chair can be replaced with a sofa.

Figure 28:
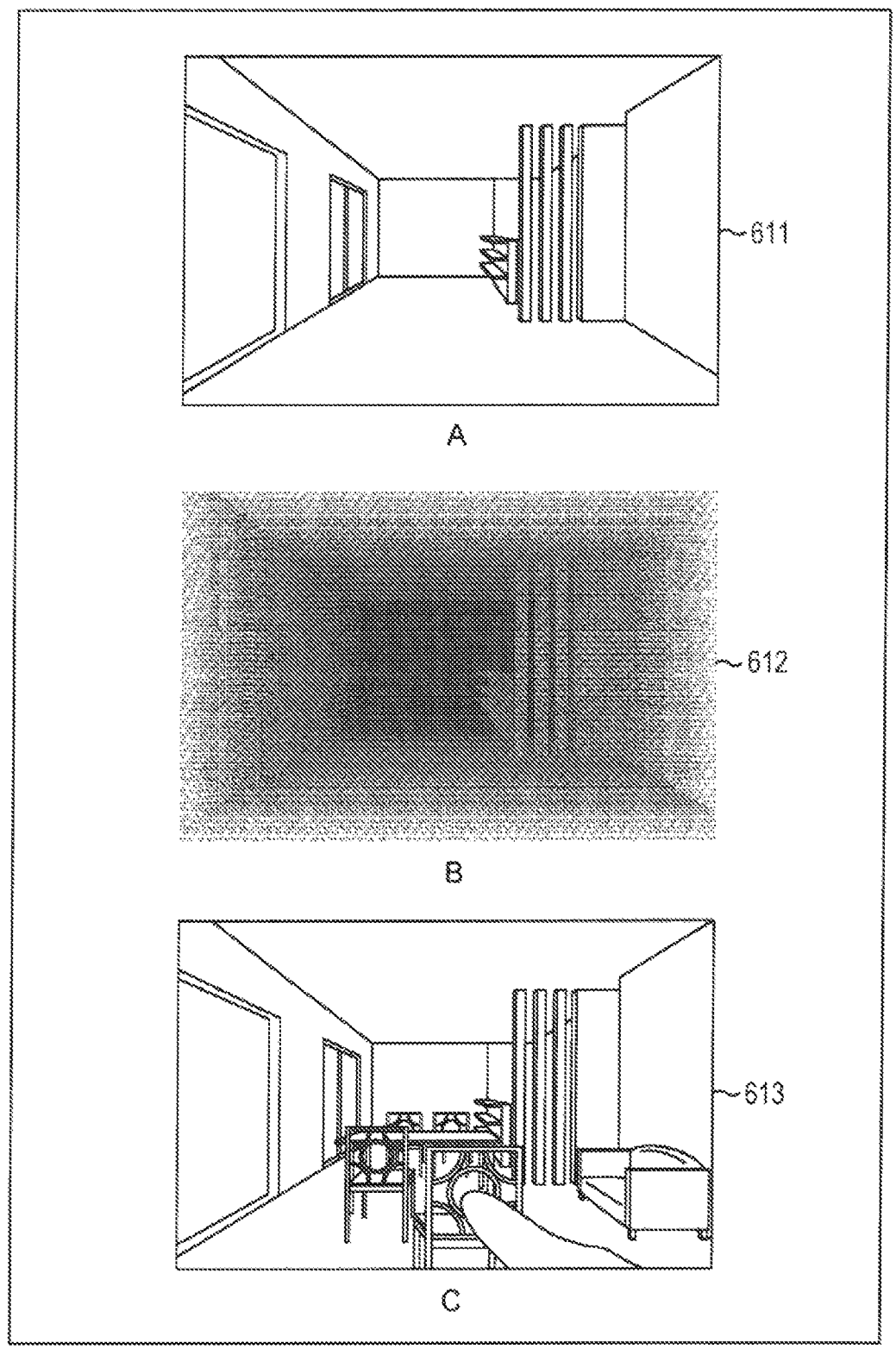
FIG. 28 is a diagram for explaining an example furniture layout.

Here, user can remove an object which has already been placed in the room as the displayed virtual captured image 611, and place a designated furniture image at the place where the removed object had been placed. Specifically, the terminal device 201 can discriminate particular object in the virtual captured image 511 by analyzing the virtual captured image. The discrimination can be preformed based on a change of contrast in the virtual captured image, depth data (depth map), and the like, and for example the wall, the column, or the shelf described in the FIG. 28 are identified as individual object each other. User can designate each identified object, and the terminal device can generate an image which is the virtual captured image without the designated object, in response to user instruction for the designated object. The place where the removed object has been placed in the virtual captured image can be represented as an extended plane of the floor or the wall simulated based on the depth data (depth map) 612, or represented by change of the condition of the object to display translucent condition. So that user can confirm a situation of the room, the designated object of which is removed, or is replaced to designated furniture after the removal.

The number of pieces of furniture to be combined with the virtual captured image is not fixed, and may be one or more. The terminal device 201 can also cause the server 202 or the like to record the image data of the combined image showing the result of the placement of the furniture image. Accordingly, the user can readily recheck the result of the placement of the furniture image later.

As the furniture sales support application is executed in the terminal device 201, for example, the user can receive the furniture sales support service. That is, before purchasing the furniture, the user can virtually place virtual furniture (a furniture image) in the place (such as a room) to be furnished with the furniture (or can simulate placement of the furniture). Accordingly, the user can eliminate the anxiety about the purchase of the furniture before actually purchasing, and the motivation to purchase can be increased. In short, the multiview-image using service providing system 200 can support sales of furniture by providing the above described furniture sales support service.

<Functional Blocks>

Figure 30:
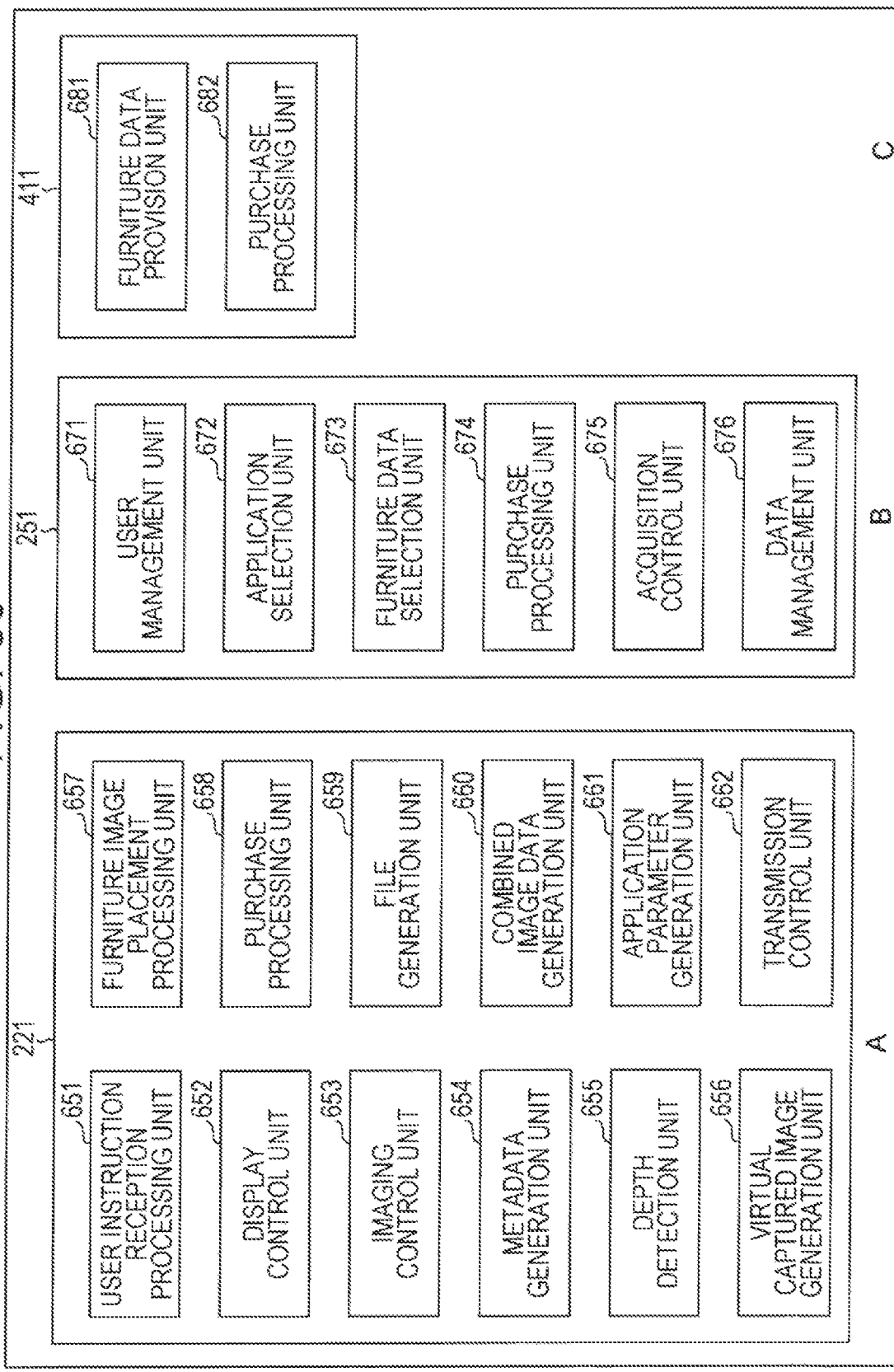
FIG. 30 is a functional block diagram for explaining the functions of the terminal device, the server, and the furniture sales server.

The terminal device 201 has functions shown as functional blocks in FIG. 30A, as the CPU 221 executes a predetermined program. As shown in FIG. 30A, the CPU 221 has functional blocks such as a user instruction reception processing unit 651, a display control unit 652, an imaging control unit 653, a metadata generation unit 654, a depth detection unit 655, a virtual captured image generation unit 656, a furniture image placement processing unit 657, a purchase processing unit 658, a file generation unit 659, a combined image data generation unit 660, an application parameter generation unit 661, and a transmission control unit 662.

The user instruction reception processing unit 651 controls the input unit 231 or the like, to perform a process related to reception of a user instruction. The display control unit 652 controls the output unit 232 or the like, to perform a process related to display control to display an image such as a GUI or a guide on a monitor. The imaging control unit 653 performs a process related to multiview imaging control. The metadata generation unit 654 performs a process related to generation of metadata of a multiview image obtained by multiview imaging. The depth detection unit 655 performs a process related to detection of the depth of the multiview image. The virtual captured image generation unit 656 performs a process related to generation of a virtual captured image. The furniture image placement processing unit 657 performs a process related to the placement of a furniture image in the virtual captured image. The purchase processing unit 658 performs a process related to a purchase of furniture. The file generation unit 659 performs a process related to generation of a multiview image file. The combined image data generation unit 660 performs a process related to generation of combined image data in which the furniture image is combined with the virtual captured image. The application parameter generation unit 661 performs a process related to generation of application parameters about the application. The transmission control unit 662 controls the communication unit 234 or the like, to perform a process related to transmission of various kinds of information.

Meanwhile, the server 202 has functions shown as functional blocks in FIG. 30B, as the CPU 251 executes a predetermined program. As shown in FIG. 30B, the CPU 251 has functional blocks such as a user management unit 671, an application selection unit 672, a furniture data selection unit 673, a purchase processing unit 674, an acquisition control unit 675, and a data management unit 676.

Like the user management unit 291, the user management unit 671 performs a process related to management of users to whom multiview-image using services are to be provided. The application selection unit 672 controls the communication unit 264 to communicate with the terminal device 201 or the like, and performs a process related to selection of the application to be executed. The furniture data selection unit 673 controls the communication unit 264 or the like to communicate with the terminal device 201, and performs a process related to selection of the furniture (furniture image) to be placed in a virtual captured image. The purchase processing unit 674 controls the communication unit 264 or the like to communicate with the terminal device 201 and the furniture sales server 601, and performs a process related to a purchase of furniture. The acquisition control unit 675 controls the communication unit 264 or the like, to perform a process related to acquisition of various kinds of data transmitted from the terminal device 201 or the like. Like the data management unit 295, the data management unit 676 performs a process related to management of data such as a multiview image file, and management of an application and data related to the application.

Further, the furniture sales server 601 has functions shown as functional blocks in FIG. 30C, as the CPU 411 executes a predetermined program. As shown in FIG. 30C, the CPU 411 has functional blocks such as a furniture data provision unit 681 and a purchase processing unit 682.

The furniture data provision unit 681 performs a process related to provision of the data to be used in the furniture sales support, such as a furniture image and 3D modeling data. The purchase processing unit 682 controls the communication unit 424 or the like to communicate with the server 202, and performs a process related to a furniture purchase procedure.

<Flow of a Multiview-Image Using Service Providing Process>

Figure 31:
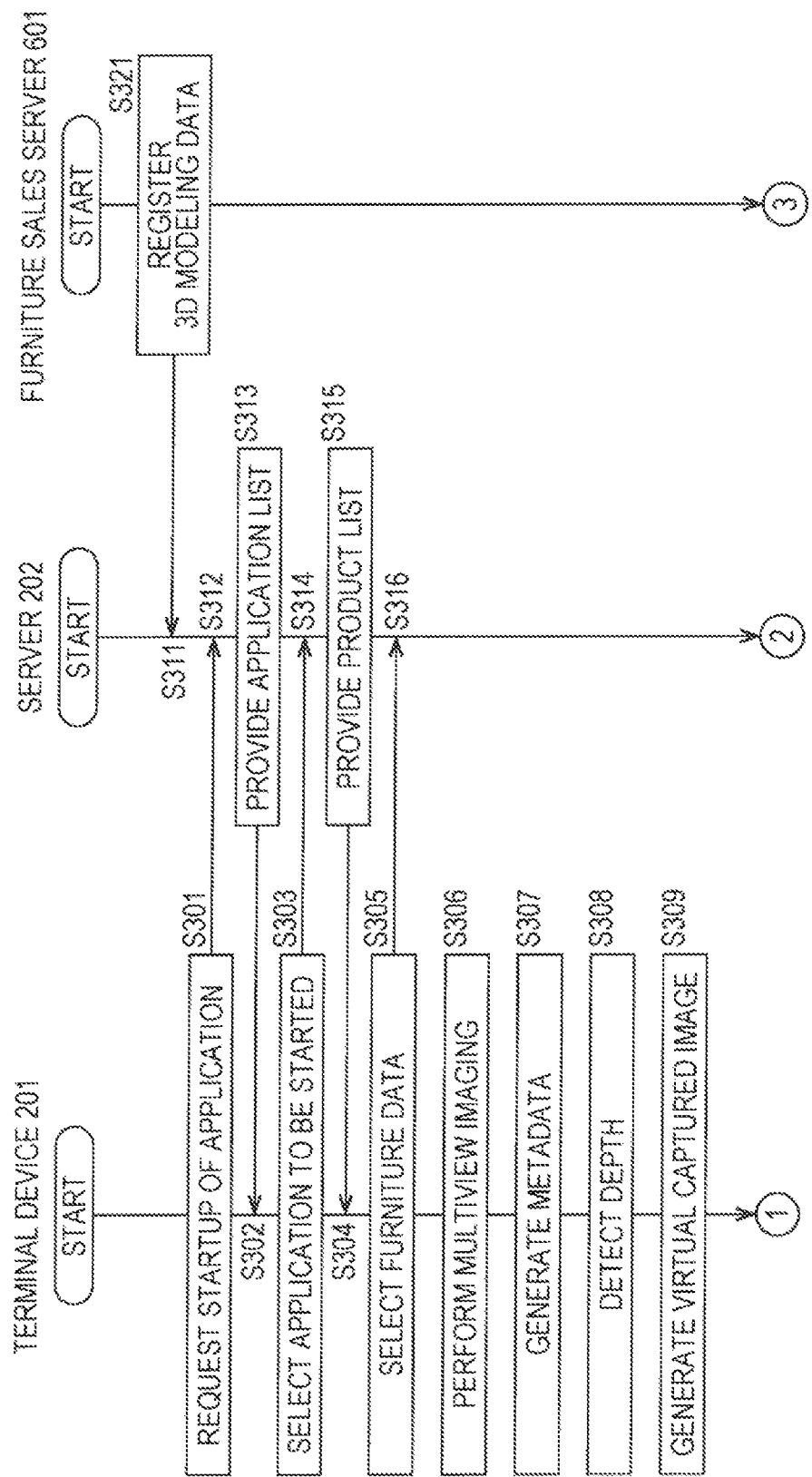
FIG. 31 is a flowchart showing yet another example flow of a multiview-image using service providing process.

The terminal device 201, the server 202, and the furniture sales server 601 of the multiview-image using service providing system having the above described structure perform a multiview-image using service providing process to provide a service using multiview images, or provide a product sales support service in this embodiment. Referring now to the flowchart shown in FIGS. 31 through 33, an example flow of the multiview-image using service providing process to be performed by those devices is described.

In step S321, the furniture data provision unit 681 of the furniture sales server 601 supplies the image data of a furniture image and the 3D modeling data thereof to the server 202, and registers the image data and the 3D modeling data therein. In step S311, the data management unit 676 of the server 202 acquires those data, and registers and manages those data as the data of the furniture being promoted.

In step S301, the user instruction reception processing unit 651 of the terminal device 201 controls the input unit 231 or the like, to receive an instruction to request startup of an application from a user. The transmission control unit 662 controls the communication unit 234 or the like, to supply the application startup request received by the user instruction reception processing unit 651 to the server 202.

In step S312, the application selection unit 672 of the server 202 controls the communication unit 264 or the like, to acquire the request. In step S313, the application selection unit 672, in response to the request, generates a list of applications that can be used by the user based on the user management information being managed by the user management unit 671, and controls the communication unit 264 or the like, to supply the list to the terminal device 201.

In step S302, the transmission control unit 662 of the terminal device 201 controls the communication unit 234 or the like, to acquire the list. The display control unit 652 controls the output unit 232, to display the acquired list as an image on a monitor. The user then selects the application to be started from the list.

In step S303, the user instruction reception processing unit 651 controls the input unit 231 or the like, to receive an instruction as to the selection of the application to be started from the user. The transmission control unit 662 controls the communication unit 234 or the like, to supply the application-to-start selection instruction received by the user instruction reception processing unit 651 to the server 202.

In step S314, the application selection unit 672 of the server 202 controls the communication unit 264 or the like, to acquire the selection instruction. In step S315, the furniture data selection unit 673 generates a product list that is a list of the pieces of furniture that can be sold to the user based on the user management information being managed by the user management unit 671, and controls the communication unit 264 or the like, to supply the list to the terminal device 201.

In step S304, the transmission control unit 662 of the terminal device 201 controls the communication unit 234 or the like, to acquire the list. The display control unit 652 controls the output unit 232, to display the acquired list as an image on a monitor. The user then selects the furniture (furniture data) to be the current furniture data from the list.

In step S305, the user instruction reception processing unit 651 controls the input unit 231 or the like, to receive a furniture data selection instruction from the user. The transmission control unit 662 controls the communication unit 234 or the like, to supply the furniture data selection instruction received by the user instruction reception processing unit 651 to the server 202.

In step S316, the furniture data selection unit 673 of the server 202 controls the communication unit 264 or the like, to acquire the selection instruction.

In step S306, the imaging control unit 653 of the terminal device 201 that has supplied the furniture data selection instruction controls the imaging unit 236 to perform multiview imaging. In step S307, the metadata generation unit 654 generates the metadata to be associated with the multiview image generated in step S306. The contents of the metadata are not fixed, but the metadata may include information such as the camera array information 342 and the viewpoint number information 343 as described above with reference to FIG. 11.

In step S308, the depth detection unit 655 detects the depth value of the multiview image, and generates depth data (a depth map). The depth detection unit 655 generates the depth data by performing the depth detection process described above with reference to FIG. 14, for example. In step S309, the virtual captured image generation unit 656 generates a virtual captured image by using the multiview image.

Figure 32:
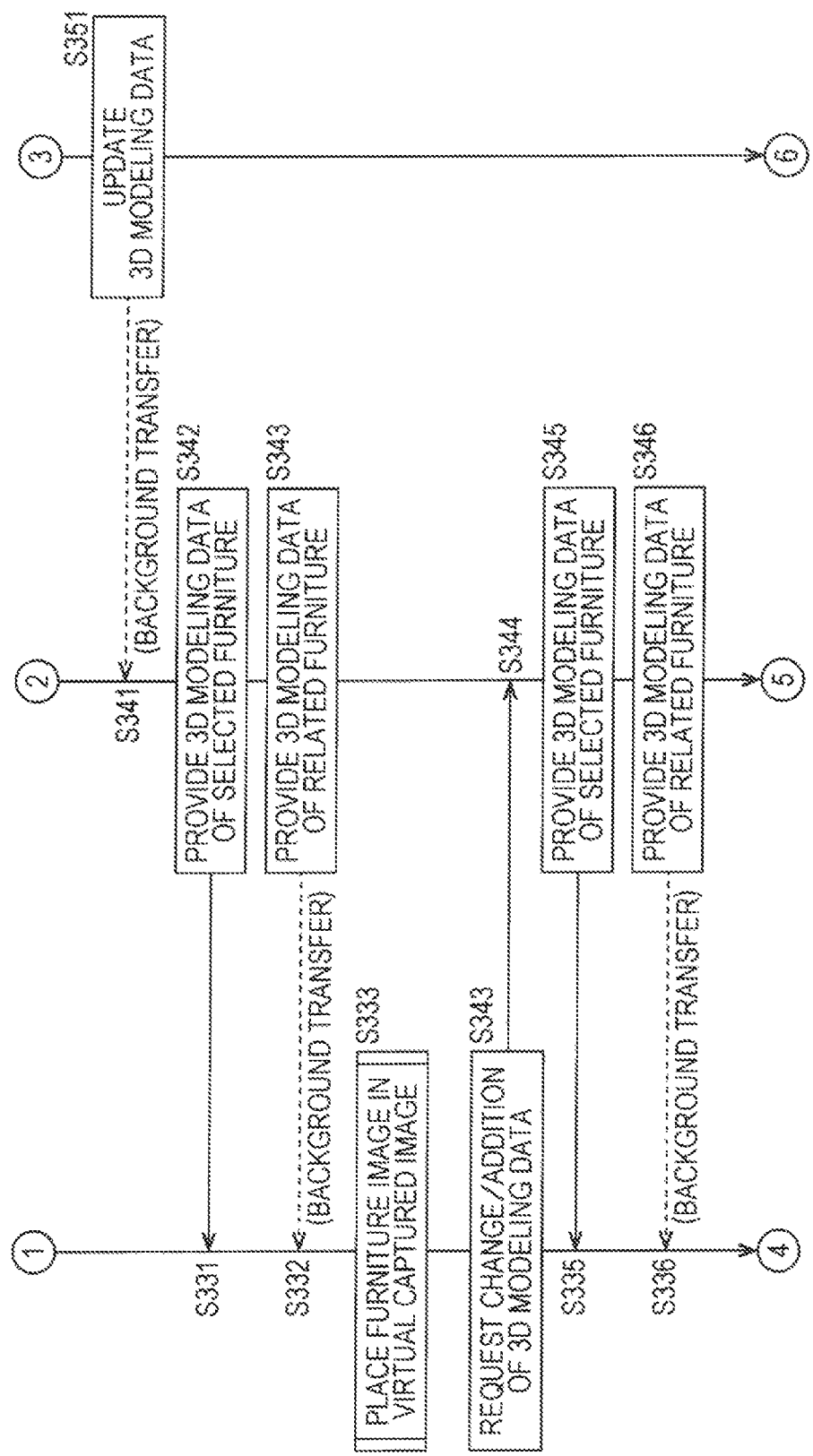
FIG. 32 is a flowchart showing yet another example flow of a multiview-image using service providing process, continued from FIG. 31.

Referring now to FIG. 32, when the image data of the furniture image and the 3D modeling data thereof are updated, the furniture data provision unit 681 of the furniture sales server 601 in step S351 controls the communication unit 424 or the like, to supply those data to the server 202 by a background transfer as appropriate. In step S341, the data management unit 676 of the server 202 acquires those data, and updates the registered information.

In step S342, in accordance with the furniture data selection instruction acquired in step S316, the furniture data selection unit 673 of the server 202 controls the communication unit 264 or the like, to provide the image data of the selected furniture and the 3D modeling data thereof to the terminal device 201. In step S331, the transmission control unit 662 of the terminal device 201 controls the communication unit 234, to acquire the image data of the furniture and the 3D modeling data.

In step S343, the furniture data selection unit 673 of the server 202 also selects a piece of furniture (in a different color or a different size) highly related to the furniture indicated by the furniture data provided in step S342, and controls the communication unit 264 or the like, to supply a furniture image of the selected furniture, the 3D modeling data thereof, and the like to the terminal device 201 by a background transfer as appropriate. In step S332, the transmission control unit 662 of the terminal device 201 controls the communication unit 234, to acquire the image data of the furniture and the 3D modeling data thereof.

As the furniture-related data is transmitted to the terminal device 201 by a background process without a request from the terminal device 201, the user of the terminal device 201 can replace the furniture image placed in a virtual captured image with an image of a highly-related piece of furniture, without a time lag in the communication for data acquisition.

In step S333, the furniture image placement processing unit 657 of the terminal device 201 performs a furniture image placement process to place the furniture image that is an example of an object in the virtual captured image that is an example of a background image. In doing so, the furniture image placement processing unit 657 sets the size and the orientation of the furniture image in accordance with the placement position of the furniture image. If the furniture image and the 3D modeling data need to be changed, or a furniture image and 3D modeling data need to be added as a result of the furniture image placement process, the furniture image placement processing unit 657 in step S334 controls the communication unit 234 or the like, to request the server 202 to change furniture images and 3D modeling data or add a furniture image and 3D modeling data.

In step S344, the furniture data selection unit 673 of the server 202 controls the communication unit 264 or the like, to acquire the request. In step S345, in response to the request, the furniture data selection unit 673 controls the communication unit 264 or the like, to provide an image data of the selected furniture and the 3D modeling data thereof to the terminal device 201. In step S335, the transmission control unit 662 of the terminal device 201 controls the communication unit 234, to acquire the image data of the furniture and the 3D modeling data thereof.

In step S345, the furniture data selection unit 673 of the server 202 also selects a piece of furniture (in a different color or a different size) highly related to the furniture indicated by the furniture data provided in step S344, and controls the communication unit 264 or the like, to supply a furniture image of the selected furniture, the 3D modeling data thereof, and the like to the terminal device 201 by a background transfer as appropriate. In step S336, the transmission control unit 662 of the terminal device 201 controls the communication unit 234, to acquire the image data of the furniture and the 3D modeling data.

As the furniture-related data is transmitted to the terminal device 201 by a background process without a request from the terminal device 201, the user of the terminal device 201 can replace the furniture image placed in a virtual captured image with an image of a highly-related piece of furniture, without a time lag in the communication for data acquisition.

Figure 33:
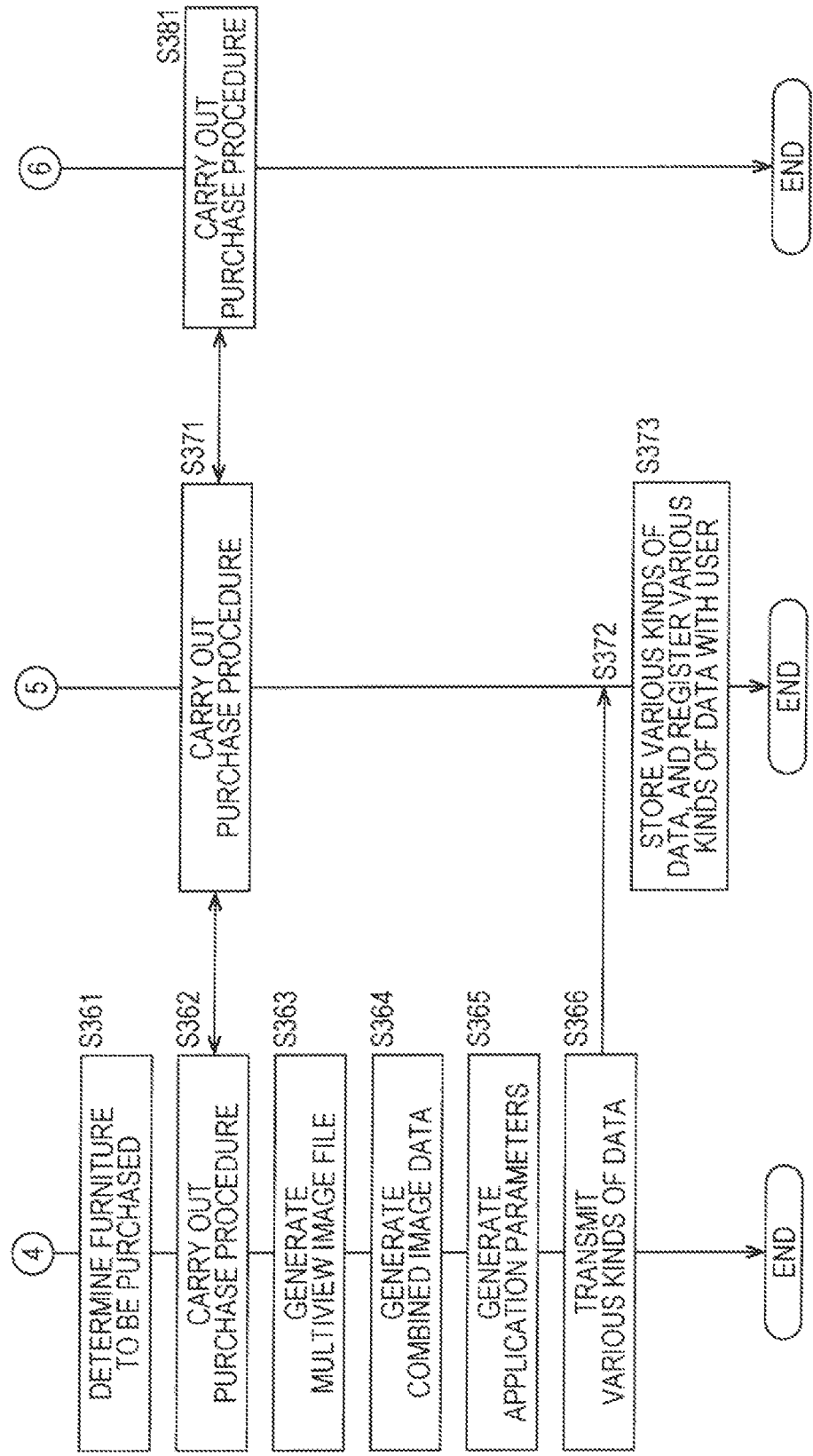
FIG. 33 is a flowchart showing yet another example flow of a multiview-image using service providing process, continued from FIG. 32.

Referring now to FIG. 33, the user of the terminal device 201 determines whether to purchase furniture based on the above described furniture placement simulation. In step S361, the user instruction reception processing unit 651 controls the input unit 231 or the like, to receive a user instruction, and determines which piece of furniture is to be purchased in accordance with the instruction.

In step S362, the purchase processing unit 658 of the terminal device 201 controls the communication unit 234 or the like to communicate with the server 202, and performs a process related to the purchase, such as a payment process. In step S371, the purchase processing unit 674 of the server 202 controls the communication unit 264 or the like to communicate with the terminal device 201 and the furniture sales server 601, and performs a process related to the purchase, such as a payment process. In step S381, the purchase processing unit 682 of the furniture sales server 601 controls the communication unit 424 or the like to communicate with the terminal device 201 and the server 202, and performs a process related to the purchase, such as a payment process.

In step S363, the file generation unit 659 of the terminal device 201 generates a multiview image file. The format of the multiview image file may be of any type. In a case where the multiview image is a still image, for example, the multiview image may be turned into a file in the Exif file format. In a case where the multiview image is a moving image, for example, the multiview image may be turned into a file in the MP4 file format. It is of course possible to use a file format other than the above.

In step S364, the combined image data generation unit 660 generates the data of a combined image (combined image data) formed by placing and combining the furniture image with the virtual captured image in accordance with a user instruction.

In step S365, the application parameter generation unit 661 generates the application parameters of the application for performing the product sales support. The application parameters are history information that indicates which values have been set for which parameters, what kinds of operations (instructions) have been conducted by the user, and what kinds of processes have been performed in this furniture sales support.

In step S366, the transmission control unit 662 controls the communication unit 234, to supply the various kinds of data (the multiview image file (the multiview image data, the depth data, the metadata, and the like), the combined image data, the application parameters, and the like) generated in the above described manner, to the server 202.

In step S372, the acquisition control unit 675 of the server 202 controls the communication unit 264, to acquire the various kinds of data.

In step S373, the data management unit 676 stores the various kinds of data acquired in step S372, and registers the various kinds of data with the user (or causes the user management information to reflect the various kinds of data).

When the processing in step S373 is finished, the multiview-image using service providing process comes to an end.

As such a multiview-image using service providing process is performed, a user can perform a furniture placement simulation more easily by using a multiview image. Also, generated combined image data is registered with the user and is managed in the server 202. Accordingly, the user can readily recheck the result of furniture placement. That is, the multiview-image using service providing system 200 (the multiview-image using service platform 100) can increase the user-friendliness of the multiview-image using service.

<Flow of the Furniture Image Placement Process>

Figure 34:
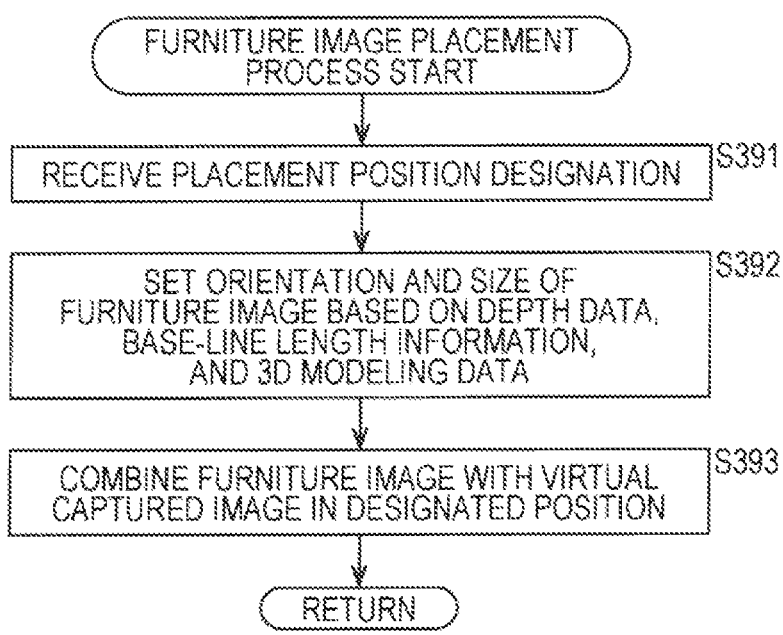
FIG. 34 is a flowchart for explaining an example flow of a furniture image placement process.

Referring now to the flowchart shown in FIG. 34, an example flow of the furniture image placement process performed in step S333 in FIG. 32 is described in detail.

When the furniture image placement process is started, the furniture image placement processing unit 657 in step S391 controls the input unit 231, for example, to receive a placement position designation from the user or the like.

In step S392, the furniture image placement processing unit 657 sets the orientation and the size of the furniture image in the position where the furniture image is placed in the virtual captured image based on the depth data and the base-line length information about the virtual captured image (multiview image) as an example of a background image, and the 3D modeling data of the furniture image as an example of an object.

In step S393, the furniture image placement processing unit 657 places the furniture image having the orientation and the size set in step S392 in the position designated (by the placement position designation received in step S391, for example) in the virtual captured image, and combines the furniture image with the virtual captured image.

When the processing in step S393 is finished, the furniture image placement process comes to an end, and returns to the process shown in FIG. 32.

As the furniture image placement process is performed in the above described manner, a user can more readily perform a furniture placement simulation.

The above described furniture image placement process is not necessarily performed by the terminal device 201, but may be performed by some other device. For example, the furniture image placement process may be performed by the server 202. In that case, the CPU 251 of the server 202 includes the necessary functional blocks such as the furniture image placement processing unit 657. In that case, the furniture image placement process can be performed basically in the same manner as in the above described example. The information that is to be used in the furniture image placement process and is obtained by the terminal device 201, such as a multiview image file, is transmitted to the server 202 where necessary, under the control of the transmission control unit 662.

Likewise, the furniture image placement process may be performed in a device (such as the terminal device 401) other than the terminal device 201 that performs multiview imaging and the server 202, for example. In that case, the CPU of the device includes the necessary functional blocks such as the furniture image placement processing unit 657. In that case, the furniture image placement process can be performed basically in the same manner as in the above described example. The information that is to be used in the furniture image placement process and is obtained by the terminal device 201 or the server 202, such as a multiview image file and furniture data, is transmitted to the device where necessary, under the control of the transmission control unit 662, the furniture data selection unit 673, or the like.

<Furniture Placement Updating Process>

Figure 35:
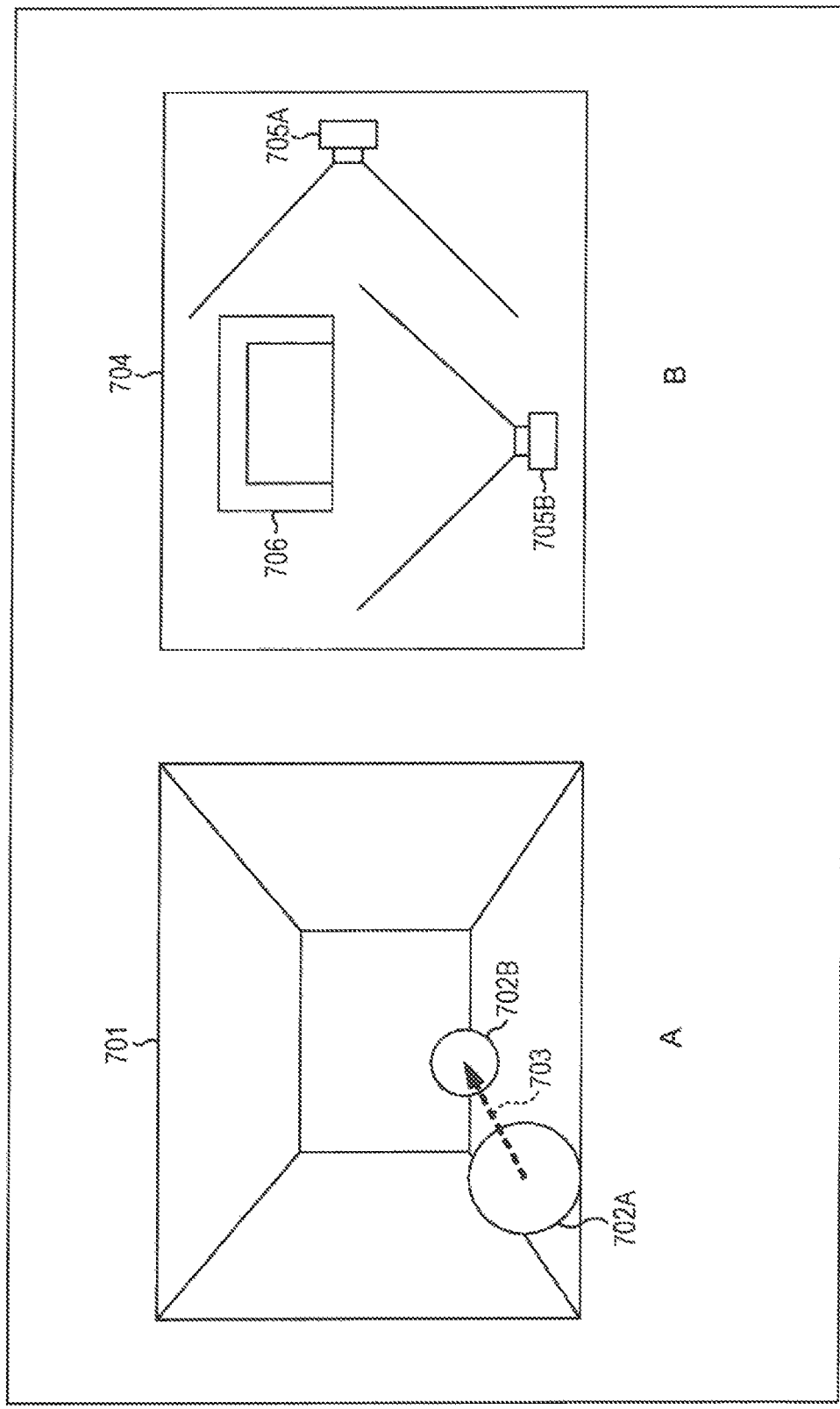
FIG. 35 is a diagram showing examples of furniture layout updates.

If the placement position designation is updated in the above described product sales support application, the furniture image combining position may be changed in accordance with the update. For example, as shown in FIG. 35A, in a case where the placement position designation for a furniture image 702A placed in a virtual captured image 701 is updated as indicated by a dashed arrow 703, the size and the orientation of the furniture image 702A are reset in accordance with the updated placement position (a furniture image 702B).

In a case where the viewpoint of a virtual captured image is updated, the position of the placed furniture image is not updated, and a condition of the furniture image having an appropriate size and an appropriate orientation is relocated in the original position in the virtual captured image with the new viewpoint. For example, as shown in FIG. 35B, a sofa 706 is placed in a virtual captured image formed by capturing an image of a room 704 from a viewpoint 705A. When the viewpoint of the virtual captured image is moved to a viewpoint 705B, the sofa 706 is also shown in the virtual captured image with the updated viewpoint. Therefore, the sofa 706 is placed in the original position in the virtual captured image with the updated viewpoint. At this point, the orientation and the size of the sofa 706 are adjusted appropriately in the virtual captured image with the updated viewpoint.

Figure 36:
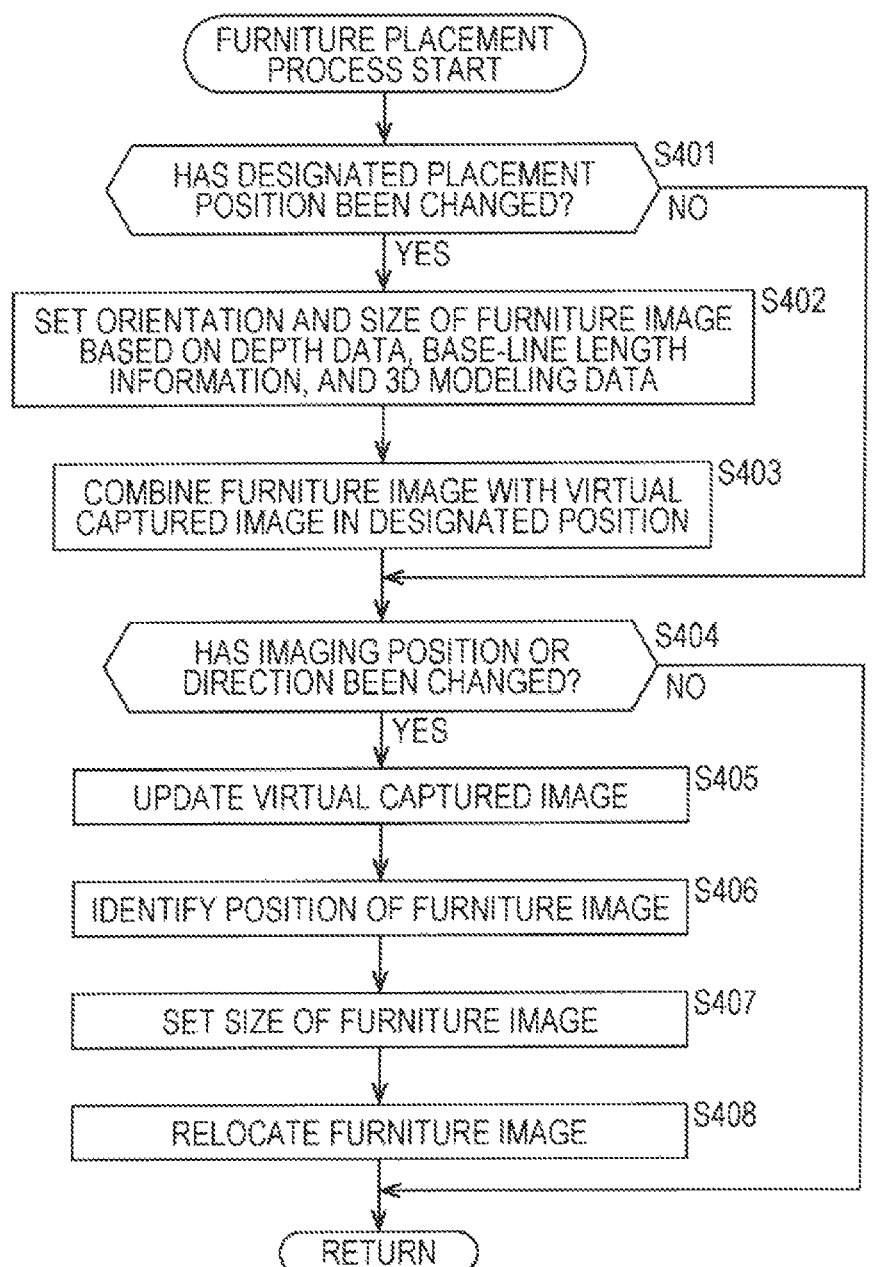
FIG. 36 is a flowchart for explaining an example flow of a furniture placement updating process.

To realize such a function, the furniture image placement processing unit 657 performs a furniture placement updating process. Referring now to the flowchart shown in FIG. 36, an example flow of the furniture placement updating process is described. When the furniture placement updating process is started, the furniture image placement processing unit 657 in step S401 determines whether the designated placement position has been changed. If it is determined that a new placement position designation has been received from the user via the input unit 231, and the placement position designation has been changed, for example, the process moves on to step S402.

In step S402, the furniture image placement processing unit 657 sets the orientation and the size of the furniture image based on depth data and base-line length information as well as 3D modeling data. In step S403, the furniture image placement processing unit 657 combines the furniture image with the virtual captured image in the updated designated position.

When the processing in step S403 is finished, the process moves on to step S404. If the designated placement position is determined not to have been changed in step S401, the process also moves on to step S404.

In step S404, the furniture image placement processing unit 657 determines whether the imaging position or direction has been changed. For example, in a case where a new virtual captured image is generated by new multiview imaging, or where multiview imaging is performed to capture a moving image while the operator is in motion, the imaging position or direction is determined to have been changed. In that case, the process moves on to step S405.

In step S405, the furniture image placement processing unit 657 updates the virtual captured image by re-creating a virtual captured image from a new multiview image. In step S406, the furniture image placement processing unit 657 identifies the position of the furniture image placed before the virtual captured image update in the updated virtual captured image. In step S407, the furniture image placement processing unit 657 sets the size and the orientation of the furniture image in the position specified in step S406 in the updated virtual captured image. In step S408, the furniture image placement processing unit 657 relocates the furniture image having the size and the orientation set in step S407 in the position specified in step S406 in the updated virtual captured image.

When the processing in step S408 is finished, the furniture placement updating process comes to an end. Also, if the imaging position or direction is determined not to have been changed in step S404, the furniture placement updating process comes to an end.

After a furniture image is placed in a virtual captured image, this furniture placement updating process is repeated until the furniture placement simulation is finished. Accordingly, a furniture image having an appropriate size and an appropriate orientation can be typically combined with a virtual captured image in an appropriate position.

<Floor Contact Detrmination>

As for the position of a furniture image, a check may be made to determine whether the furniture image is in contact with the floor or the like in a virtual captured image. For example, in the virtual captured image 711 shown in FIG. 37A, the position of a light stand 712 is designated in the position shown in FIG. 37A. In this case, the light stand 712 is at a distance from a floor 714 as indicated by a dashed double-headed arrow 713, and is placed in the air. This is not a realistic placement position, and is inappropriate and undesirable as a furniture placement simulation.

Figure 37:
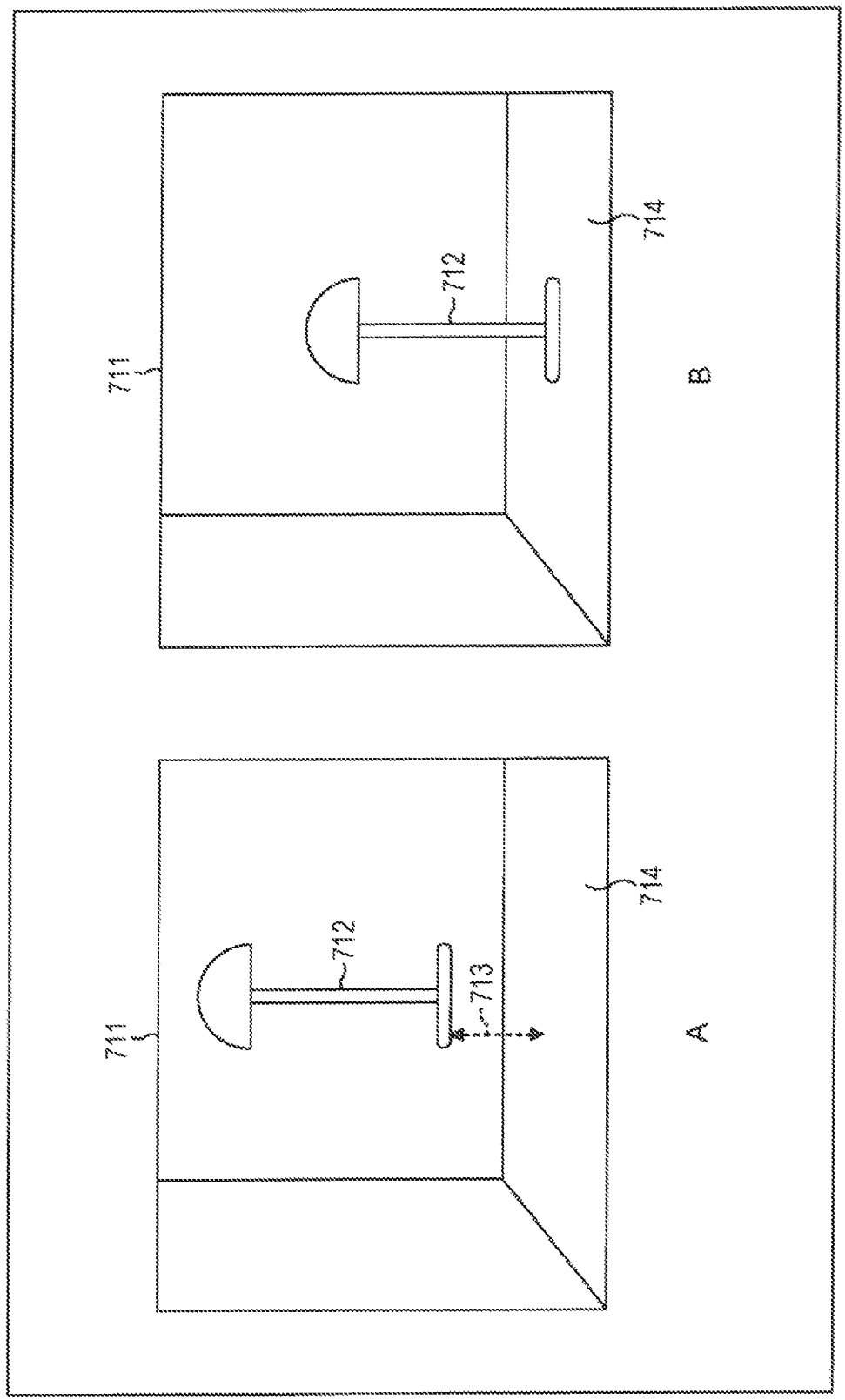
FIG. 37 is a diagram for explaining an example of floor contact determination.

In such a case, the placement position of the light stand 712 may be changed so that the light stand 712 is brought into contact with the floor 714 in the virtual captured image 711 as shown in FIG. 37B. Alternatively, the position may not be changed, but an alarm may be issued to the user or the like.

Figure 38:
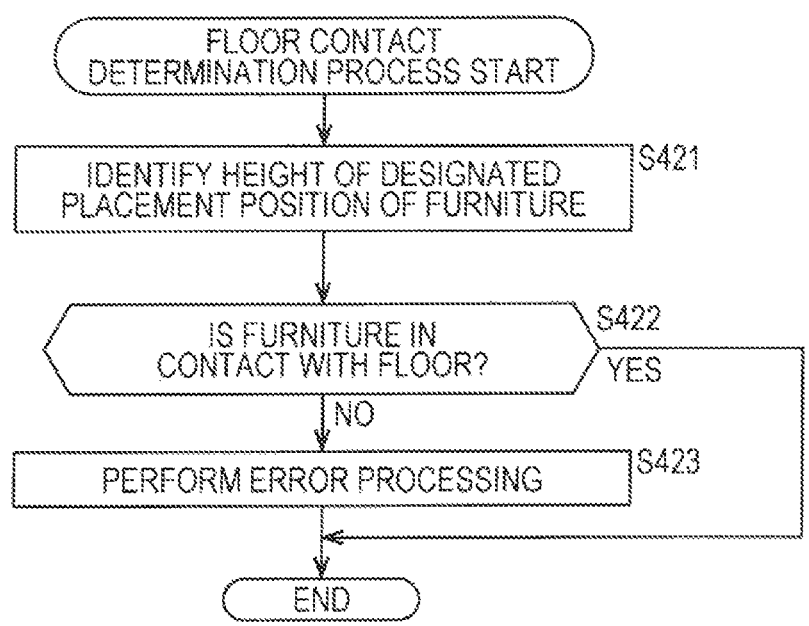
FIG. 38 is a flowchart for explaining an example flow of a floor contact determination process.

To realize such a function, the furniture image placement processing unit 657 performs a floor contact determination process. Referring now to the flowchart shown in FIG. 38, an example flow of the floor contact determination process is described.

When the floor contact determination process is started, the furniture image placement processing unit 657 in step S421 identifies the height of the designated placement position of the furniture from an area such as a floor on which furniture can be placed. In step S422, the furniture image placement processing unit 657 determines whether the furniture image is in contact with the area such as a floor on which furniture can be placed based on the 3D modeling data of the placed furniture image. If the furniture image is not in contact with the area, the process moves on to step S423.

In step S423, the furniture image placement processing unit 657 performs error processing. The contents of the error processing are not fixed, and any processing may be performed. For example, the furniture image may be moved so as to be in contact with the floor based on update of the modeling condition of the 3D modeling data, as described above. Alternatively, the placement position of the furniture image may not be updated, but an alarm may be issued to the user or the like, as described above.

When the processing in step S423 is finished, the floor contact determination process comes to an end. If the furniture image is determined to be in contact with the area such as a floor on which furniture can be placed in step S422, the floor contact determination process also comes to an end.

Every time furniture is placed, the floor contact determination process is performed. As a result, a user can perform a more realistic furniture placement simulation.

The placement position of an object may be adjusted not only in the vertical direction as described above, but also in the horizontal direction (including the transverse direction and the depth direction) of the object based on the contents of the background image (the positions of objects included in the background image).

For example, the background image (a virtual captured image) is an image of a room in which there is a large pillar in the front, there is a space behind the pillar, and there is a wall behind the space. In front of the wall (in the room), the area of the pillar is a placement prohibited area for objects (furniture images), and the space between the pillar and the wall is a placement allowed area for objects (furniture images). In a case where there is an instruction to place a furniture image in the placement prohibited area, the furniture image is moved to the space between the pillar and the wall, which is the placement allowed area, and is then placed therein. At this point, not only the size and the orientation of the furniture image are adjusted in accordance with the placement position after the move, but also part or all of the furniture image is processed so as to be hidden behind the pillar and be combined with the virtual captured image, if necessary.

As a result, a user can perform a more realistic furniture placement simulation.

<Length Measurement>

Figure 39:
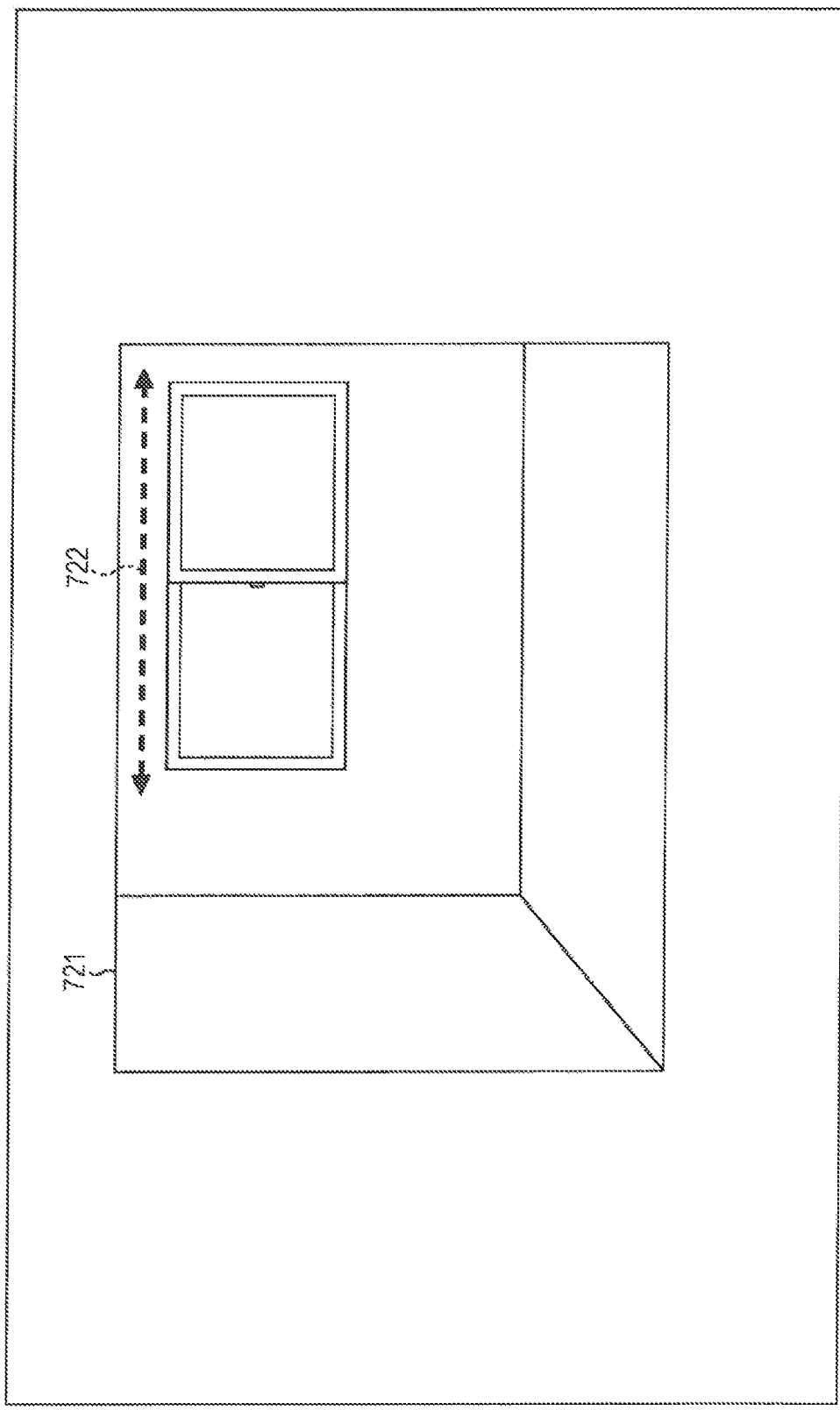
FIG. 39 is a diagram for explaining an example of measurement.

Further, length measurement may be carried out in a virtual captured image. As shown in FIG. 39, in a virtual captured image 721, the width of a window is measured as indicated by a dashed double-headed arrow 722, for example. In the virtual captured image 721, the size of the window varies with the distance to the window in the depth direction. Therefore, a measured length may be corrected in accordance with the distance in the depth direction by using the depth data and the base-line length information about a multiview image, for example.

Figure 40:
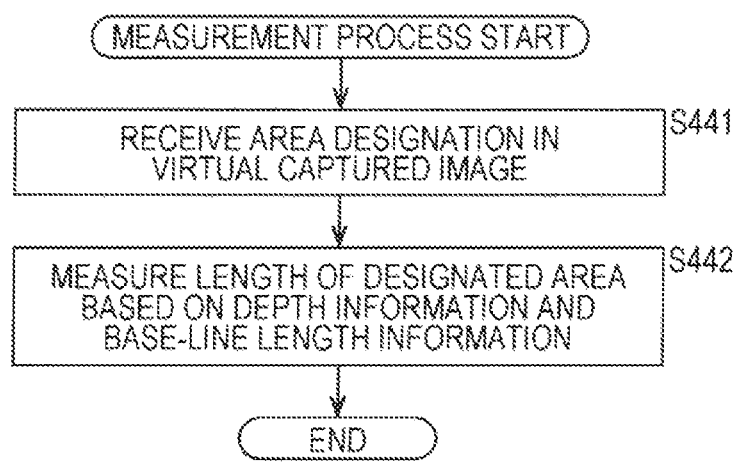
FIG. 40 is a flowchart for explaining an example flow of a measurement process.

To realize such a function, the furniture image placement processing unit 657 performs a measurement process. Referring now to the flowchart shown in FIG. 40, an example flow of the measurement process is described.

When the measurement process is started, the furniture image placement processing unit 657 in step S441 receives a designation of an area in a virtual captured image. After an area is designated, the furniture image placement processing unit 657 in step S442 measures the length of the area based the depth data and the base-line length information about the multiview image used in generating the virtual captured image. When the processing in step S442 is finished, the measurement process comes to an end.

By this process, the length (the dashed double-headed arrow 722) of the window in the horizontal direction can be more accurately measured in the virtual captured image 721 in FIG. 39, for example. Accordingly, when curtains for this window are to be purchased, errors in the measurement of the size of the curtains can be reduced, and a decrease in the user's motivation to purchase can be prevented. That is, sales can be supported by such a service.

<Lighting Process>

Figure 41:
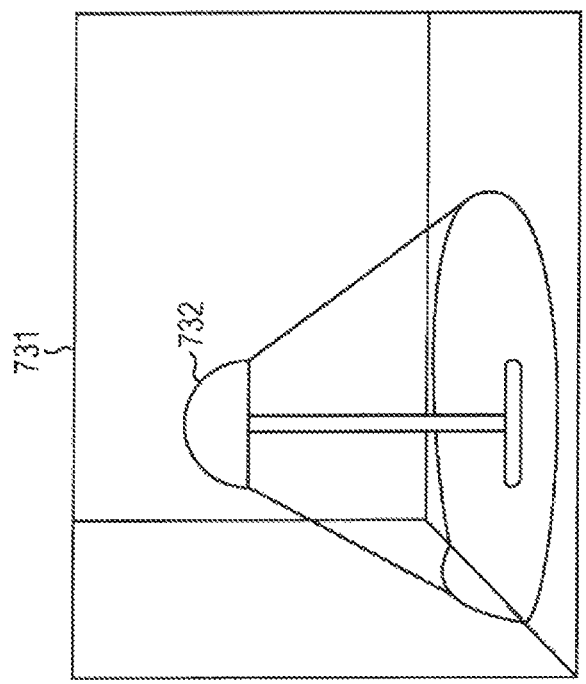
FIG. 41 is a diagram for explaining an example of a lighting simulation.

Also, lighting (light rays) may be reproduced in a virtual captured image. As shown in FIG. 41, a situation where a floor lamp 732 placed in a virtual captured image 731 is on may be reproduced, for example.

Figure 42:
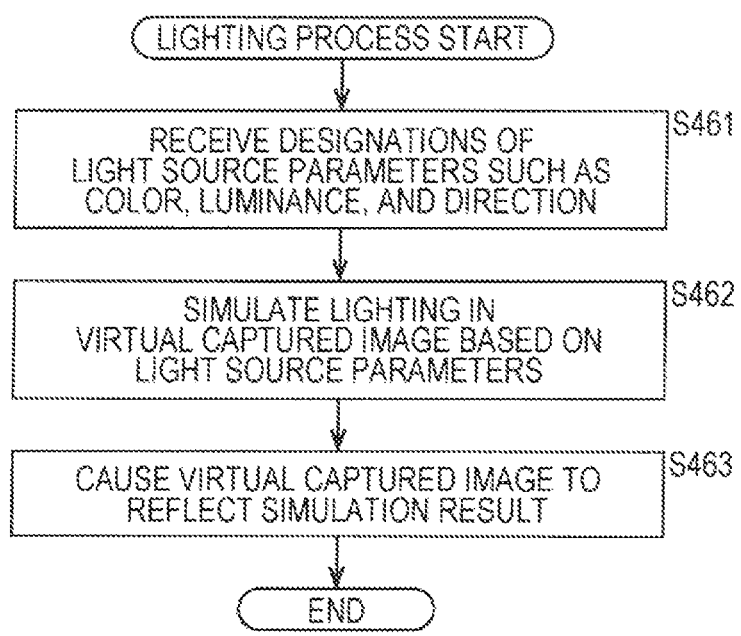
FIG. 42 is a flowchart for explaining an example flow of a lighting process.

To realize such a function, the furniture image placement processing unit 657 performs a lighting process. Referring now to the flowchart shown in FIG. 42, an example flow of the lighting process is described.

When the lighting process is started, the furniture image placement processing unit 657 in step S461 receives designations of light source parameters including parameters related to the light source, such as color, luminance, and direction. The values of the respective parameters included in the light source parameters may be designated by a user, or may be provided as furniture data associated with an image of the furniture (a lighting device). In step S462, the furniture image placement processing unit 657 simulates lighting (light rays from the light source) in a virtual captured image based on the designated light source parameters. In step S463, the furniture image placement processing unit 657 causes the virtual captured image to reflect the result of the simulation. For example, the portion illuminated with light is made brighter, and the portion that is not illuminated with light is made darker or shaded.

As a result, a user can perform a more realistic lighting placement simulation. Accordingly, when a lighting device is purchased, inconvenient differences between the color and brightness of the actually purchased lighting device and estimated color and brightness of the product displayed in the store or shown in a catalog can be reduced. In this manner, a decrease in the use's motivation to purchase can be prevented. That is, sales can be supported by such a service.

<Line-of-Flow Presentation Process>

Figure 43:
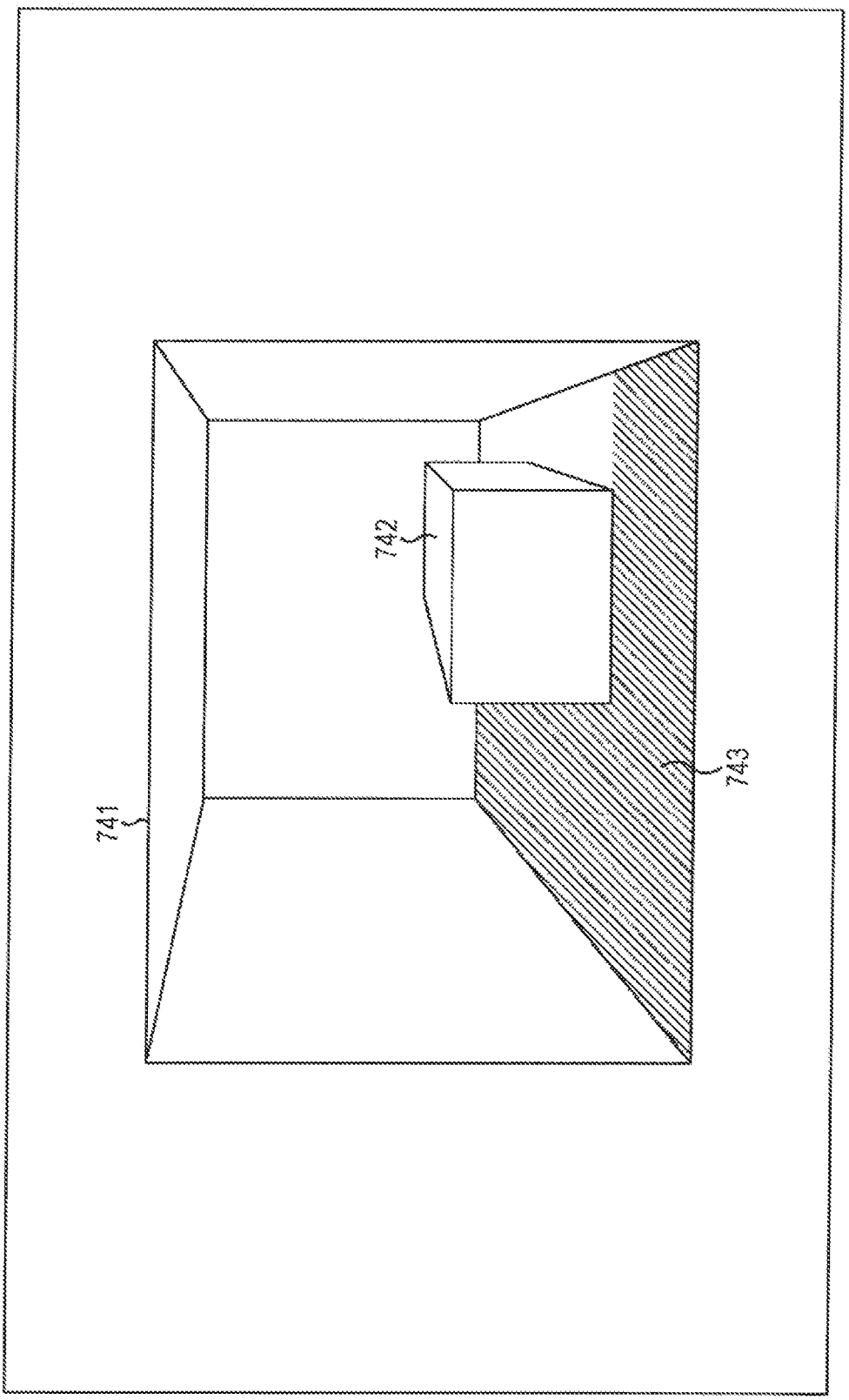
FIG. 43 is a diagram for explaining an example of presentation of a line of flow.

Also, portions to be lines of flow may be emphasized in a virtual captured image. As shown in FIG. 43, a table 742 is placed in a virtual captured image 741, and a portion 743 that satisfies line-of-flow conditions is identified, for example. This portion may be presented to the user. In the example shown in FIG. 43, the portion 743 that satisfies the line-of-flow conditions is emphasized by the shading. The line-of-flow conditions may be that a person can stand on the floor, and a large enough width to allow a person to walk through the place is ensured, for example.

The portion 743 satisfying the line-of-flow conditions may be indicated by a color or luminance, or may be indicated by a symbol or a figure such as an arrow or a star.

Figure 44:
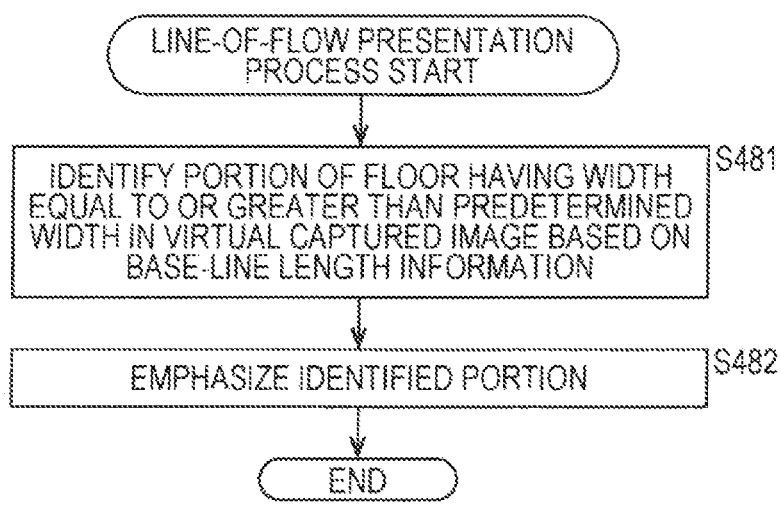
FIG. 44 is a flowchart for explaining an example flow of a line-of-flow presentation process.

To realize such a function, the furniture image placement processing unit 657 performs a line-of-flow presentation process. Referring now to the flowchart shown in FIG. 44, an example flow of the line-of-flow presentation process is described.

When the line-of-flow presentation process is started, the furniture image placement processing unit 657 in step S481 identifies a floor portion having a width equal to or greater than a predetermined width in a virtual captured image, or a portion that satisfies the line-of-flow conditions, based on base-line length information. In step S482, the furniture image placement processing unit 657 emphasizes the identified portion with a pattern, a color, luminance, or the like. When the processing in step S482 is finished, the line-of-flow presentation process comes to an end.

In this manner, a user can simulate a furniture layout so as to secure a line of flow when placing furniture. Accordingly, inconvenience such as a space that is too narrow for a person to walk through due to large furniture can be prevented, for example. Also, a check can be made to determine whether a wide enough space for a wheel chair can be secured before the purchase of furniture, for example. Accordingly, the user's motivation to purchase is increased by such a service, and sales can be supported.

<Human Image Placement>

Figure 45:
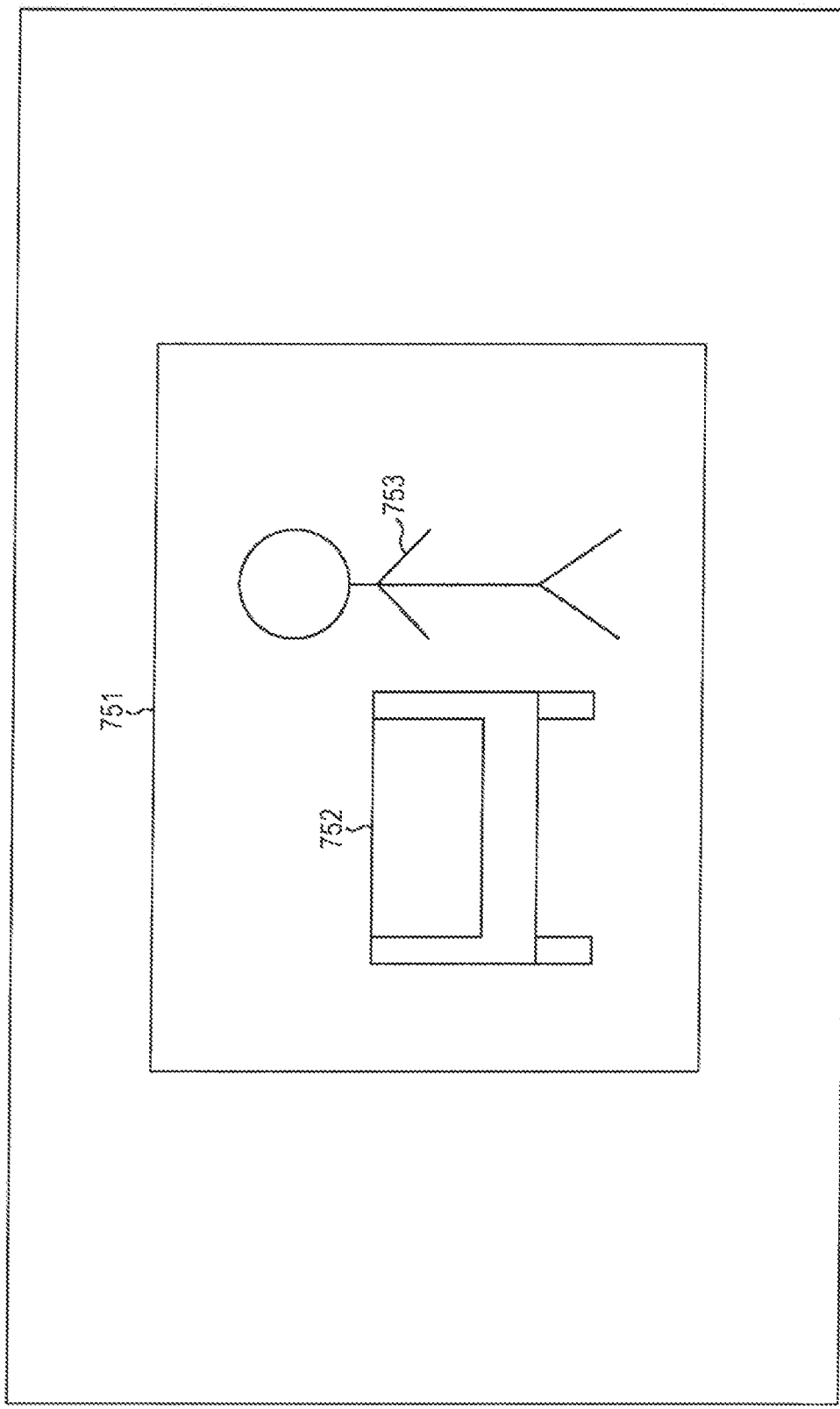
FIG. 45 is a diagram for explaining an example of human image placement.

When furniture is placed, a human image may be placed in a virtual captured image. As shown in FIG. 45, a chair 752 is placed in a virtual captured image 751, and a human image 753 may be placed in its vicinity, for example. This human image may be a captured image of an actual person, or may be an image of a fictional person. In either way, this human image is associated with the same 3D modeling data as that of a furniture image.

Figure 46:
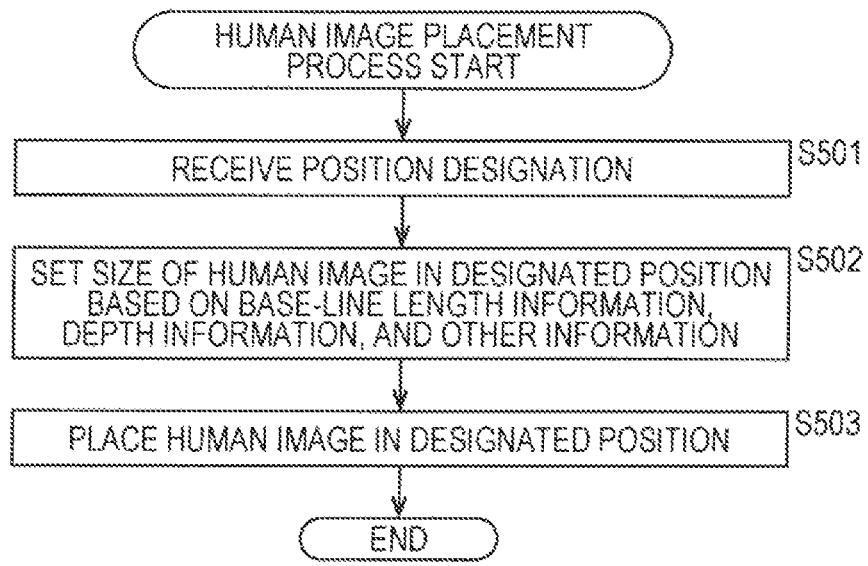
FIG. 46 is a flowchart for explaining an example flow of a human image placement process.

To realize such a function, the furniture image placement processing unit 657 performs a human image placement process. Referring now to the flowchart shown in FIG. 46, an example flow of the human image placement process is described.

When the human image placement process is started, the furniture image placement processing unit 657 in step S501 receives a position designation for the placement position of a human image from a user or the like via the input unit 231 or the like. In step S502, the furniture image placement processing unit 657 sets the size and the orientation of the human image in the designated position based on the base-line length information and the depth data of the captured image used in generating the virtual captured image, as in the case of a furniture image. In step S503, the furniture image placement processing unit 657 places the human image having the size and the orientation set in step S502 in the designated position (designated in step S501, for example). When the processing in step S503 is finished, the human image placement process comes to an end.

In this manner, a user can place not only a furniture image but also a human image in a virtual captured image. Accordingly, furniture placed in a position can be compared with the human image, and the size and the style of the furniture can be more accurately expressed. As a result, inconvenience such as differences in size and impression between the actually purchased furniture and expectations can be reduced, for example. Accordingly, the user's motivation to purchase is increased by such a service, and sales can be supported.

The position of the human image can be set in any appropriate manner. For example, the placement position of the human image may be determined in accordance with the position of the furniture image, and the human image may be placed on or near the furniture image. Alternatively, a user may designate a furniture image, and a human image may be placed in a position in accordance with the designated furniture image, for example. The human image to be placed may be an image of one person or an image of more than one person.

Here, a human image is an example of an image to be combined with (or placed in) a background image (a virtual captured image, for example), and is not an object (a furniture image, for example) to be promoted. In other words, an image other than a human image may be placed in the same manner as in the above described case of a human image. For example, it is possible to use an image of an animal such as a dog or a cat (an animal image), an image of a product that is not being sold (promoted) (a product image), or an image of a person and an animal (a combination image).

Further, when an image is to be placed in the above manner, a user or the like may be allowed to select the image to be placed. For example, a user may be allowed to select a human image, an animal image, a product image, a combination image, or the like. Even more specific selection may be allowed. In the case of a human image, sex, age, posture (standing sitting, or the like), clothes, the number of persons, and the like may be selected, for example. Likewise, in the case of an animal image, a product image, or a combination image, parameters such as category sex, age, size, and color can be selected. An image is selected in any appropriate manner. For example, a user or the like may be allowed to select a desired image from candidates that are prepared in advance. Alternatively, a user or the like may create an image to be combined like the above described human image by processing an image or combining images.

<Restriction on a Furniture List>

As described above, a furniture list is presented when a user selects the furniture to be placed. At that point, a list of the pieces of furniture that can be placed in a virtual captured image may be presented to the user. Specifically, pieces of furniture that are not to be placed in a virtual captured image may be eliminated from the list, and a user or the like may select a furniture image to be placed in the virtual captured image (a background image) from the furniture images (objects) that can be placed in the virtual captured image.

Figure 47:
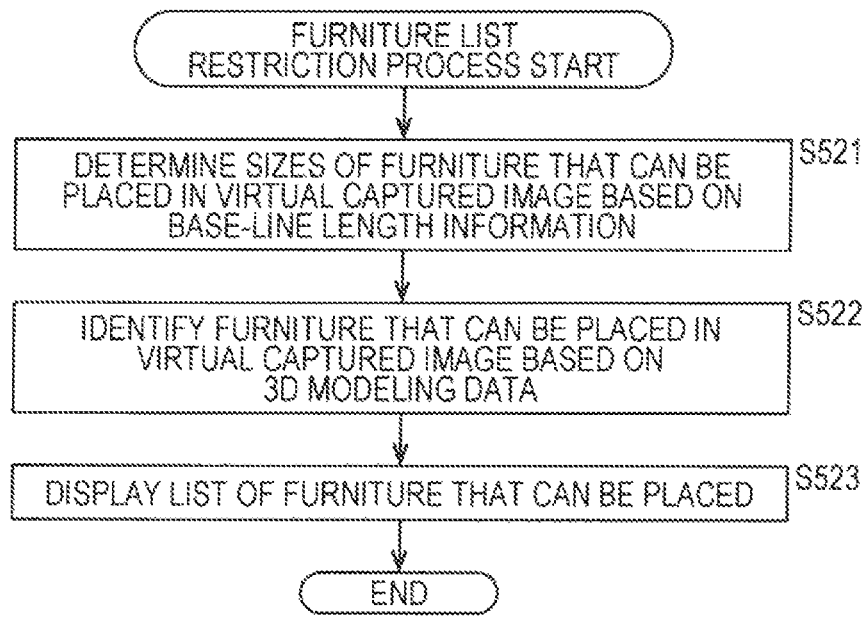
FIG. 47 is a flowchart for explaining an example flow of a furniture list restriction process.

To realize such a function, the furniture image placement processing unit 657 performs a furniture list restriction process. Referring now to the flowchart shown in FIG. 47, an example flow of the furniture list restriction process is described.

When the furniture list restriction process is started, the furniture image placement processing unit 657 in step S521 determines the sizes of furniture that can be placed in a virtual captured image from the base-line length information about the multiview image used in generating the virtual captured image. In step S522, the furniture image placement processing unit 657 identifies pieces of furniture that can be placed in the virtual captured image based on the 3D modeling data of the furniture images in a list supplied from the server 202. In step S523, the furniture image placement processing unit 657 creates a list of the pieces of furniture identified in step S522. The display control unit 652 controls the output unit 232, to display the list created by the furniture image placement processing unit 657 as an image on a monitor. When the processing in step S523 is finished, the furniture list restriction process comes to an end.

In this manner, unnecessary pieces of furniture can be eliminated from the list to be presented to the user. Accordingly, the user can select furniture by referring to the more useful list. Particularly, in a case where there are a large number of pieces of furniture being sold and a large number of kinds of furniture being sold, it might be difficult for a user to select a piece of furniture from the list. Therefore, it is preferable to eliminate the largest possible amount of unnecessary information from the list. Accordingly, furniture selection can be made easier for the user, a decrease in the motivation to purchase can be prevented, and sales can be supported.

In the above description, a virtual captured image obtained by multiview imaging and a furniture image are combined to form an example of a combined image. However, any images may be combined with each other. For example, captured images may be combined with each other, artificial images such as computer graphic images may be combined with each other, or a captured image and an artificial image may be combined with each other. Also, captured images that are partially artificial may be combined with each other. Further, moving images may be combined with each other, still images may be combined with each other, or a moving image and a still image may be combined with each other.

In the above description, in a product support service, an object is combined with a background image. However, the object may be of any kind, as long as it is an image of a product that can be promoted. The object may not have 3D modeling data. For example, 3D modeling data may be provided from a different site from the object. Also, instead of 3D modeling data, simplified information that indicates a size or the like may be used, for example.

A background image is an image in which an object is to be placed, and is not an image that indicates the superimposition relationship (positional relationship) with respect to the object. For example, the background image may include a foreground to be superimposed on the front side of an object. Also, the background image may be formed with only the foreground (that is, the entire background is to be superimposed on the front side of the object). Further, the background image may be the foreground or the background of the object, depending on the position in which the object is placed. That is, the background image may be formed with more than one image (or may be formed by superimposing images on each other). As described above, while the background image is formed with one captured image (a virtual captured image), the object and the background image may be processed as appropriate and be then combined, so that part of the background image comes in front of the object, depending on the placement position (particularly, the position in the depth direction) of the object (a furniture image).

6. Others

It should be noted that the above described series of processes may be performed by hardware or may be performed by software. In a case where the above described series of processes are performed by software, the program forming the software is installed from a network or a recording medium.

This recording medium is formed with a removable medium (such as the removable medium 241, the removable medium 271, or the removable medium 431) that is distributed for delivering the program to users independently of the device, and has the program recorded therein, as shown in FIGS. 4, 6, and 16, for example. This removable medium may be a magnetic disk (a flexible disk) or an optical disk (a CD-ROM or a DVD). Further, the removable medium may be a magnetooptical disk (a MD (Mini Disc), a semiconductor memory, or the like.

In this case, the program can be installed into a storage unit via an input/output interface when the removable medium is mounted in the drive.

Alternatively, this program can be provided via a wired or wireless transmission medium such as a local area network, the Internet, or digital satellite broadcasting. In that case, the program can be received by the communication unit (the communication unit 234, the communication unit 264, or the communication unit 424, for example) of each device, and be installed into the storage unit (the storage unit 233, the storage unit 263, or the storage unit 423, for example) of each device.

Alternatively, this program can be installed into the ROM (the ROM 222, the ROM 252, or the ROM 412, for example) of each device, and be installed beforehand into the storage unit (the storage unit 233, the storage unit 263, or the storage unit 423, for example) of each device.

The programs to be executed by the computer may be programs for performing processes in chronological order in accordance with the sequence described in this specification, or may be programs for performing processes in parallel or performing a process when necessary, such as when there is a call.

In this specification, the steps written in the programs recorded in a recording medium include not only processes to be performed in chronological order in accordance with the sequence described herein, but also processes to be performed in parallel or independently of one another if not necessarily in chronological order.

The processing in each of the above described steps can be performed by each of the above described devices or any appropriate device other than the above described devices. In that case, the device that performs the processing include the above described necessary functions (such as functional blocks) for performing the processing. Also, the necessary information for the processing is transmitted to the device where necessary.

In this specification, a system means an assembly of components (devices, modules (parts), and the like), and not all the components need to be provided in the same housing. In view of this, devices that are housed in different housings and are connected to each other via a network form a system, and one device having modules housed in one housing is also a system.

Also, in the above described examples, any structure described as one device (or one processing unit) may be divided into two or more devices (or processing units). Conversely, any structure described as two or more devices (or processing units) may be combined to form one device (or one processing unit). Also, it is of course possible to add a structure other than the above described ones to the structure of any of the devices (or any of the processing units). Further, as long as the structure and function of the entire system remain the same, part of the structure of a device (or a processing unit) may be incorporated into another device (or another processing unit).

Although embodiments of the present disclosure have been described above with reference to the accompanying drawings, the present disclosure is not limited to those examples. It is apparent that those who have ordinary skills in the art can make various changes or modifications within the scope of the technical spirit claimed herein, and it should be understood that those changes or modifications are within the technical scope of the present disclosure.

For example, the present technique can be embodied in a cloud computing structure in which one function is shared among devices via a network, and processing is performed by the devices cooperating with one another.

The respective steps described with reference to the above described flowcharts can be carried out by one device or can be shared among devices.

In a case where more than one process is included in one step, the processes included in the step can be performed by one device or can be shared among devices.

The image processing device according to the above described embodiments can be applied to various electronic devices including: transmitters and receivers for satellite broadcasting, cable broadcasting such as cable television, deliveries via the Internet, deliveries to terminals by cellular communications, and the like; recording devices that record images on media such as optical disks, magnetic disks, or flash memories; or reproducing devices that reproduce images from those storage media.

The present technique is not limited to the above, and can be applied to any component mounted on such a device or devices constituting a system, such as a processor as a system LSI (Large Scale Integration) or the like, a module using processors and the like, a module using processors and the like, a unit using modules and the like, or a set (as a component of a device) having functions as well as the functions of a unit.

The present technique can also be in the following forms.
(1) An image processing apparatus, including:
circuitry configured to initiate a setting of an object for display within a background image in accordance with a modeling condition associated with a position at which the object is set, based on depth data and base-line length information associated with the background image and modeling data of the object.
(2) The image processing apparatus of any of (1) and (3) through (22), wherein the circuitry is further configured to initiate a changing of a condition of the object to a condition corresponding to a second position, based on a change of position at which the object is set from a first position to the second position.
(3) The image processing apparatus of any of (1), (2) and (4) through (22), wherein the circuitry is further configured to initiate a changing of a condition of the object from a condition associated with a first viewpoint to a condition associated with a second view point, based on a changing of a viewpoint of the background image from the first viewpoint to the second viewpoint.
(4) The image processing apparatus of any of (1) through (3) and (5) through (22), wherein the circuitry is further configured to initiate a changing of a condition of the object from a condition associated with a first viewing direction to a condition associated with a second viewing direction, based on a changing of a direction of a viewpoint of the background image from the first viewing direction to the second viewing direction.
(5) The image processing apparatus of any of (1) through (4) and (6) through (22), wherein the circuitry is further configured to initiate a moving of the object, and repositioning of the object to have a condition of making contact with a plane of the background image.
(6) The image processing apparatus of any of (1) through (5) and (7) through (22), wherein the condition of making contact with the plane is determined based on a distance between the object and the plane.
(7) The image processing apparatus of any of (1) through (6) and (8) through (22), wherein a condition of the object is a condition associated with a position and an orientation of the object.
(8) The image processing apparatus of any of (1) through (7) and (9) through (22), wherein the circuitry is further configured to initiate a simulation of a lighting in the background image based on light source parameters and the depth data, the light source parameters being parameters related to a light source.
(9) The image processing apparatus of any of (1) through (8) and (10) through (22), wherein the circuitry is further configured to initiate an identification of a portion that satisfies line-of-flow conditions in the background image having the object placed therein, and initiates an emphasizing of the identified portion.
(10) The image processing apparatus of any of (1) through (9) and (11) through (22), wherein the circuitry is further configured to initiate a setting of an image of a person within the background image, in accordance with a modeling condition associated with a position at which the image of the person is set within the background image having the object placed therein, and based on the depth data, the base-line length information, and modeling data of the image of the person.
(11) The image processing apparatus of any of (1) through (10) and (12) through (22), wherein the object is selected from among one or more candidate objects, in accordance with a modeling condition of the selected object associated with a position at which the selected object is set in the background image, and based on the depth data, the base-line length information, and the modeling data of the selected object.
(12) The image processing apparatus of any of (1) through (11) and (13) through (22), wherein the one or more candidate objects are objects that can be placed within the background image.
(13) The image processing apparatus of any of (1) through (12) and (14) through (22), wherein the circuitry is further configured to initiate a control of a capturing of an image of a subject, initiate an obtaining of the captured image as the background image, and initiate a generation of depth data of the captured image.
(14) The image processing apparatus of any of (1) through (13) and (15) through (22), wherein the captured image is a multiview image formed with a plurality of images having different viewpoints from one another, and the circuitry is further configured to initiate a generation of depth data of the multiview image, and to initiate a generation of a virtual captured image as the background image based on the multiview image and the depth data, the virtual captured image being obtained by imaging a subject of the multiview image.
(15) The image processing apparatus of any of (1) through (14) and (16) through (22), wherein the object is an image of furniture.
(16) The image processing apparatus of any of (1) through (15) and (17) through (22), wherein the circuitry is further configured to initiate a performing of a purchase process to purchase the furniture that is placed within the background image.

(17) The image processing apparatus of any of (1) through (16) and (18) through (22), wherein the circuitry is further configured to initiate a transmission of multiview image data as data of a multiview image and depth data of the multiview image, the multiview image being formed with a plurality of images having different viewpoints from one another and used for generating the background image.

(18) The image processing apparatus of any of (1) through (17) and (19) through (22), wherein the circuitry is further configured to initiate a generation of image data of the background image having the object set therein, and initiate a transmission of the generated image data.

(19) The image processing apparatus of any of (1) through (18) and (20) through (22), wherein the circuitry is further configured to initiate a generation of an application parameter that is a parameter related to a combining of the background image and the object, and initiate a transmission of the generated application parameter.

(20) The image processing apparatus of any of (1) through (19), (21) and (22), wherein the circuitry is further configured to initiate a generation of metadata about the multiview image, and initiate a transmission of the generated metadata.

(21) The image processing apparatus of any of (1) through (20) and (22), wherein the metadata includes the base-line length information.

(22) The image processing apparatus of any of (1) through (21), wherein the depth data indicates a distance of depth direction in the background image, and the base-line length information indicates a reference length associated with the background image.

(23) An image processing method including:
setting an object for display within a background image in accordance with a modeling condition associated with a position at which the object is set, based on depth data and base-line length information associated with the background image and modeling data of the object; and
placing the set object to be displayed at the position within the background image.

(24) An image processing device, including
an object placement unit that sets the orientation and the size of an object in a position in which the object is to be placed in a background image, and places the object having the set orientation and the set size in the designated position in the background image, the orientation and the size being set based on depth data, base-line length information, and the three-dimensional modeling data of the object, the depth data indicating the distance to a subject in the background image, the base-line length information being information indicating a reference length in the background image.

(25) The image processing device of any of (24) and (26) through (42), wherein, when another position is designated after the object is placed in the background image, the object placement unit sets the orientation and the size of the object in the another position, and places the object having the set orientation and the set size in the another position in the background image.

(26) The image processing device of any of (24), (25), and (27) through (42), wherein, when there is a change in the position or the orientation of the viewpoint of the background image, the object placement unit sets the orientation and the size of the object in the position in which the object was placed before the change in the position or the orientation of the viewpoint in the background image not yet having the change in the position or the orientation of the viewpoint, and places the object having the set orientation and the size in the position in which the object was placed before the change in the position or the orientation of the viewpoint in the background image having the change in the position or the orientation of the viewpoint.

(27) The image processing device of any of (24) through (26) and (28) through (42), wherein the object placement unit moves the object, to bring the object having the set orientation and the set size into contact with the floor.

(28) The image processing device of any of (24) through (27) and (29) through (42), wherein the object placement unit measures the length of a designated area in the background image.

(29) The image processing device of any of (24) through (28) and (30) through (42), wherein the object placement unit simulates lighting in the background image based on light source parameters and the depth data, and causes the background image to reflect the simulated lighting, the light source parameters being parameters related to a light source.

(30) The image processing device of any of (24) through (29) and (31) through (42), wherein the object placement unit identifies a portion that satisfies line-of-flow conditions in the background image having the object placed therein, and emphasizes the identified portion in the background image having the object placed therein.

(31) The image processing device of any of (24) through (30) and (32) through (42), wherein the object placement unit sets the orientation and the size of a person in a position in which an image of the person is to be placed in a background having the object placed therein, and places the image of the person having the set orientation and the set size in the designated position in the background image having the object placed therein, the orientation and the size of the person being set based on the depth data, the base-line length information, and the three-dimensional modeling data of the image of the person.

(32) The image processing device of any of (24) through (31) and (33) through (42), wherein the object placement unit sets the orientation and the size of the object selected from candidates for the object in the position in which the object selected from the candidates for the object is to be placed in the background image, and places the object selected from the candidates for the object having the set orientation and the set size in the designated position in the background image, the orientation and the size of the selected object being set based on the depth data, the base-line length information, and the three-dimensional modeling data of the object selected from the candidates for the object.

(33) The image processing device of any of (24) through (32) and (34) through (42), wherein the object placement unit identifies objects that can be placed in the background image, and selects the object to be placed in the background image from the identified objects, the objects being identified based on the depth data, the base-line length information, and the three-dimensional modeling data.

(34) The image processing device of any of (24) through (33) and (35) through (42), further including:
an imaging unit that captures an image of the subject, and obtains the captured image as the background image; and
a depth data generation unit that generates the depth data of the captured image obtained by the imaging unit.

(35) The image processing device of any of (24) through (34) and (36) through (42), wherein
the captured image is a multiview image formed with images having different viewpoints from one another,
the depth data generation unit generates the depth data of the multiview image, and
the image processing device further includes a virtual captured image generation unit that generates a virtual captured image as the background image based on the multiview image and the depth data, the virtual captured image being obtained by imaging the subject of the multiview image.

(36) The image processing device of any of (24) through (35) and (37) through (42), wherein the object is an image of furniture.

(37) The image processing device of any of (24) through (36) and (38) through (42), further including:
a purchase processing unit that performs a purchase process to purchase the furniture that is placed in the background image by the object placement unit.

(38) The image processing device of any of (24) through (37) and (39) through (42), further including
a transmission unit that transmits multiview image data as the data of a multiview image and the depth data of the multiview image, the multiview image being formed with images having different viewpoints from one another and used for generating the background image.

(39) The image processing device of any of (24) through (38) and (40) through (42), further including:
a combined image data generation unit that generates the image data of the background image having the object placed therein by the object placement unit,
wherein the transmission unit further transmits the combined image data generated by the combined image data generation unit.

(40) The image processing device of any of (24) through (39), (41), and (42), further including:
an application parameter generation unit that generates application parameters that are parameters related to combining of the background image and the object,
wherein the transmission unit further transmits the application parameters generated by the application parameter generation unit.

(41) The image processing device of any of (24) through (40) and (42), further including:
a metadata generation unit that generates metadata about the multiview image,
wherein the transmission unit further transmits the metadata generated by the metadata generation unit.

(42) The image processing device of any of (24) through (41), wherein the metadata includes the base-line length information.

(43) An image processing method including:
setting the orientation and the size of an object in a position in which the object is to be placed in a background image, the orientation and the size being set based on depth data, base-line length information, and the three-dimensional modeling data of the object, the depth data indicating the distance to a subject in the background image, the base-line length information being information indicating a reference length in the background image; and
placing the object having the set orientation and the set size in the designated position in the background image.

REFERENCE SIGNS LIST

100 Multiview-image using service platform
200 Multiview-image using service providing system
201 Terminal device
202 Server
221 CPU
236 Imaging unit
251 CPU
281 Imaging control unit
282 Metadata generation unit
283 Encoding unit
284 Transmission control unit
291 User management unit
292 Acquisition control unit
293 Depth detection unit
294 File generation unit
295 Data management unit
321 Multiview image file
331 Multiview image encoded data
332 Depth data
333 Metadata
401 Terminal device
402 Application providing server
411 CPU
441 Application purchase processing unit
451 User management unit
452 Application sales processing unit
453 Data management unit
461 Application provision processing unit
511 User instruction reception processing unit
512 Display control unit
513 Transmission control unit
521 User management unit
522 Application selection processing unit
523 Image selection processing unit
524 Lens selection processing unit
525 User designated parameter setting unit
526 Virtual lens processing unit
527 Data management unit
601 Furniture sales server
651 User instruction reception processing unit
652 Display control unit
653 Imaging control unit
654 Metadata generation unit
655 Depth detection unit
656 Virtual captured image generation unit
657 Furniture image placement processing unit
658 Purchase processing unit
659 File generation unit
660 Combined image data generation unit
661 Application parameter generation unit
662 Transmission control unit
671 User management unit
672 Application selection unit
673 Furniture data selection unit
674 Purchase processing unit
675 Acquisition control unit
676 Data management unit
681 Furniture data provision unit
682 Purchase processing unit

The invention claimed is:

1. An image processing apparatus, comprising:
a central processing unit (CPU) configured to:
acquire first modeling data of an object from an external source;
control an image capturing device to capture a background image;
set the object at a first position within the background image based on a first condition associated with the first position, depth data of a subject associated with the background image, base-line length information indicating a reference length in the background image, and the first modeling data of the object;
set a first orientation and a first size of the object at the first position based on the depth data and the reference length;
combine the object having the set first orientation and the set first size, and the background image;

select at least one user, from a plurality of users, to whom the set object is to be displayed;
select profile information related to a virtual lens, wherein the virtual lens is associated with the selected at least one user; and
control a display device to display the set object within the background image based on the selected profile information related to the virtual lens.

2. The image processing apparatus according to claim 1, wherein the CPU is further configured to:
detect a change in the first position of the object to a second position;
change the first condition to a second condition associated with the second position, wherein the second condition is associated with a second orientation and a second size of the object; and
place the object with the second orientation and the second size at the second position.

3. The image processing apparatus according to claim 1, wherein the CPU is further configured to:
detect a change from one of a position or an orientation of a first viewpoint of the background image to one of a position or an orientation of a second viewpoint;
change a condition associated with the first viewpoint to a condition associated with the second viewpoint; and
place the object with the set first orientation and the set first size at the first position based on the change from the first viewpoint to the second viewpoint.

4. The image processing apparatus according to claim 1, wherein the CPU is further configured to:
detect a change of a direction of a viewpoint of the background image from a first viewing direction to a second viewing direction; and
change a condition associated with the first viewing direction to a condition associated with the second viewing direction.

5. The image processing apparatus according to claim 1, wherein the CPU is further configured to:
determine, based on a contact of the object with a plane of the background image, a second condition of the object; and
reposition the object based on the second condition.

6. The image processing apparatus according to claim 5, wherein the second condition of the contact of the object with the plane of the background image is determined based on a distance between the object and the plane of the background image.

7. The image processing apparatus according to claim 1, wherein the first condition of the object is a condition associated with the first position and the first orientation of the object.

8. The image processing apparatus according to claim 1, wherein the CPU is further configured to:
simulate a light effect in the background image based on light source parameters and the depth data; and
cause the background image to reflect the simulated light effect,
wherein the light source parameters are associated with a light source.

9. The image processing apparatus according to claim 1, wherein the CPU is further configured to:
identify a portion of the background image that satisfies line-of-flow conditions in the background image, wherein the object is moved in the background image; and
emphasize the identified portion having the object.

10. The image processing apparatus according to claim 1, wherein the CPU is further configured to:
set an image of a person within the background image at a second position in the background image, based on:
a second condition associated with the second position within the background image, wherein the object is set in the background image, and
the depth data, the base-line length information, and second modeling data of the image of the person.

11. The image processing apparatus according to claim 1, wherein the CPU is further configured to:
select the object among a plurality of candidate objects; and
set the selected object at the first position in the background image based on the depth data, the base-line length information, and the first modeling data of the selected object.

12. The image processing apparatus according to claim 11, wherein the plurality of candidate objects is displayable within the background image.

13. The image processing apparatus according to claim 1, wherein the CPU is further configured to:
control the image capturing device to capture an image that comprises the subject;
obtain the captured image as the background image; and
generate depth data of the captured image.

14. The image processing apparatus according to claim 13, wherein
the captured image is a multiview image,
the multiview image comprises a plurality of images having different viewpoints from one another, and
the CPU is further configured to:
generate depth data of the multiview image, and
generate a virtual captured image as the background image based on the multiview image and the generated depth data of the multiview image, wherein the virtual captured image is generated by imaging of the subject.

15. The image processing apparatus according to claim 1, wherein the object is an image of furniture.

16. The image processing apparatus according to claim 15, wherein the CPU is further configured to initiate a process to purchase the furniture that is within the background image.

17. The image processing apparatus according to claim 1, wherein
the CPU is further configured to transmit multiview image data associated with a multiview image and depth data of the multiview image,
the multiview image comprises a plurality of images having different viewpoints from one another, and
the background image is generated based on the multiview image.

18. The image processing apparatus according to claim 17, wherein the CPU is further configured to:
generate image data of the background image having the object; and
transmit the generated image data.

19. The image processing apparatus according to claim 17, wherein the CPU is further configured to:
generate an application parameter associated with a combination operation of the background image with the object; and
transmit the generated application parameter.

20. The image processing apparatus according to claim 17, wherein the CPU is further configured to:

generate metadata associated with the multiview image; and transmit the generated metadata.

21. The image processing apparatus according to claim 20, wherein the metadata includes the base-line length information.

22. The image processing apparatus according to claim 1, wherein the depth data indicates a distance of a depth direction of the subject in the background image, and the base-line length information indicates the reference length associated with the background image.

23. An image processing method, comprising:
in an image processing apparatus:
acquiring, by a central processing unit (CPU) of the image processing apparatus, modeling data of an object from an external source;
controlling, by the CPU, capture of a background image;
setting, by the CPU, the object at a position within the background image based on a condition associated with the position, depth data of a subject associated with the background image, base-line length information indicating a reference length in the background image, and the modeling data of the object,
setting an orientation and a size of the object at the position based on the depth data and the reference length;
combining the object having the set orientation and the set size, and the background image;
selecting at least one user, from a plurality of users, to whom the set object is to be displayed;
selecting profile information related to a virtual lens, wherein the virtual lens is associated with the selected at least one user; and
controlling, by the CPU, display of the set object within the background image based on the selected profile information related to the virtual lens.

24. The image processing apparatus according to claim 1, wherein the CPU is further configured to move the object with the set first orientation and the set first size into contact with a floor.

25. The image processing apparatus according to claim 1, wherein the CPU is further configured to measure a length of an area in the background image.

\* \* \* \* \*